US011954220B2

(12) United States Patent
Ekins

(10) Patent No.: US 11,954,220 B2
(45) Date of Patent: *Apr. 9, 2024

(54) DATA PROTECTION FOR CONTAINER STORAGE

(71) Applicant: PURE STORAGE, INC., Mountain View, CA (US)

(72) Inventor: Ronald Ekins, Haywards Heath (GB)

(73) Assignee: PURE STORAGE, INC., Santa Clara, CA (US)

( * ) Notice: Subject to any disclaimer, the term of this patent is extended or adjusted under 35 U.S.C. 154(b) by 12 days.

This patent is subject to a terminal disclaimer.

(21) Appl. No.: 17/579,296

(22) Filed: Jan. 19, 2022

(65) Prior Publication Data
US 2022/0215111 A1    Jul. 7, 2022

Related U.S. Application Data

(63) Continuation-in-part of application No. 16/952,614, filed on Nov. 19, 2020, now Pat. No. 11,675,503, (Continued)

(51) Int. Cl.
*G06F 21/60* (2013.01)
*G06F 21/62* (2013.01)

(52) U.S. Cl.
CPC ........ *G06F 21/6218* (2013.01); *G06F 21/604* (2013.01); *G06F 2221/2111* (2013.01); (Continued)

(58) Field of Classification Search
None
See application file for complete search history.

(56) References Cited

U.S. PATENT DOCUMENTS 5,706,210 A    1/1998  Kumano et al.
5,799,200 A    8/1998  Brant et al.
(Continued)

FOREIGN PATENT DOCUMENTS

EP              0725324 A2      8/1996
WO    WO-2005043415 A1 *  5/2005  ........ G06F 17/30011
(Continued)

OTHER PUBLICATIONS

Bellamy-McIntyre et al., "OpenID and the Enterprise: A Model-based Analysis of Single Sign-On Authentication", 15th IEEE International Enterprise Distributed Object Computing Conference (EDOC), Aug. 29, 2011, pp. 129-138, IEEE Computer Society, USA, DOI: 10.1109/EDOC.2011.26, ISBN: 978-1-4577-0362-1.
(Continued)

*Primary Examiner* — Jau Shya Meng

(57) ABSTRACT

Data protection for container storage, including: assigning, to a container storage volume of a storage system, a volume-level access policy; and determining whether to allow access to the container storage volume based on the volume-level access policy and one or more attributes of a request for the access, including allowing the access responsive to the one or more attributes meeting the volume-level access policy or denying the access responsive to the one or more attributes failing to meet the volume-level access policy.

18 Claims, 23 Drawing Sheets

Related U.S. Application Data which is a continuation-in-part of application No. 17/022,702, filed on Sep. 16, 2020, which is a continuation-in-part of application No. 16/175,221, filed on Oct. 30, 2018, now Pat. No. 11,455,409, which is a continuation-in-part of application No. 16/050,698, filed on Jul. 31, 2018.

(60) Provisional application No. 62/750,764, filed on Oct. 25, 2018, provisional application No. 62/695,433, filed on Jul. 9, 2018, provisional application No. 62/674,570, filed on May 21, 2018.

(52) U.S. Cl.
CPC ............... *G06F 2221/2113* (2013.01); *G06F 2221/2141* (2013.01)

(56) References Cited

U.S. PATENT DOCUMENTS

| | | |
|---|---|---|
| 5,933,598 A | 8/1999 | Scales et al. |
| 6,012,032 A | 1/2000 | Donovan et al. |
| 6,065,087 A | 5/2000 | Keaveny et al. |
| 6,085,333 A | 7/2000 | Dekoning et al. |
| 6,092,140 A | 7/2000 | Tausheck |
| 6,185,631 B1 | 2/2001 | Casper et al. |
| 6,230,218 B1 | 5/2001 | Casper et al. |
| 6,240,446 B1 | 5/2001 | Casper et al. |
| 6,260,079 B1 | 7/2001 | White |
| 6,314,477 B1 | 11/2001 | Cowger et al. |
| 6,336,157 B1 | 1/2002 | Carbonaro et al. |
| 6,338,083 B1 | 1/2002 | Casper et al. |
| 6,341,315 B1 | 1/2002 | Arroyo et al. |
| 6,356,944 B1 | 3/2002 | McCarty |
| 6,453,357 B1 | 9/2002 | Crow et al. |
| 6,463,498 B1 | 10/2002 | Wakeley et al. |
| 6,470,026 B1 | 10/2002 | Pearson et al. |
| 6,473,782 B1 | 10/2002 | Casper et al. |
| 6,477,139 B1 | 11/2002 | Anderson et al. |
| 6,477,171 B1 | 11/2002 | Wakeley et al. |
| 6,493,750 B1 | 12/2002 | Mathew et al. |
| 6,499,066 B1 | 12/2002 | Frazier |
| 6,526,458 B1 | 2/2003 | Steinmetz et al. |
| 6,578,096 B1 | 6/2003 | Steinmetz et al. |
| 6,643,641 B1 | 11/2003 | Snyder |
| 6,647,514 B1 | 11/2003 | Umberger et al. |
| 6,687,766 B1 | 2/2004 | Casper et al. |
| 6,775,693 B1 | 8/2004 | Adams |
| 6,789,162 B1 | 9/2004 | Talagala et al. |
| 6,791,989 B1 | 9/2004 | Steinmetz et al. |
| 6,865,617 B2 | 3/2005 | Zeidner et al. |
| 6,898,184 B1 | 5/2005 | Anderson et al. |
| 6,937,730 B1 | 8/2005 | Buxton |
| 7,089,272 B1 | 8/2006 | Garthwaite et al. |
| 7,107,389 B2 | 9/2006 | Inagaki et al. |
| 7,146,521 B1 | 12/2006 | Nguyen |
| 7,260,112 B2 | 8/2007 | Moretti et al. |
| 7,334,124 B2 | 2/2008 | Pham et al. |
| 7,437,530 B1 | 10/2008 | Rajan |
| 7,493,424 B1 | 2/2009 | Bali et al. |
| 7,539,790 B1 | 5/2009 | Cameron |
| 7,627,643 B1 | 12/2009 | Ignatoff et al. |
| 7,669,000 B2 | 2/2010 | Sharma et al. |
| 7,669,029 B1 | 2/2010 | Mishra et al. |
| 7,689,609 B2 | 3/2010 | Lango et al. |
| 7,711,871 B1 | 5/2010 | Haechten et al. |
| 7,724,918 B2 | 5/2010 | Balakrishnan et al. |
| 7,743,178 B2 | 6/2010 | Warren et al. |
| 7,743,191 B1 | 6/2010 | Liao |
| 7,769,722 B1 | 8/2010 | Bergant et al. |
| 7,853,741 B2 | 12/2010 | Crespi et al. |
| 7,899,780 B1 | 3/2011 | Shmuylovich et al. |
| 7,934,023 B2 | 4/2011 | Basavaiah et al. |
| 7,979,742 B2 | 7/2011 | Uysal et al. |
| 8,042,163 B1 | 10/2011 | Karr et al. |
| 8,055,726 B1 | 11/2011 | Shah |
| 8,086,585 B1 | 12/2011 | Brashers et al. |
| 8,200,887 B2 | 6/2012 | Bennett |
| 8,271,673 B2 | 9/2012 | Arroyo et al. |
| 8,271,700 B1 | 9/2012 | Annem et al. |
| 8,286,030 B1 | 10/2012 | Chatterjee et al. |
| 8,387,136 B2 | 2/2013 | Lee et al. |
| 8,396,981 B1 | 3/2013 | Lee et al. |
| 8,437,189 B1 | 5/2013 | Montierth et al. |
| 8,465,332 B2 | 6/2013 | Hogan et al. |
| 8,489,831 B2 | 7/2013 | Thompson et al. |
| 8,504,766 B2 | 8/2013 | Young |
| 8,527,544 B1 | 9/2013 | Colgrove et al. |
| 8,566,546 B1 | 10/2013 | Marshak et al. |
| 8,578,442 B1 | 11/2013 | Banerjee |
| 8,613,066 B1 | 12/2013 | Brezinski et al. |
| 8,620,970 B2 | 12/2013 | English et al. |
| 8,667,511 B2 | 3/2014 | Khanvilkar et al. |
| 8,676,928 B1 | 3/2014 | Shah |
| 8,732,357 B2 | 5/2014 | Klein et al. |
| 8,738,813 B1 | 5/2014 | Natanzon et al. |
| 8,751,463 B1 | 6/2014 | Chamness |
| 8,762,642 B2 | 6/2014 | Bates et al. |
| 8,769,622 B2 | 7/2014 | Chang et al. |
| 8,800,009 B1 | 8/2014 | Beda et al. |
| 8,806,274 B1 | 8/2014 | Chatterjee et al. |
| 8,812,606 B2 | 8/2014 | Cashman et al. |
| 8,812,860 B1 | 8/2014 | Bray |
| 8,848,727 B2 | 9/2014 | Saraiya et al. |
| 8,850,546 B1 | 9/2014 | Field et al. |
| 8,898,346 B1 | 11/2014 | Simmons |
| 8,904,023 B2 | 12/2014 | Arroyo et al. |
| 8,909,854 B2 | 12/2014 | Yamagishi et al. |
| 8,931,041 B1 | 1/2015 | Banerjee |
| 8,948,199 B2 | 2/2015 | Kagan et al. |
| 8,949,863 B1 | 2/2015 | Coatney et al. |
| 8,984,602 B1 | 3/2015 | Bailey et al. |
| 8,990,905 B1 | 3/2015 | Bailey et al. |
| 9,009,078 B2 | 4/2015 | Dionne |
| 9,015,333 B2 | 4/2015 | Rao et al. |
| 9,052,837 B2 | 6/2015 | Huang et al. |
| 9,081,713 B1 | 7/2015 | Bennett |
| 9,124,569 B2 | 9/2015 | Hussain et al. |
| 9,134,922 B2 | 9/2015 | Rajagopal et al. |
| 9,164,947 B1 | 10/2015 | Borker |
| 9,189,334 B2 | 11/2015 | Bennett |
| 9,195,626 B2 | 11/2015 | Pandit et al. |
| 9,209,973 B2 | 12/2015 | Aikas et al. |
| 9,232,000 B1 | 1/2016 | Pittman |
| 9,237,057 B1 | 1/2016 | Pittman |
| 9,250,823 B1 | 2/2016 | Kamat et al. |
| 9,264,495 B2 | 2/2016 | Rao et al. |
| 9,270,786 B1 | 2/2016 | Pittman |
| 9,300,660 B1 | 3/2016 | Borowiec et al. |
| 9,311,182 B2 | 4/2016 | Bennett |
| 9,407,601 B1 | 8/2016 | Pittman |
| 9,430,412 B2 | 8/2016 | Huang |
| 9,444,822 B1 | 9/2016 | Borowiec et al. |
| 9,455,938 B2 | 9/2016 | Arroyo et al. |
| 9,471,579 B1 | 10/2016 | Natanzon |
| 9,473,589 B1 | 10/2016 | Pittman |
| 9,473,590 B1 | 10/2016 | Pittman |
| 9,473,591 B1 | 10/2016 | Pittman |
| 9,483,433 B2 | 11/2016 | Casper et al. |
| 9,507,532 B1 | 11/2016 | Colgrove et al. |
| 9,509,797 B1 | 11/2016 | Pittman |
| 9,514,151 B1 | 12/2016 | Pittman |
| 9,514,324 B1 | 12/2016 | Potlapally et al. |
| 9,531,765 B1 | 12/2016 | Pittman |
| 9,563,383 B2 | 2/2017 | Jin et al. |
| 9,563,423 B1 | 2/2017 | Pittman |
| 9,565,110 B2 | 2/2017 | Mullendore et al. |
| 9,565,269 B2 | 2/2017 | Malwankar et al. |
| 9,591,099 B1 | 3/2017 | Pittman |
| 9,626,309 B1 | 4/2017 | Burke et al. |
| 9,632,870 B2 | 4/2017 | Bennett |
| 9,639,592 B1 | 5/2017 | Natanzon et al. |
| 9,647,905 B1 | 5/2017 | Pittman |

(56) References Cited

U.S. PATENT DOCUMENTS

| | | | |
|---|---|---|---|
| RE46,439 E * | 6/2017 | Schneider | H04L 63/102 |
| 9,672,117 B1 | 6/2017 | Natanzon et al. | |
| 9,697,215 B2 | 7/2017 | Sabdar et al. | |
| 9,712,427 B1 | 7/2017 | Pittman | |
| 9,712,619 B2 | 7/2017 | Malwankar et al. | |
| 9,720,626 B2 | 8/2017 | Buzzard et al. | |
| 9,785,355 B2 | 10/2017 | Huang | |
| 9,785,356 B2 | 10/2017 | Huang | |
| 9,807,164 B2 | 10/2017 | Wareing | |
| 9,817,606 B1 | 11/2017 | Byrne et al. | |
| 9,933,956 B2 | 4/2018 | Ramachandran et al. | |
| 9,936,024 B2 | 4/2018 | Malwankar et al. | |
| 9,940,293 B1 | 4/2018 | Desai et al. | |
| 9,986,028 B2 | 5/2018 | Cayton et al. | |
| 9,990,511 B1 | 6/2018 | Dreyfus | |
| 10,044,796 B2 | 8/2018 | Cashman et al. | |
| 10,146,648 B1 | 12/2018 | Vokaliga et al. | |
| 10,152,386 B1 | 12/2018 | Ramachandran et al. | |
| 10,175,891 B1 | 1/2019 | Malwankar et al. | |
| 10,257,184 B1 | 4/2019 | Mehta et al. | |
| 10,310,760 B1 | 6/2019 | Dreier et al. | |
| 10,365,978 B1 | 7/2019 | Whitney et al. | |
| 10,509,914 B1 * | 12/2019 | Desai | G06F 21/604 |
| 10,528,488 B1 | 1/2020 | Lee et al. | |
| 10,542,423 B1 | 1/2020 | Chang et al. | |
| 10,594,730 B1 | 3/2020 | Summers et al. | |
| 10,601,876 B1 | 3/2020 | Levy | |
| 10,795,583 B2 | 10/2020 | Yang et al. | |
| 10,901,627 B1 | 1/2021 | BShara et al. | |
| 11,455,409 B2 | 9/2022 | Fisher et al. | |
| 11,675,503 B1 | 6/2023 | Ekins | |
| 2002/0013802 A1 | 1/2002 | Mori et al. | |
| 2003/0145172 A1 | 7/2003 | Galbraith et al. | |
| 2003/0191783 A1 | 10/2003 | Wolczko et al. | |
| 2003/0225961 A1 | 12/2003 | Chow et al. | |
| 2004/0080985 A1 | 4/2004 | Chang et al. | |
| 2004/0111573 A1 | 6/2004 | Garthwaite | |
| 2004/0153844 A1 | 8/2004 | Ghose et al. | |
| 2004/0193814 A1 | 9/2004 | Erickson et al. | |
| 2004/0243823 A1 * | 12/2004 | Moyer | G06F 21/62 713/193 |
| 2004/0260967 A1 | 12/2004 | Guha et al. | |
| 2005/0086531 A1 * | 4/2005 | Kenrich | G06F 21/604 707/999.009 |
| 2005/0149759 A1 * | 7/2005 | Vishwanath | G06F 21/34 726/4 |
| 2005/0160416 A1 | 7/2005 | Jamison et al. | |
| 2005/0188246 A1 | 8/2005 | Emberty et al. | |
| 2005/0216800 A1 | 9/2005 | Bicknell et al. | |
| 2005/0251865 A1 | 11/2005 | Mont et al. | |
| 2006/0015771 A1 | 1/2006 | Van Gundy et al. | |
| 2006/0129817 A1 | 6/2006 | Borneman et al. | |
| 2006/0161726 A1 | 7/2006 | Lasser | |
| 2006/0230245 A1 | 10/2006 | Gounares et al. | |
| 2006/0239075 A1 | 10/2006 | Williams et al. | |
| 2007/0022163 A1 | 1/2007 | Wormald et al. | |
| 2007/0022227 A1 | 1/2007 | Miki | |
| 2007/0028068 A1 | 2/2007 | Golding et al. | |
| 2007/0055702 A1 | 3/2007 | Fridella et al. | |
| 2007/0100829 A1 | 5/2007 | Allen et al. | |
| 2007/0109856 A1 | 5/2007 | Pellicone et al. | |
| 2007/0150689 A1 | 6/2007 | Pandit et al. | |
| 2007/0168321 A1 | 7/2007 | Saito et al. | |
| 2007/0220227 A1 | 9/2007 | Long | |
| 2007/0294563 A1 | 12/2007 | Bose | |
| 2007/0294564 A1 | 12/2007 | Reddin et al. | |
| 2008/0005587 A1 | 1/2008 | Ahlquist | |
| 2008/0077825 A1 | 3/2008 | Bello et al. | |
| 2008/0162674 A1 | 7/2008 | Dahiya | |
| 2008/0195833 A1 | 8/2008 | Park | |
| 2008/0270370 A1 | 10/2008 | Castellanos et al. | |
| 2008/0270678 A1 | 10/2008 | Cornwell et al. | |
| 2008/0282045 A1 | 11/2008 | Biswas et al. | |
| 2009/0043958 A1 | 2/2009 | Kaneda et al. | |
| 2009/0077340 A1 | 3/2009 | Johnson et al. | |
| 2009/0100115 A1 | 4/2009 | Park et al. | |
| 2009/0150631 A1 * | 6/2009 | Wilsey | G06F 21/85 711/163 |
| 2009/0198889 A1 | 8/2009 | Ito et al. | |
| 2010/0052625 A1 | 3/2010 | Cagno et al. | |
| 2010/0211723 A1 | 8/2010 | Mukaida | |
| 2010/0246266 A1 | 9/2010 | Park et al. | |
| 2010/0257142 A1 | 10/2010 | Murphy et al. | |
| 2010/0262764 A1 | 10/2010 | Liu et al. | |
| 2010/0318812 A1 | 12/2010 | Auradkar et al. | |
| 2010/0325345 A1 | 12/2010 | Ohno et al. | |
| 2010/0332754 A1 | 12/2010 | Lai et al. | |
| 2011/0072290 A1 | 3/2011 | Davis et al. | |
| 2011/0125955 A1 | 5/2011 | Chen | |
| 2011/0131231 A1 | 6/2011 | Haas et al. | |
| 2011/0167221 A1 | 7/2011 | Pangal et al. | |
| 2012/0023144 A1 | 1/2012 | Rub | |
| 2012/0054264 A1 | 3/2012 | Haugh et al. | |
| 2012/0079318 A1 | 3/2012 | Colgrove et al. | |
| 2012/0131253 A1 | 5/2012 | McKnight et al. | |
| 2012/0198269 A1 | 8/2012 | Gupta et al. | |
| 2012/0245954 A1 | 9/2012 | Klotz et al. | |
| 2012/0303576 A1 | 11/2012 | Calder et al. | |
| 2012/0303919 A1 | 11/2012 | Hu et al. | |
| 2012/0311000 A1 | 12/2012 | Post et al. | |
| 2012/0330959 A1 | 12/2012 | Kretz et al. | |
| 2013/0007845 A1 | 1/2013 | Chang et al. | |
| 2013/0031414 A1 | 1/2013 | Dhuse et al. | |
| 2013/0036272 A1 | 2/2013 | Nelson | |
| 2013/0054650 A1 | 2/2013 | O'Byrne | |
| 2013/0071087 A1 | 3/2013 | Motiwala et al. | |
| 2013/0145447 A1 | 6/2013 | Maron | |
| 2013/0191555 A1 | 7/2013 | Liu | |
| 2013/0198459 A1 | 8/2013 | Joshi et al. | |
| 2013/0205173 A1 | 8/2013 | Yoneda | |
| 2013/0219164 A1 | 8/2013 | Hamid | |
| 2013/0227201 A1 | 8/2013 | Talagala et al. | |
| 2013/0290607 A1 | 10/2013 | Chang et al. | |
| 2013/0311434 A1 | 11/2013 | Jones | |
| 2013/0318297 A1 | 11/2013 | Jibbe et al. | |
| 2013/0332614 A1 | 12/2013 | Brunk et al. | |
| 2014/0020083 A1 | 1/2014 | Fetik | |
| 2014/0074850 A1 | 3/2014 | Noel et al. | |
| 2014/0082715 A1 | 3/2014 | Grajek et al. | |
| 2014/0086146 A1 | 3/2014 | Kim et al. | |
| 2014/0090009 A1 | 3/2014 | Li et al. | |
| 2014/0096220 A1 | 4/2014 | Pinto et al. | |
| 2014/0101434 A1 | 4/2014 | Senthurpandi et al. | |
| 2014/0164774 A1 | 6/2014 | Nord et al. | |
| 2014/0173232 A1 | 6/2014 | Reohr et al. | |
| 2014/0181039 A1 | 6/2014 | Harrison et al. | |
| 2014/0195636 A1 | 7/2014 | Karve et al. | |
| 2014/0201512 A1 | 7/2014 | Seethaler et al. | |
| 2014/0201541 A1 | 7/2014 | Paul et al. | |
| 2014/0208155 A1 | 7/2014 | Pan | |
| 2014/0215108 A1 | 7/2014 | Pandit et al. | |
| 2014/0215590 A1 | 7/2014 | Brand | |
| 2014/0229654 A1 | 8/2014 | Goss et al. | |
| 2014/0230017 A1 | 8/2014 | Saib | |
| 2014/0258526 A1 | 9/2014 | Le Sant et al. | |
| 2014/0282983 A1 | 9/2014 | Ju et al. | |
| 2014/0285917 A1 | 9/2014 | Cudak et al. | |
| 2014/0325262 A1 | 10/2014 | Cooper et al. | |
| 2014/0351627 A1 | 11/2014 | Best et al. | |
| 2014/0373104 A1 | 12/2014 | Gaddam et al. | |
| 2014/0373126 A1 | 12/2014 | Hussain et al. | |
| 2015/0012607 A1 | 1/2015 | Cayton et al. | |
| 2015/0026387 A1 | 1/2015 | Sheredy et al. | |
| 2015/0039783 A1 | 2/2015 | Arroyo et al. | |
| 2015/0074463 A1 | 3/2015 | Jacoby et al. | |
| 2015/0089569 A1 | 3/2015 | Sondhi et al. | |
| 2015/0095515 A1 | 4/2015 | Krithivas et al. | |
| 2015/0113203 A1 | 4/2015 | Dancho et al. | |
| 2015/0121137 A1 | 4/2015 | McKnight et al. | |
| 2015/0134920 A1 | 5/2015 | Anderson et al. | |
| 2015/0149822 A1 | 5/2015 | Coronado et al. | |
| 2015/0193169 A1 | 7/2015 | Sundaram et al. | |
| 2015/0220917 A1 | 8/2015 | Aabye et al. | |
| 2015/0261446 A1 | 9/2015 | Lee | |

(56) References Cited

U.S. PATENT DOCUMENTS

| | | |
|---|---|---|
| 2015/0363278 A1 | 12/2015 | Harris et al. |
| 2015/0365385 A1 | 12/2015 | Hore |
| 2015/0378606 A1 | 12/2015 | Huang |
| 2015/0378640 A1 | 12/2015 | Huang |
| 2015/0378888 A1 | 12/2015 | Zhang et al. |
| 2015/0379107 A1 | 12/2015 | Rank et al. |
| 2016/0004452 A1 | 1/2016 | Hayes et al. |
| 2016/0041942 A1 | 2/2016 | Pandit et al. |
| 2016/0063269 A1 | 3/2016 | Liden et al. |
| 2016/0085718 A1 | 3/2016 | Huang |
| 2016/0098323 A1 | 4/2016 | Mutha et al. |
| 2016/0127468 A1 | 5/2016 | Malwankar et al. |
| 2016/0127492 A1 | 5/2016 | Malwankar et al. |
| 2016/0132645 A1 | 5/2016 | Charpentier et al. |
| 2016/0132721 A1 | 5/2016 | Bostick et al. |
| 2016/0188731 A1 | 6/2016 | Dai et al. |
| 2016/0188893 A1 | 6/2016 | Ghafourifar |
| 2016/0210075 A1 | 7/2016 | Frank et al. |
| 2016/0224259 A1 | 8/2016 | Ahrens et al. |
| 2016/0335454 A1 | 11/2016 | Choe et al. |
| 2016/0350009 A1 | 12/2016 | Cerreta et al. |
| 2016/0352720 A1 | 12/2016 | Hu et al. |
| 2016/0352830 A1 | 12/2016 | Borowiec et al. |
| 2016/0352834 A1 | 12/2016 | Borowiec et al. |
| 2017/0031779 A1 | 2/2017 | Helliker et al. |
| 2017/0047114 A1 | 2/2017 | Song et al. |
| 2017/0054805 A1 | 2/2017 | Langas et al. |
| 2017/0093972 A1 | 3/2017 | Paulzagade et al. |
| 2017/0116343 A1 | 4/2017 | Wu et al. |
| 2017/0134427 A1 | 5/2017 | Hutchins et al. |
| 2017/0147829 A1 | 5/2017 | Cismas et al. |
| 2017/0149897 A1 | 5/2017 | Malwankar et al. |
| 2017/0222799 A1 | 8/2017 | Telford |
| 2017/0235490 A1 | 8/2017 | Tan |
| 2017/0235762 A1 | 8/2017 | Sharpe et al. |
| 2017/0242599 A1 | 8/2017 | Patnaik et al. |
| 2018/0007040 A1 | 1/2018 | Thom et al. |
| 2018/0081562 A1 | 3/2018 | Vasudevan |
| 2018/0095915 A1 | 4/2018 | Prabhakar et al. |
| 2018/0150477 A1 | 5/2018 | Jewell et al. |
| 2018/0173420 A1 | 6/2018 | Li et al. |
| 2018/0253360 A1 | 9/2018 | B |
| 2019/0026038 A1 | 1/2019 | Voigt |
| 2019/0034381 A1 | 1/2019 | Burstein et al. |
| 2019/0073490 A1 | 3/2019 | Agrawal et al. |
| 2019/0075130 A1 | 3/2019 | Petry et al. |
| 2019/0075218 A1 | 3/2019 | Ribani et al. |
| 2019/0156180 A1 | 5/2019 | Nomura et al. |
| 2019/0294565 A1 | 9/2019 | Pinto et al. |
| 2019/0354403 A1 | 11/2019 | Ayyagari et al. |
| 2019/0354628 A1 | 11/2019 | Grunwald et al. |
| 2019/0354708 A1 | 11/2019 | Fisher et al. |
| 2020/0026547 A1 | 1/2020 | Bryant et al. |
| 2020/0053090 A1 | 2/2020 | Kliger et al. |
| 2020/0081704 A1 | 3/2020 | Bafna et al. |
| 2020/0110672 A1 | 4/2020 | Srinivasan |
| 2020/0110675 A1 | 4/2020 | Wang et al. |
| 2020/0142634 A1 | 5/2020 | Surcouf et al. |
| 2021/0243193 A1 | 8/2021 | Padmanabhan |
| 2022/0166802 A1 | 5/2022 | Roozbehani et al. |

FOREIGN PATENT DOCUMENTS

| | | |
|---|---|---|
| WO | 2012087648 A2 | 6/2012 |
| WO | 2013071087 A1 | 5/2013 |
| WO | 2014110137 A1 | 7/2014 |
| WO | 2016015008 A1 | 1/2016 |
| WO | 2016100790 A1 | 6/2016 |
| WO | 2016190938 A1 | 12/2016 |
| WO | 2016195759 A1 | 12/2016 |
| WO | 2016195958 A1 | 12/2016 |
| WO | 2016195961 A1 | 12/2016 |
| WO | 2019226597 A1 | 11/2019 |

OTHER PUBLICATIONS

Cidon et al., "Tiered Replication: A Cost-effective Alternative to Full Cluster Geo-replication", USENIX Association, The Advanced Computing Systems Association, 2015 USENIX Annual Technical Conference, https://www.usenix.org/conference/atc15/technical-session/presentation/cidon, Jul. 2015, 14 pages.

ETSI, "Network Function Virtualisation (NFV); Resiliency Requirements", ETSI GS NFCV-REL 001, V1.1.1, Jan. 2015, 82 pages, etsi.org (online), URL: www.etsi.org/deliver/etsi_gs/NFV-REL/001_099/001/01.01.01_60/gs_NFV-REL001v010101p.pdf.

Faith, "dictzip file format", GitHub.com (online), accessed Jul. 28, 2015, 1 page, URL: github.com/fidlej/idzip.

Google Search of "storage array define" performed by the Examiner on Nov. 4, 2015 for U.S. Appl. No. 14/725,278, Results limited to entries dated before 2012, 1 page.

Hota et al., "Capability-based Cryptographic Data Access Control in Cloud Computing", International Journal of Advanced Networking and Applications, col. 1, Issue 1, Aug. 2011, 10 pages, Eswar Publications, India.

Hu et al., "Container Marking: Combining Data Placement, Garbage Collection and Wear Levelling for Flash", 19th Annual IEEE International Symposium on Modelling, Analysis, and Simulation of Computer and Telecommunications Systems, Jul. 25-27, 2011, 11 pages, ISBN: 978-0-7695-4430-4, DOI: 10.1109/MASCOTS.2011.50.

International Search Report and Written Opinion, PCT/IB2017/053491, dated Sep. 27, 2017, 9 pages.

International Search Report and Written Opinion, PCT/US2016/015006, dated Apr. 29, 2016, 12 pages.

International Search Report and Written Opinion, PCT/US2016/015008, dated May 4, 2016, 12 pages.

International Search Report and Written Opinion, PCT/US2016/016333, dated Jun. 8, 2016, 12 pages.

International Search Report and Written Opinion, PCT/US2016/020410, dated Jul. 8, 2016, 12 pages.

International Search Report and Written Opinion, PCT/US2016/032052, dated Aug. 30, 2016, 17 pages.

International Search Report and Written Opinion, PCT/US2016/032084, dated Jul. 18, 2016, 12 pages.

International Search Report and Written Opinion, PCT/US2016/035492, dated Aug. 17, 2016, 10 pages.

International Search Report and Written Opinion, PCT/US2016/036693, dated Aug. 29, 2016, 10 pages.

International Search Report and Written Opinion, PCT/US2016/038758, dated Oct. 7, 2016, 10 pages.

International Search Report and Written Opinion, PCT/US2016/040393, dated Sep. 22, 2016, 10 pages.

International Search Report and Written Opinion, PCT/US2016/044020, dated Sep. 30, 2016, 11 pages.

International Search Report and Written Opinion, PCT/US2016/044874, dated Oct. 7, 2016, 11 pages.

International Search Report and Written Opinion, PCT/US2016/044875, dated Oct. 5, 2016, 13 pages.

International Search Report and Written Opinion, PCT/US2016/044876, dated Oct. 21, 2016, 12 pages.

International Search Report and Written Opinion, PCT/US2016/044877, dated Sep. 29, 2016, 13 pages.

International Search Report and Written Opinion, PCT/US2019/033224, dated Sep. 9, 2019, 11 pages.

Kong, "Using PCI Express As The Primary System Interconnect In Multiroot Compute, Storage, Communications And Embedded Systems", White Paper, IDT.com (online), Aug. 28, 2008, 12 pages, URL: www.idt.com/document/whp/idt-pcie-multi-root-white-paper.

Li et al., "Access Control for the Services Oriented Architecture", Proceedings of the 2007 ACM Workshop on Secure Web Services (SWS '07), Nov. 2007, pp. 9-17, ACM New York, NY.

Ludeman, "From the Pure Storage Blog: Rapid Copy/Clone Automation for Oracle, " http://www.viss-llc.com/blog/from-the-pure-storage-blog-rapid-copyclone-automation-for-oracle, published Apr. 13, 2018, by VLS, 3 pages.

(56) References Cited

OTHER PUBLICATIONS

Martins et al., "Survey of data replication in P2P systems", INRI, XP-002501325, dated Dec. 2006, 44 pages, URL: http://hal.inria.fr/docs/00/12/22/82/PDF/Survey_of_data_replication_in_P2P_systems.PDF.

Microsoft, "Hybrid for SharePoint Server 2013—Security Reference Architecture", Microsoft (online), Oct. 2014, 53 pages, URL: hybrid.office.com/img/Security_Reference_Architecture.pdf.

Microsoft, "Hybrid Identity Management", Microsoft (online), Apr. 2014, 2 pages, URL: download.microsoft.com/download/E/A/E/EAE57CD1-A80B-423C-96BB-142FAAC630B9/Hybrid_Identity_Datasheet.pdf.

Muntimadugu et al., "Red Hat Gluster Storage 3.2 Administration Guide", sections 5.8 and 11.4, dated Aug. 2017, retrieved on Aug. 29, 2018, 465 pages, URL: https://access.rehat.com/documentation/en-us/red_hat_gluster_storage/3.2/pdf/administration_guide/Red_Hat_Gluster_Storage-3.2-Administration_Guide-en-US.pdf.

Nazir et al., "The Impact of the Implementation Cost of Replication in Data Grid Job Scheduling, Mathematical and Computational Applications (MDPI)", http://www.mdpi.com/2297-8747/23/2/28/pdf, DOI: 10.3390/mca2302002, vol. 23, Issue 2, Published May 25, 2018, 19 pages.

PCMAG, "Storage Array Definition", Published May 10, 2013, URL: http://web.archive.org/web/20130510121646/http://www.pcmag.com/encyclopedia/term/52091/storage-array, 2 pages.

Storer et al., "Secure Data Deduplication", Proceedings of the 4th ACM International Workshop on Storage Security And Survivability (StorageSS'08), Oct. 2008, 10 pages, ACM New York, NY. USA, DOI: 10.1145/1456469.1456471.

Sweere, "Creating Storage Class Persistent Memory with NVDIMM", Published in Aug. 2013, Flash Memory Summit 2013, URL: http://ww.flashmemorysummit.com/English/Collaterals/Proceedings/2013/20130814_T2_Sweere.pdf, 22 pages.

Techopedia, "What is a disk array", techopedia.com (online), Jan. 13, 2012, 1 page, URL: web.archive.org/web/20120113053358/http://www.techopedia.com/definition/1009/disk-array.

Touchette, "Stretched Cluster: ActiveCluster Makes It Simple for All—Pure Storage", dated Dec. 27, 2017, printed Aug. 27, 2019, 11 pages, URL: https://blog.purestorage.com/activecluster-simple-stretch-clustering.

Webopedia, "What is a disk array", webopedia.com (online), May 26, 2011, 2 pages, URL: web/archive.org/web/20110526081214/http://www.webopedia.com/TERM/D/disk_array.html.

Wikipedia, "Convergent Encryption", Wikipedia.org (online), accessed Sep. 8, 2015, 2 pages, URL: en.wikipedia.org/wiki/Convergent_encryption.

Microsoft, "Hybrid Identity", Microsoft (online), Apr. 2014, 36 pages, URL: www.aka.ms/HybridIdentityWp.

Muntimadugu et al., "Red Hat Gluster Storage 3.2 Administration Guide", URL: https://access.redhat.com/documentation/en-us/red_hat_gluster_storage/3.2/pdf/administration_guide/Red_Hat_Gluster_Storage-3.2-Administration_Guide-en-US.pdf, sections 5.8 and 11.4, dated Aug. 2017, retrieved on Aug. 29, 2018, 5 pages.

* cited by examiner

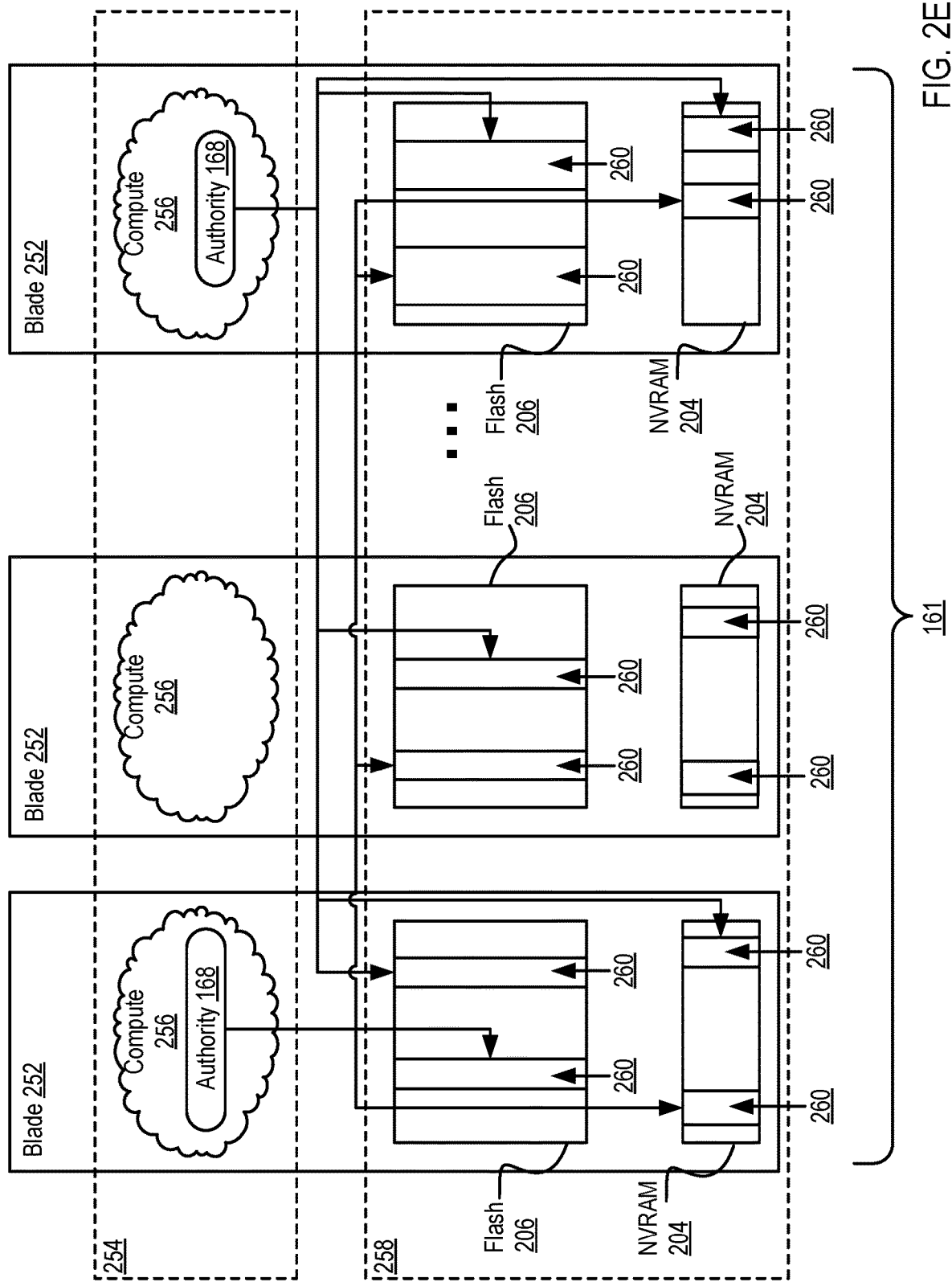

DATA PROTECTION FOR CONTAINER STORAGE

CROSS-REFERENCE TO RELATED APPLICATIONS

This is a continuation in-part application for patent entitled to a filing date and claiming the benefit of earlier-filed of U.S. patent application Ser. No. 16/952,614, filed Nov. 19, 2020, herein incorporated by reference in its entirety, which is a continuation in-part of U.S. patent application Ser. No. 17/022,702, filed Sep. 16, 2020, which is a continuation in-part of U.S. patent application Ser. No. 16/175,221, filed Oct. 30, 2018, which both claims priority from U.S. Provisional Patent Application 62/750,764, filed Oct. 25, 2018 and is a continuation in-part of U.S. patent application Ser. No. 16/050,698, filed Jul. 31, 2018, which claims priority from U.S. Provisional Patent Application 62/674,570, filed May 21, 2018 and U.S. Provisional Patent Application 62/695,433, filed Jul. 9, 2018.

BRIEF DESCRIPTION OF DRAWINGS

FIG. 2E is a blade hardware block diagram, showing a control plane, compute and storage planes, and authorities interacting with underlying physical resources, in accordance with some embodiments.

DESCRIPTION OF EMBODIMENTS

Figure 1A:
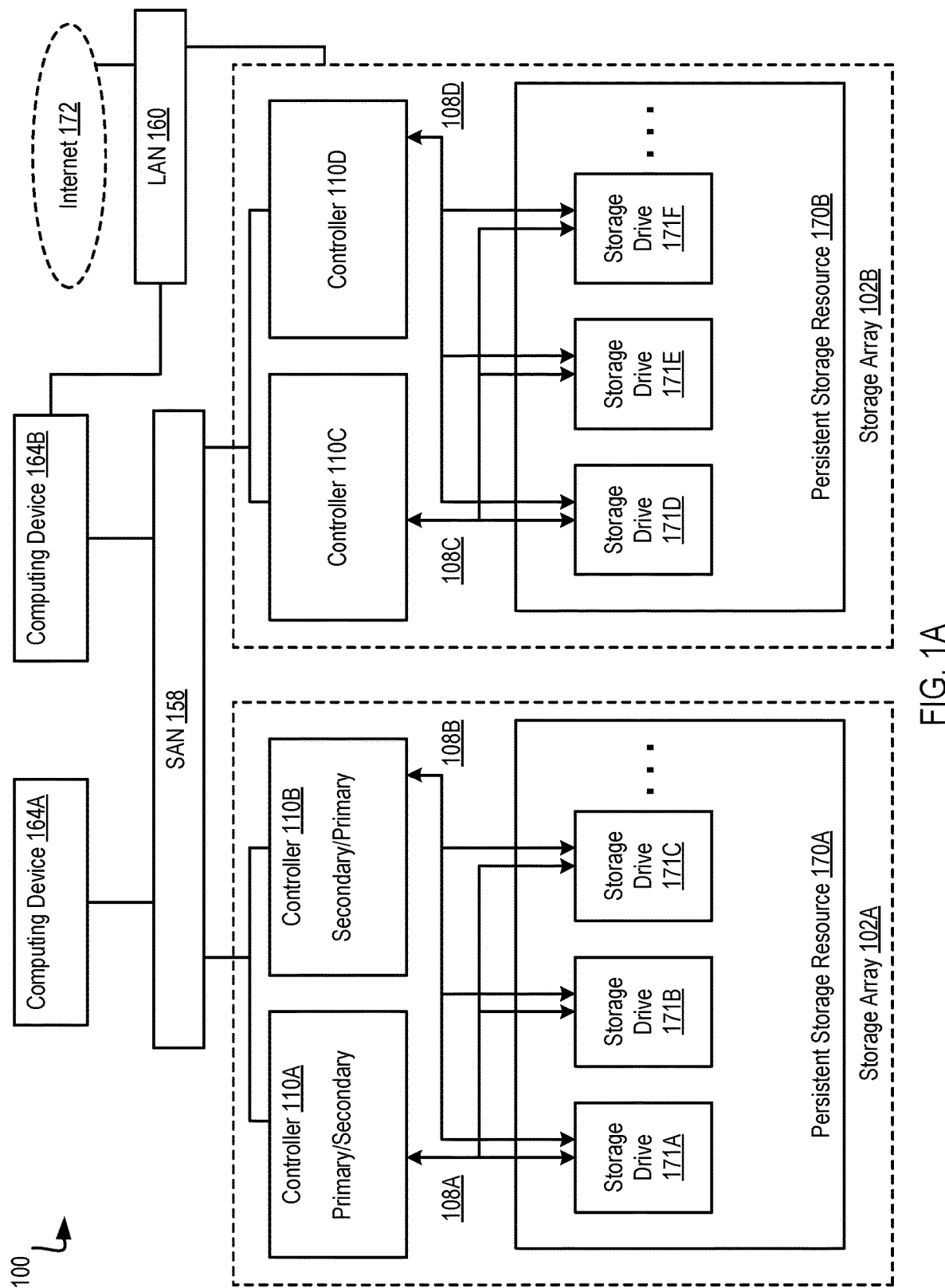
FIG. 1A illustrates a first example system for data storage in accordance with some implementations.

Example methods, apparatus, and products for role-based data access in accordance with embodiments of the present disclosure are described with reference to the accompanying drawings, beginning with FIG. 1A. FIG. 1A illustrates an example system for data storage, in accordance with some implementations. System 100 (also referred to as "storage system" herein) includes numerous elements for purposes of illustration rather than limitation. It may be noted that system 100 may include the same, more, or fewer elements configured in the same or different manner in other implementations.

System 100 includes a number of computing devices 164A-B. Computing devices (also referred to as "client devices" herein) may be embodied, for example, a server in a data center, a workstation, a personal computer, a notebook, or the like. Computing devices 164A-B may be coupled for data communications to one or more storage arrays 102A-B through a storage area network ('SAN') 158 or a local area network ('LAN') 160.

The SAN 158 may be implemented with a variety of data communications fabrics, devices, and protocols. For example, the fabrics for SAN 158 may include Fibre Channel, Ethernet, Infiniband, Serial Attached Small Computer System Interface ('SAS'), or the like. Data communications protocols for use with SAN 158 may include Advanced Technology Attachment ('ATA'), Fibre Channel Protocol, Small Computer System Interface ('SCSI'), Internet Small Computer System Interface ('iSCSI'), HyperSCSI, Non-Volatile Memory Express ('NVMe') over Fabrics, or the like. It may be noted that SAN 158 is provided for illustration, rather than limitation. Other data communication couplings may be implemented between computing devices 164A-B and storage arrays 102A-B.

The LAN 160 may also be implemented with a variety of fabrics, devices, and protocols. For example, the fabrics for LAN 160 may include Ethernet (802.3), wireless (802.11), or the like. Data communication protocols for use in LAN 160 may include Transmission Control Protocol ('TCP'), User Datagram Protocol ('UDP'), Internet Protocol ('IP'), HyperText Transfer Protocol ('HTTP'), Wireless Access Protocol ('WAP'), Handheld Device Transport Protocol ('HDTP'), Session Initiation Protocol ('SIP'), Real Time Protocol ('RTP'), or the like.

Storage arrays 102A-B may provide persistent data storage for the computing devices 164A-B. Storage array 102A may be contained in a chassis (not shown), and storage array 102B may be contained in another chassis (not shown), in implementations. Storage array 102A and 102B may include one or more storage array controllers 110A-D (also referred to as "controller" herein). A storage array controller 110A-D may be embodied as a module of automated computing machinery comprising computer hardware, computer software, or a combination of computer hardware and software. In some implementations, the storage array controllers 110A-D may be configured to carry out various storage tasks. Storage tasks may include writing data received from the computing devices 164A-B to storage array 102A-B, erasing data from storage array 102A-B, retrieving data from storage array 102A-B and providing data to computing devices 164A-B, monitoring and reporting of disk utilization and performance, performing redundancy operations, such as Redundant Array of Independent Drives ('RAID') or RAID-like data redundancy operations, compressing data, encrypting data, and so forth.

Storage array controller 110A-D may be implemented in a variety of ways, including as a Field Programmable Gate Array ('FPGA'), a Programmable Logic Chip ('PLC'), an Application Specific Integrated Circuit ('ASIC'), System-on-Chip ('SOC'), or any computing device that includes discrete components such as a processing device, central processing unit, computer memory, or various adapters. Storage array controller 110A-D may include, for example, a data communications adapter configured to support communications via the SAN 158 or LAN 160. In some implementations, storage array controller 110A-D may be independently coupled to the LAN 160. In implementations, storage array controller 110A-D may include an I/O controller or the like that couples the storage array controller 110A-D for data communications, through a midplane (not shown), to a persistent storage resource 170A-B (also referred to as a "storage resource" herein). The persistent storage resource 170A-B main include any number of storage drives 171A-F (also referred to as "storage devices" herein) and any number of non-volatile Random Access Memory ('NVRAM') devices (not shown).

In some implementations, the NVRAM devices of a persistent storage resource 170A-B may be configured to receive, from the storage array controller 110A-D, data to be stored in the storage drives 171A-F. In some examples, the data may originate from computing devices 164A-B. In some examples, writing data to the NVRAM device may be carried out more quickly than directly writing data to the storage drive 171A-F. In implementations, the storage array controller 110A-D may be configured to utilize the NVRAM devices as a quickly accessible buffer for data destined to be written to the storage drives 171A-F. Latency for write requests using NVRAM devices as a buffer may be improved relative to a system in which a storage array controller 110A-D writes data directly to the storage drives 171A-F. In some implementations, the NVRAM devices may be implemented with computer memory in the form of high bandwidth, low latency RAM. The NVRAM device is referred to as "non-volatile" because the NVRAM device may receive or include a unique power source that maintains the state of the RAM after main power loss to the NVRAM device. Such a power source may be a battery, one or more capacitors, or the like. In response to a power loss, the NVRAM device may be configured to write the contents of the RAM to a persistent storage, such as the storage drives 171A-F.

In implementations, storage drive 171A-F may refer to any device configured to record data persistently, where "persistently" or "persistent" refers as to a device's ability to maintain recorded data after loss of power. In some implementations, storage drive 171A-F may correspond to non-disk storage media. For example, the storage drive 171A-F may be one or more solid-state drives ('SSDs'), flash memory based storage, any type of solid-state non-volatile memory, or any other type of non-mechanical storage device. In other implementations, storage drive 171A-F may include mechanical or spinning hard disk, such as hard-disk drives ('HDD').

In some implementations, the storage array controllers 110A-D may be configured for offloading device management responsibilities from storage drive 171A-F in storage array 102A-B. For example, storage array controllers 110A-D may manage control information that may describe the state of one or more memory blocks in the storage drives 171A-F. The control information may indicate, for example, that a particular memory block has failed and should no longer be written to, that a particular memory block contains boot code for a storage array controller 110A-D, the number of program-erase ('PIE') cycles that have been performed on a particular memory block, the age of data stored in a particular memory block, the type of data that is stored in a particular memory block, and so forth. In some implementations, the control information may be stored with an associated memory block as metadata. In other implementations, the control information for the storage drives 171A-F may be stored in one or more particular memory blocks of the storage drives 171A-F that are selected by the storage array controller 110A-D. The selected memory blocks may be tagged with an identifier indicating that the selected memory block contains control information. The identifier may be utilized by the storage array controllers 110A-D in conjunction with storage drives 171A-F to quickly identify the memory blocks that contain control information. For example, the storage controllers 110A-D may issue a command to locate memory blocks that contain control information. It may be noted that control information may be so large that parts of the control information may be stored in multiple locations, that the control information may be stored in multiple locations for purposes of redundancy, for example, or that the control information may otherwise be distributed across multiple memory blocks in the storage drive 171A-F.

In implementations, storage array controllers 110A-D may offload device management responsibilities from storage drives 171A-F of storage array 102A-B by retrieving, from the storage drives 171A-F, control information describing the state of one or more memory blocks in the storage drives 171A-F. Retrieving the control information from the storage drives 171A-F may be carried out, for example, by the storage array controller 110A-D querying the storage drives 171A-F for the location of control information for a particular storage drive 171A-F. The storage drives 171A-F may be configured to execute instructions that enable the storage drive 171A-F to identify the location of the control information. The instructions may be executed by a controller (not shown) associated with or otherwise located on the storage drive 171A-F and may cause the storage drive 171A-F to scan a portion of each memory block to identify the memory blocks that store control information for the storage drives 171A-F. The storage drives 171A-F may respond by sending a response message to the storage array controller 110A-D that includes the location of control information for the storage drive 171A-F. Responsive to receiving the response message, storage array controllers 110A-D may issue a request to read data stored at the address associated with the location of control information for the storage drives 171A-F.

In other implementations, the storage array controllers 110A-D may further offload device management responsibilities from storage drives 171A-F by performing, in response to receiving the control information, a storage drive management operation. A storage drive management operation may include, for example, an operation that is typically performed by the storage drive 171A-F (e.g., the controller (not shown) associated with a particular storage drive 171A-F). A storage drive management operation may include, for example, ensuring that data is not written to failed memory blocks within the storage drive 171A-F, ensuring that data is written to memory blocks within the storage drive 171A-F in such a way that adequate wear leveling is achieved, and so forth.

In implementations, storage array 102A-B may implement two or more storage array controllers 110A-D. For example, storage array 102A may include storage array controllers 110A and storage array controllers 110B. At a given instance, a single storage array controller 110A-D (e.g., storage array controller 110A) of a storage system 100 may be designated with primary status (also referred to as "primary controller" herein), and other storage array controllers 110A-D (e.g., storage array controller 110A) may be designated with secondary status (also referred to as "secondary controller" herein). The primary controller may have particular rights, such as permission to alter data in persistent storage resource 170A-B (e.g., writing data to persistent storage resource 170A-B). At least some of the rights of the primary controller may supersede the rights of the secondary controller. For instance, the secondary controller may not have permission to alter data in persistent storage resource 170A-B when the primary controller has the right. The status of storage array controllers 110A-D may change. For example, storage array controller 110A may be designated with secondary status, and storage array controller 110B may be designated with primary status.

In some implementations, a primary controller, such as storage array controller 110A, may serve as the primary controller for one or more storage arrays 102A-B, and a second controller, such as storage array controller 110B, may serve as the secondary controller for the one or more storage arrays 102A-B. For example, storage array controller 110A may be the primary controller for storage array 102A and storage array 102B, and storage array controller 110B may be the secondary controller for storage array 102A and 102B. In some implementations, storage array controllers 110C and 110D (also referred to as "storage processing modules") may neither have primary or secondary status. Storage array controllers 110C and 110D, implemented as storage processing modules, may act as a communication interface between the primary and secondary controllers (e.g., storage array controllers 110A and 110B, respectively) and storage array 102B. For example, storage array controller 110A of storage array 102A may send a write request, via SAN 158, to storage array 102B. The write request may be received by both storage array controllers 110C and 110D of storage array 102B. Storage array controllers 110C and 110D facilitate the communication, e.g., send the write request to the appropriate storage drive 171A-F. It may be noted that in some implementations storage processing modules may be used to increase the number of storage drives controlled by the primary and secondary controllers.

In implementations, storage array controllers 110A-D are communicatively coupled, via a midplane (not shown), to one or more storage drives 171A-F and to one or more NVRAM devices (not shown) that are included as part of a storage array 102A-B. The storage array controllers 110A-D may be coupled to the midplane via one or more data communication links and the midplane may be coupled to the storage drives 171A-F and the NVRAM devices via one or more data communications links. The data communications links described herein are collectively illustrated by data communications links 108A-D and may include a Peripheral Component Interconnect Express ('PCIe') bus, for example.

Figure 1B:
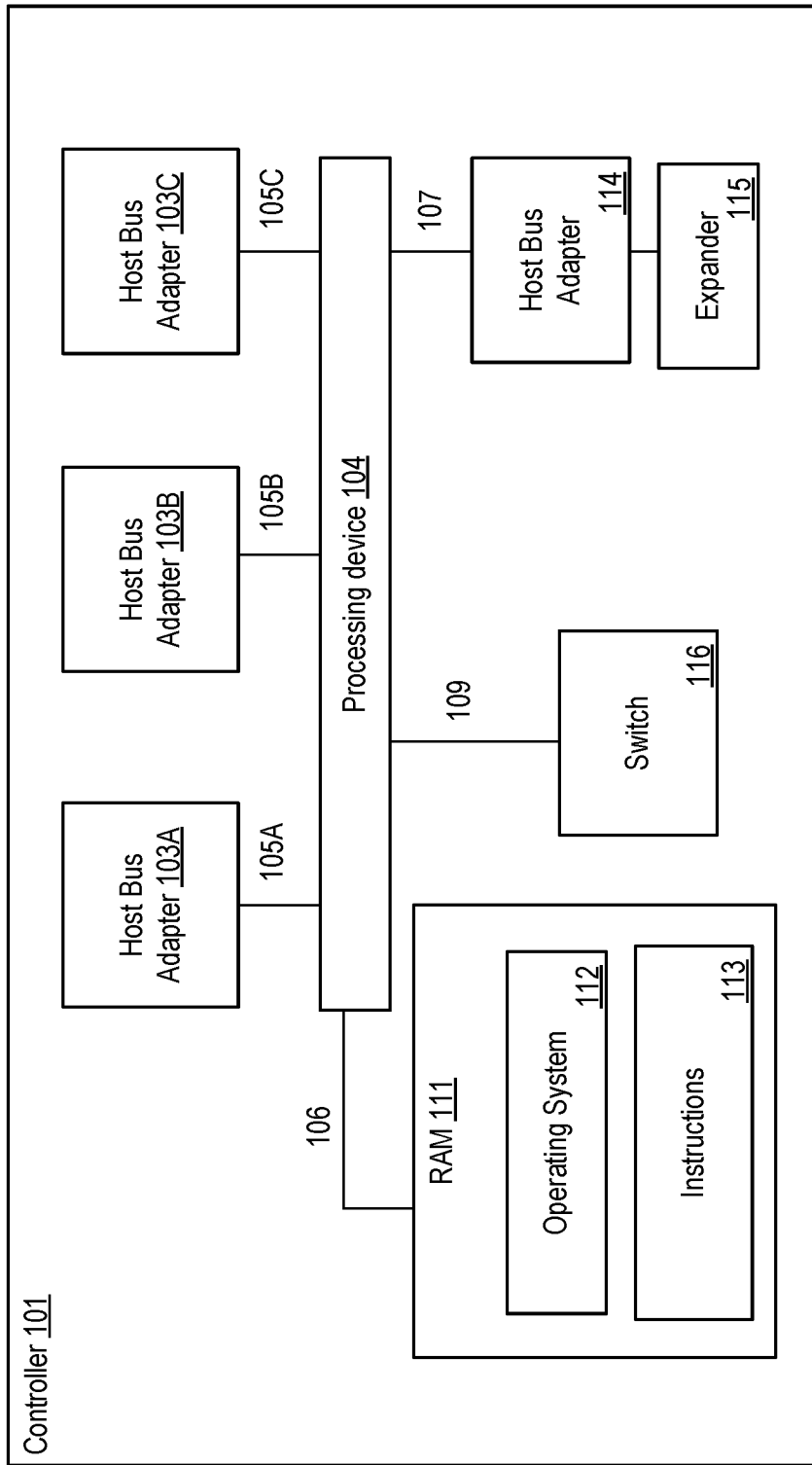
FIG. 1B illustrates a second example system for data storage in accordance with some implementations.

FIG. 1B illustrates an example system for data storage, in accordance with some implementations. Storage array controller 101 illustrated in FIG. 1B may be similar to the storage array controllers 110A-D described with respect to FIG. 1A. In one example, storage array controller 101 may be similar to storage array controller 110A or storage array controller 110B. Storage array controller 101 includes numerous elements for purposes of illustration rather than limitation. It may be noted that storage array controller 101 may include the same, more, or fewer elements configured in the same or different manner in other implementations. It may be noted that elements of FIG. 1A may be included below to help illustrate features of storage array controller 101.

Storage array controller 101 may include one or more processing devices 104 and random access memory ('RAM') 111. Processing device 104 (or controller 101) represents one or more general-purpose processing devices such as a microprocessor, central processing unit, or the like. More particularly, the processing device 104 (or controller 101) may be a complex instruction set computing ('CISC') microprocessor, reduced instruction set computing ('RISC') microprocessor, very long instruction word ('VLIW') microprocessor, or a processor implementing other instruction sets or processors implementing a combination of instruction sets. The processing device 104 (or controller 101) may also be one or more special-purpose processing devices such as an ASIC, an FPGA, a digital signal processor ('DSP'), network processor, or the like.

The processing device 104 may be connected to the RAM 111 via a data communications link 106, which may be embodied as a high speed memory bus such as a Double-Data Rate 4 ('DDR4') bus. Stored in RAM 111 is an operating system 112. In some implementations, instructions 113 are stored in RAM 111. Instructions 113 may include computer program instructions for performing operations in in a direct-mapped flash storage system. In one embodiment, a direct-mapped flash storage system is one that that addresses data blocks within flash drives directly and without an address translation performed by the storage controllers of the flash drives.

In implementations, storage array controller 101 includes one or more host bus adapters 103A-C that are coupled to the processing device 104 via a data communications link 105A-C. In implementations, host bus adapters 103A-C may be computer hardware that connects a host system (e.g., the storage array controller) to other network and storage arrays. In some examples, host bus adapters 103A-C may be a Fibre Channel adapter that enables the storage array controller 101 to connect to a SAN, an Ethernet adapter that enables the storage array controller 101 to connect to a LAN, or the like. Host bus adapters 103A-C may be coupled to the processing device 104 via a data communications link 105A-C such as, for example, a PCIe bus.

In implementations, storage array controller 101 may include a host bus adapter 114 that is coupled to an expander 115. The expander 115 may be used to attach a host system to a larger number of storage drives. The expander 115 may, for example, be a SAS expander utilized to enable the host bus adapter 114 to attach to storage drives in an implementation where the host bus adapter 114 is embodied as a SAS controller.

In implementations, storage array controller 101 may include a switch 116 coupled to the processing device 104 via a data communications link 109. The switch 116 may be a computer hardware device that can create multiple endpoints out of a single endpoint, thereby enabling multiple devices to share a single endpoint. The switch 116 may, for example, be a PCIe switch that is coupled to a PCIe bus (e.g., data communications link 109) and presents multiple PCIe connection points to the midplane.

In implementations, storage array controller 101 includes a data communications link 107 for coupling the storage array controller 101 to other storage array controllers. In some examples, data communications link 107 may be a QuickPath Interconnect (QPI) interconnect.

A traditional storage system that uses traditional flash drives may implement a process across the flash drives that are part of the traditional storage system. For example, a higher level process of the storage system may initiate and control a process across the flash drives. However, a flash drive of the traditional storage system may include its own storage controller that also performs the process. Thus, for the traditional storage system, a higher level process (e.g., initiated by the storage system) and a lower level process (e.g., initiated by a storage controller of the storage system) may both be performed.

To resolve various deficiencies of a traditional storage system, operations may be performed by higher level processes and not by the lower level processes. For example, the flash storage system may include flash drives that do not include storage controllers that provide the process. Thus, the operating system of the flash storage system itself may initiate and control the process. This may be accomplished by a direct-mapped flash storage system that addresses data blocks within the flash drives directly and without an address translation performed by the storage controllers of the flash drives.

In implementations, storage drive 171A-F may be one or more zoned storage devices. In some implementations, the one or more zoned storage devices may be a shingled HDD. In implementations, the one or more storage devices may be a flash-based SSD. In a zoned storage device, a zoned namespace on the zoned storage device can be addressed by groups of blocks that are grouped and aligned by a natural size, forming a number of addressable zones. In implementations utilizing an SSD, the natural size may be based on the erase block size of the SSD. In some implementations, the zones of the zoned storage device may be defined during initialization of the zoned storage device. In implementations, the zones may be defined dynamically as data is written to the zoned storage device.

In some implementations, zones may be heterogeneous, with some zones each being a page group and other zones being multiple page groups. In implementations, some zones may correspond to an erase block and other zones may correspond to multiple erase blocks. In an implementation, zones may be any combination of differing numbers of pages in page groups and/or erase blocks, for heterogeneous mixes of programming modes, manufacturers, product types and/ or product generations of storage devices, as applied to heterogeneous assemblies, upgrades, distributed storages, etc. In some implementations, zones may be defined as having usage characteristics, such as a property of supporting data with particular kinds of longevity (very short lived or very long lived, for example). These properties could be used by a zoned storage device to determine how the zone will be managed over the zone's expected lifetime.

It should be appreciated that a zone is a virtual construct. Any particular zone may not have a fixed location at a storage device. Until allocated, a zone may not have any location at a storage device. A zone may correspond to a number representing a chunk of virtually allocatable space that is the size of an erase block or other block size in various implementations. When the system allocates or opens a zone, zones get allocated to flash or other solid-state storage memory and, as the system writes to the zone, pages are written to that mapped flash or other solid-state storage memory of the zoned storage device. When the system closes the zone, the associated erase block(s) or other sized block(s) are completed. At some point in the future, the system may delete a zone which will free up the zone's allocated space. During its lifetime, a zone may be moved around to different locations of the zoned storage device, e.g., as the zoned storage device does internal maintenance.

In implementations, the zones of the zoned storage device may be in different states. A zone may be in an empty state in which data has not been stored at the zone. An empty zone may be opened explicitly, or implicitly by writing data to the zone. This is the initial state for zones on a fresh zoned storage device, but may also be the result of a zone reset. In some implementations, an empty zone may have a designated location within the flash memory of the zoned storage device. In an implementation, the location of the empty zone may be chosen when the zone is first opened or first written to (or later if writes are buffered into memory). A zone may be in an open state either implicitly or explicitly, where a zone that is in an open state may be written to store data with write or append commands. In an implementation, a zone that is in an open state may also be written to using a copy command that copies data from a different zone. In some implementations, a zoned storage device may have a limit on the number of open zones at a particular time.

A zone in a closed state is a zone that has been partially written to, but has entered a closed state after issuing an explicit close operation. A zone in a closed state may be left available for future writes, but may reduce some of the run-time overhead consumed by keeping the zone in an open state. In implementations, a zoned storage device may have a limit on the number of closed zones at a particular time. A zone in a full state is a zone that is storing data and can no longer be written to. A zone may be in a full state either after writes have written data to the entirety of the zone or as a result of a zone finish operation. Prior to a finish operation, a zone may or may not have been completely written. After a finish operation, however, the zone may not be opened a written to further without first performing a zone reset operation.

The mapping from a zone to an erase block (or to a shingled track in an HDD) may be arbitrary, dynamic, and hidden from view. The process of opening a zone may be an operation that allows a new zone to be dynamically mapped to underlying storage of the zoned storage device, and then allows data to be written through appending writes into the zone until the zone reaches capacity. The zone can be finished at any point, after which further data may not be written into the zone. When the data stored at the zone is no longer needed, the zone can be reset which effectively deletes the zone's content from the zoned storage device, making the physical storage held by that zone available for the subsequent storage of data. Once a zone has been written and finished, the zoned storage device ensures that the data stored at the zone is not lost until the zone is reset. In the time between writing the data to the zone and the resetting of the zone, the zone may be moved around between shingle tracks or erase blocks as part of maintenance operations within the zoned storage device, such as by copying data to keep the data refreshed or to handle memory cell aging in an SSD.

In implementations utilizing an HDD, the resetting of the zone may allow the shingle tracks to be allocated to a new, opened zone that may be opened at some point in the future. In implementations utilizing an SSD, the resetting of the zone may cause the associated physical erase block(s) of the zone to be erased and subsequently reused for the storage of data. In some implementations, the zoned storage device may have a limit on the number of open zones at a point in time to reduce the amount of overhead dedicated to keeping zones open.

The operating system of the flash storage system may identify and maintain a list of allocation units across multiple flash drives of the flash storage system. The allocation units may be entire erase blocks or multiple erase blocks. The operating system may maintain a map or address range that directly maps addresses to erase blocks of the flash drives of the flash storage system.

Direct mapping to the erase blocks of the flash drives may be used to rewrite data and erase data. For example, the operations may be performed on one or more allocation units that include a first data and a second data where the first data is to be retained and the second data is no longer being used by the flash storage system. The operating system may initiate the process to write the first data to new locations within other allocation units and erasing the second data and marking the allocation units as being available for use for subsequent data. Thus, the process may only be performed by the higher level operating system of the flash storage system without an additional lower level process being performed by controllers of the flash drives.

Advantages of the process being performed only by the operating system of the flash storage system include increased reliability of the flash drives of the flash storage system as unnecessary or redundant write operations are not being performed during the process. One possible point of novelty here is the concept of initiating and controlling the process at the operating system of the flash storage system. In addition, the process can be controlled by the operating system across multiple flash drives. This is contrast to the process being performed by a storage controller of a flash drive.

A storage system can consist of two storage array controllers that share a set of drives for failover purposes, or it could consist of a single storage array controller that provides a storage service that utilizes multiple drives, or it could consist of a distributed network of storage array controllers each with some number of drives or some amount of Flash storage where the storage array controllers in the network collaborate to provide a complete storage service and collaborate on various aspects of a storage service including storage allocation and garbage collection.

Figure 1C:
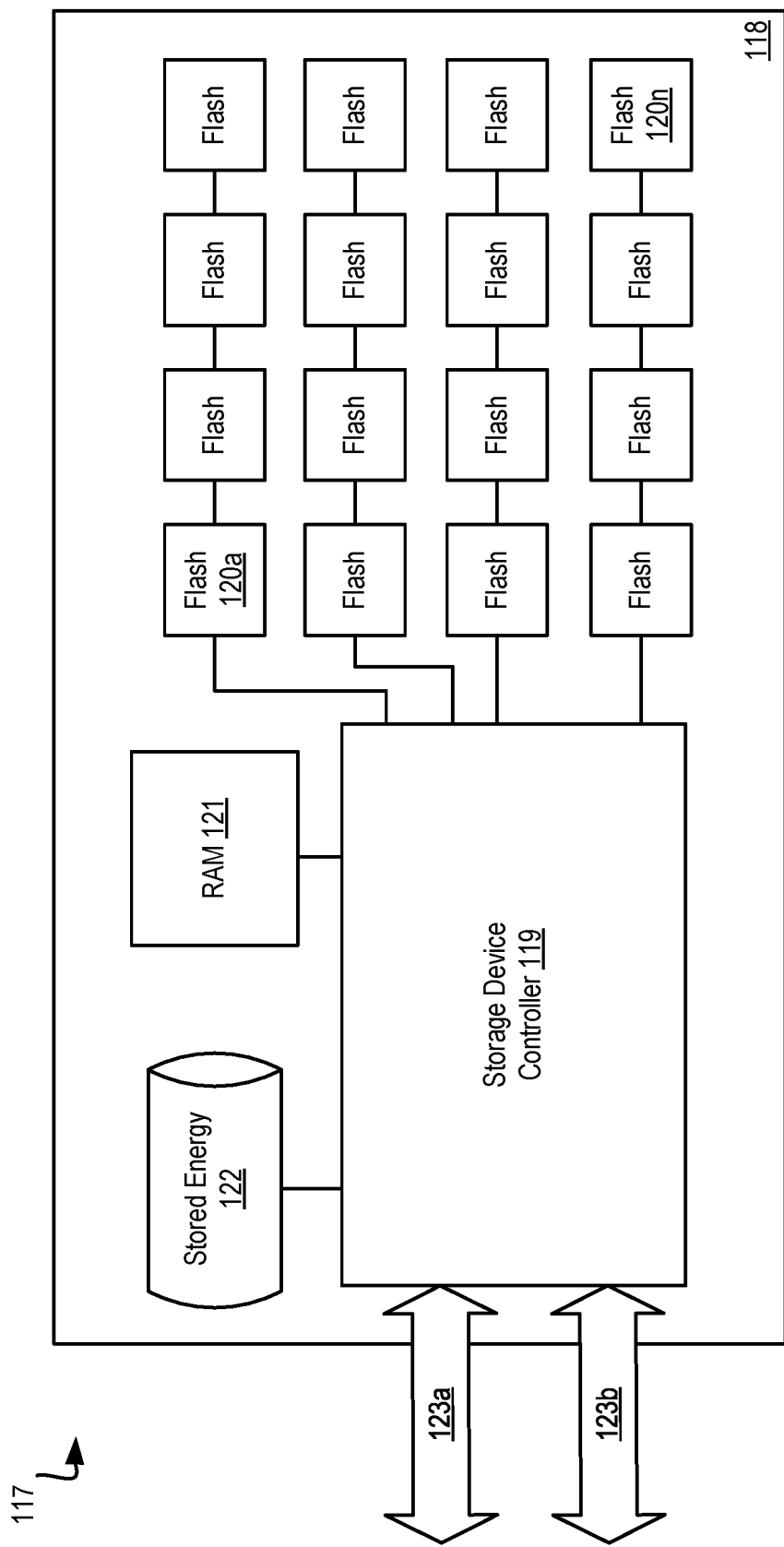
FIG. 1C illustrates a third example system for data storage in accordance with some implementations.

FIG. 1C illustrates a third example system 117 for data storage in accordance with some implementations. System 117 (also referred to as "storage system" herein) includes numerous elements for purposes of illustration rather than limitation. It may be noted that system 117 may include the same, more, or fewer elements configured in the same or different manner in other implementations.

In one embodiment, system 117 includes a dual Peripheral Component Interconnect ('PCI') flash storage device 118 with separately addressable fast write storage. System 117 may include a storage device controller 119. In one embodiment, storage device controller 119A-D may be a CPU, ASIC, FPGA, or any other circuitry that may implement control structures necessary according to the present disclosure. In one embodiment, system 117 includes flash memory devices (e.g., including flash memory devices 120a-n), operatively coupled to various channels of the storage device controller 119. Flash memory devices 120a-n, may be presented to the controller 119A-D as an addressable collection of Flash pages, erase blocks, and/or control elements sufficient to allow the storage device controller 119A-D to program and retrieve various aspects of the Flash. In one embodiment, storage device controller 119A-D may perform operations on flash memory devices 120a-n including storing and retrieving data content of pages, arranging and erasing any blocks, tracking statistics related to the use and reuse of Flash memory pages, erase blocks, and cells, tracking and predicting error codes and faults within the Flash memory, controlling voltage levels associated with programming and retrieving contents of Flash cells, etc.

In one embodiment, system 117 may include RAM 121 to store separately addressable fast-write data. In one embodiment, RAM 121 may be one or more separate discrete devices. In another embodiment, RAM 121 may be integrated into storage device controller 119A-D or multiple storage device controllers. The RAM 121 may be utilized for other purposes as well, such as temporary program memory for a processing device (e.g., a CPU) in the storage device controller 119.

In one embodiment, system 117 may include a stored energy device 122, such as a rechargeable battery or a capacitor. Stored energy device 122 may store energy sufficient to power the storage device controller 119, some amount of the RAM (e.g., RAM 121), and some amount of Flash memory (e.g., Flash memory 120a-120n) for sufficient time to write the contents of RAM to Flash memory. In one embodiment, storage device controller 119A-D may write the contents of RAM to Flash Memory if the storage device controller detects loss of external power.

In one embodiment, system 117 includes two data communications links 123a, 123b. In one embodiment, data communications links 123a, 123b may be PCI interfaces. In another embodiment, data communications links 123a, 123b may be based on other communications standards (e.g., HyperTransport, InfiniBand, etc.). Data communications links 123a, 123b may be based on non-volatile memory express ('NVMe') or NVMe over fabrics ('NVMf') specifications that allow external connection to the storage device controller 119A-D from other components in the storage system 117. It should be noted that data communications links may be interchangeably referred to herein as PCI buses for convenience.

System 117 may also include an external power source (not shown), which may be provided over one or both data communications links 123a, 123b, or which may be provided separately. An alternative embodiment includes a separate Flash memory (not shown) dedicated for use in storing the content of RAM 121. The storage device controller 119A-D may present a logical device over a PCI bus which may include an addressable fast-write logical device, or a distinct part of the logical address space of the storage device 118, which may be presented as PCI memory or as persistent storage. In one embodiment, operations to store into the device are directed into the RAM 121. On power failure, the storage device controller 119A-D may write stored content associated with the addressable fast-write logical storage to Flash memory (e.g., Flash memory 120a-n) for long-term persistent storage.

In one embodiment, the logical device may include some presentation of some or all of the content of the Flash memory devices 120a-n, where that presentation allows a storage system including a storage device 118 (e.g., storage system 117) to directly address Flash memory pages and directly reprogram erase blocks from storage system components that are external to the storage device through the PCI bus. The presentation may also allow one or more of the external components to control and retrieve other aspects of the Flash memory including some or all of: tracking statistics related to use and reuse of Flash memory pages, erase blocks, and cells across all the Flash memory devices; tracking and predicting error codes and faults within and across the Flash memory devices; controlling voltage levels associated with programming and retrieving contents of Flash cells; etc.

In one embodiment, the stored energy device 122 may be sufficient to ensure completion of in-progress operations to the Flash memory devices 120a-120n stored energy device 122 may power storage device controller 119A-D and associated Flash memory devices (e.g., 120a-n) for those operations, as well as for the storing of fast-write RAM to Flash memory. Stored energy device 122 may be used to store accumulated statistics and other parameters kept and tracked by the Flash memory devices 120a-n and/or the storage device controller 119. Separate capacitors or stored energy devices (such as smaller capacitors near or embedded within the Flash memory devices themselves) may be used for some or all of the operations described herein.

Various schemes may be used to track and optimize the life span of the stored energy component, such as adjusting voltage levels over time, partially discharging the stored energy device 122 to measure corresponding discharge characteristics, etc. If the available energy decreases over time, the effective available capacity of the addressable fast-write storage may be decreased to ensure that it can be written safely based on the currently available stored energy.

Figure 1D:
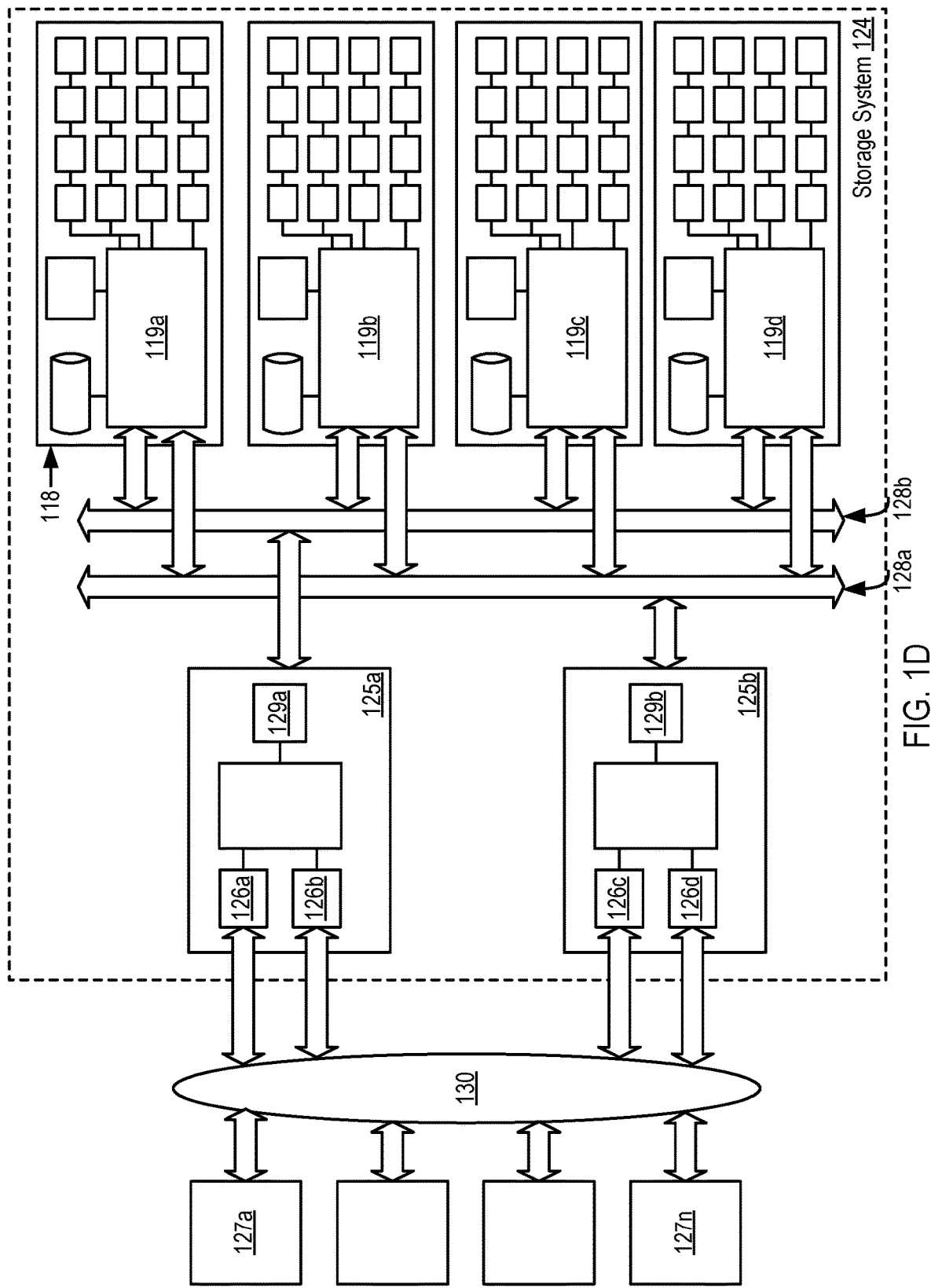
FIG. 1D illustrates a fourth example system for data storage in accordance with some implementations.

FIG. 1D illustrates a third example storage system 124 for data storage in accordance with some implementations. In one embodiment, storage system 124 includes storage controllers 125a, 125b. In one embodiment, storage controllers 125a, 125b are operatively coupled to Dual PCI storage devices. Storage controllers 125a, 125b may be operatively coupled (e.g., via a storage network 130) to some number of host computers 127a-n.

In one embodiment, two storage controllers (e.g., 125a and 125b) provide storage services, such as a SCS) block storage array, a file server, an object server, a database or data analytics service, etc. The storage controllers 125a, 125b may provide services through some number of network interfaces (e.g., 126a-d) to host computers 127a-n outside of the storage system 124. Storage controllers 125a, 125b may provide integrated services or an application entirely within the storage system 124, forming a converged storage and compute system. The storage controllers 125a, 125b may utilize the fast write memory within or across storage devices 119a-d to journal in progress operations to ensure the operations are not lost on a power failure, storage controller removal, storage controller or storage system shutdown, or some fault of one or more software or hardware components within the storage system 124.

In one embodiment, storage controllers 125a, 125b operate as PCI masters to one or the other PCI buses 128a, 128b. In another embodiment, 128a and 128b may be based on other communications standards (e.g., HyperTransport, InfiniBand, etc.). Other storage system embodiments may operate storage controllers 125a, 125b as multi-masters for both PCI buses 128a, 128b. Alternately, a PCI/NVMe/NVMf switching infrastructure or fabric may connect multiple storage controllers. Some storage system embodiments may allow storage devices to communicate with each other directly rather than communicating only with storage controllers. In one embodiment, a storage device controller 119a may be operable under direction from a storage controller 125a to synthesize and transfer data to be stored into Flash memory devices from data that has been stored in RAM (e.g., RAM 121 of FIG. 1C). For example, a recalculated version of RAM content may be transferred after a storage controller has determined that an operation has fully committed across the storage system, or when fast-write memory on the device has reached a certain used capacity, or after a certain amount of time, to ensure improve safety of the data or to release addressable fast-write capacity for reuse. This mechanism may be used, for example, to avoid a second transfer over a bus (e.g., 128a, 128b) from the storage controllers 125a, 125b. In one embodiment, a recalculation may include compressing data, attaching indexing or other metadata, combining multiple data segments together, performing erasure code calculations, etc.

In one embodiment, under direction from a storage controller 125a, 125b, a storage device controller 119a, 119b may be operable to calculate and transfer data to other storage devices from data stored in RAM (e.g., RAM 121 of FIG. 1C) without involvement of the storage controllers 125a, 125b. This operation may be used to mirror data stored in one storage controller 125a to another storage controller 125b, or it could be used to offload compression, data aggregation, and/or erasure coding calculations and transfers to storage devices to reduce load on storage controllers or the storage controller interface 129a, 129b to the PCI bus 128a, 128b.

A storage device controller 119A-D may include mechanisms for implementing high availability primitives for use by other parts of a storage system external to the Dual PCI storage device 118. For example, reservation or exclusion primitives may be provided so that, in a storage system with two storage controllers providing a highly available storage service, one storage controller may prevent the other storage controller from accessing or continuing to access the storage device. This could be used, for example, in cases where one controller detects that the other controller is not functioning properly or where the interconnect between the two storage controllers may itself not be functioning properly.

In one embodiment, a storage system for use with Dual PCI direct mapped storage devices with separately addressable fast write storage includes systems that manage erase blocks or groups of erase blocks as allocation units for storing data on behalf of the storage service, or for storing metadata (e.g., indexes, logs, etc.) associated with the storage service, or for proper management of the storage system itself. Flash pages, which may be a few kilobytes in size, may be written as data arrives or as the storage system is to persist data for long intervals of time (e.g., above a defined threshold of time). To commit data more quickly, or to reduce the number of writes to the Flash memory devices, the storage controllers may first write data into the separately addressable fast write storage on one more storage devices.

In one embodiment, the storage controllers 125a, 125b may initiate the use of erase blocks within and across storage devices (e.g., 118) in accordance with an age and expected remaining lifespan of the storage devices, or based on other statistics. The storage controllers 125a, 125b may initiate garbage collection and data migration data between storage devices in accordance with pages that are no longer needed as well as to manage Flash page and erase block lifespans and to manage overall system performance.

In one embodiment, the storage system 124 may utilize mirroring and/or erasure coding schemes as part of storing data into addressable fast write storage and/or as part of writing data into allocation units associated with erase blocks. Erasure codes may be used across storage devices, as well as within erase blocks or allocation units, or within and across Flash memory devices on a single storage device, to provide redundancy against single or multiple storage device failures or to protect against internal corruptions of Flash memory pages resulting from Flash memory operations or from degradation of Flash memory cells. Mirroring and erasure coding at various levels may be used to recover from multiple types of failures that occur separately or in combination.

The embodiments depicted with reference to FIGS. 2A-G illustrate a storage cluster that stores user data, such as user data originating from one or more user or client systems or other sources external to the storage cluster. The storage cluster distributes user data across storage nodes housed within a chassis, or across multiple chassis, using erasure coding and redundant copies of metadata. Erasure coding refers to a method of data protection or reconstruction in which data is stored across a set of different locations, such as disks, storage nodes or geographic locations. Flash memory is one type of solid-state memory that may be integrated with the embodiments, although the embodiments may be extended to other types of solid-state memory or other storage medium, including non-solid state memory. Control of storage locations and workloads are distributed across the storage locations in a clustered peer-to-peer system. Tasks such as mediating communications between the various storage nodes, detecting when a storage node has become unavailable, and balancing I/Os (inputs and outputs) across the various storage nodes, are all handled on a distributed basis. Data is laid out or distributed across multiple storage nodes in data fragments or stripes that support data recovery in some embodiments. Ownership of data can be reassigned within a cluster, independent of input and output patterns. This architecture described in more detail below allows a storage node in the cluster to fail, with the system remaining operational, since the data can be reconstructed from other storage nodes and thus remain available for input and output operations. In various embodiments, a storage node may be referred to as a cluster node, a blade, or a server.

The storage cluster may be contained within a chassis, i.e., an enclosure housing one or more storage nodes. A mechanism to provide power to each storage node, such as a power distribution bus, and a communication mechanism, such as a communication bus that enables communication between the storage nodes are included within the chassis. The storage cluster can run as an independent system in one location according to some embodiments. In one embodiment, a chassis contains at least two instances of both the power distribution and the communication bus which may be enabled or disabled independently. The internal communication bus may be an Ethernet bus, however, other technologies such as PCIe, InfiniBand, and others, are equally suitable. The chassis provides a port for an external communication bus for enabling communication between multiple chassis, directly or through a switch, and with client systems. The external communication may use a technology such as Ethernet, InfiniBand, Fibre Channel, etc. In some embodiments, the external communication bus uses different communication bus technologies for inter-chassis and client communication. If a switch is deployed within or between chassis, the switch may act as a translation between multiple protocols or technologies. When multiple chassis are connected to define a storage cluster, the storage cluster may be accessed by a client using either proprietary interfaces or standard interfaces such as network file system ('NFS'), common internet file system ('CIFS'), small computer system interface ('SCSI') or hypertext transfer protocol ('HTTP'). Translation from the client protocol may occur at the switch, chassis external communication bus or within each storage node. In some embodiments, multiple chassis may be coupled or connected to each other through an aggregator switch. A portion and/or all of the coupled or connected chassis may be designated as a storage cluster. As discussed above, each chassis can have multiple blades, each blade has a media access control ('MAC') address, but the storage cluster is presented to an external network as having a single cluster IP address and a single MAC address in some embodiments.

Each storage node may be one or more storage servers and each storage server is connected to one or more non-volatile solid state memory units, which may be referred to as storage units or storage devices. One embodiment includes a single storage server in each storage node and between one to eight non-volatile solid state memory units, however this one example is not meant to be limiting. The storage server may include a processor, DRAM and interfaces for the internal communication bus and power distribution for each of the power buses. Inside the storage node, the interfaces and storage unit share a communication bus, e.g., PCI Express, in some embodiments. The non-volatile solid state memory units may directly access the internal communication bus interface through a storage node communication bus, or request the storage node to access the bus interface. The non-volatile solid state memory unit contains an embedded CPU, solid state storage controller, and a quantity of solid state mass storage, e.g., between 2-32 terabytes ('TB') in some embodiments. An embedded volatile storage medium, such as DRAM, and an energy reserve apparatus are included in the non-volatile solid state memory unit. In some embodiments, the energy reserve apparatus is a capacitor, super-capacitor, or battery that enables transferring a subset of DRAM contents to a stable storage medium in the case of power loss. In some embodiments, the non-volatile solid state memory unit is constructed with a storage class memory, such as phase change or magnetoresistive random access memory ('MRAM') that substitutes for DRAM and enables a reduced power hold-up apparatus.

One of many features of the storage nodes and non-volatile solid state storage is the ability to proactively rebuild data in a storage cluster. The storage nodes and non-volatile solid state storage can determine when a storage node or non-volatile solid state storage in the storage cluster is unreachable, independent of whether there is an attempt to read data involving that storage node or non-volatile solid state storage. The storage nodes and non-volatile solid state storage then cooperate to recover and rebuild the data in at least partially new locations. This constitutes a proactive rebuild, in that the system rebuilds data without waiting until the data is needed for a read access initiated from a client system employing the storage cluster. These and further details of the storage memory and operation thereof are discussed below.

Figure 2A:
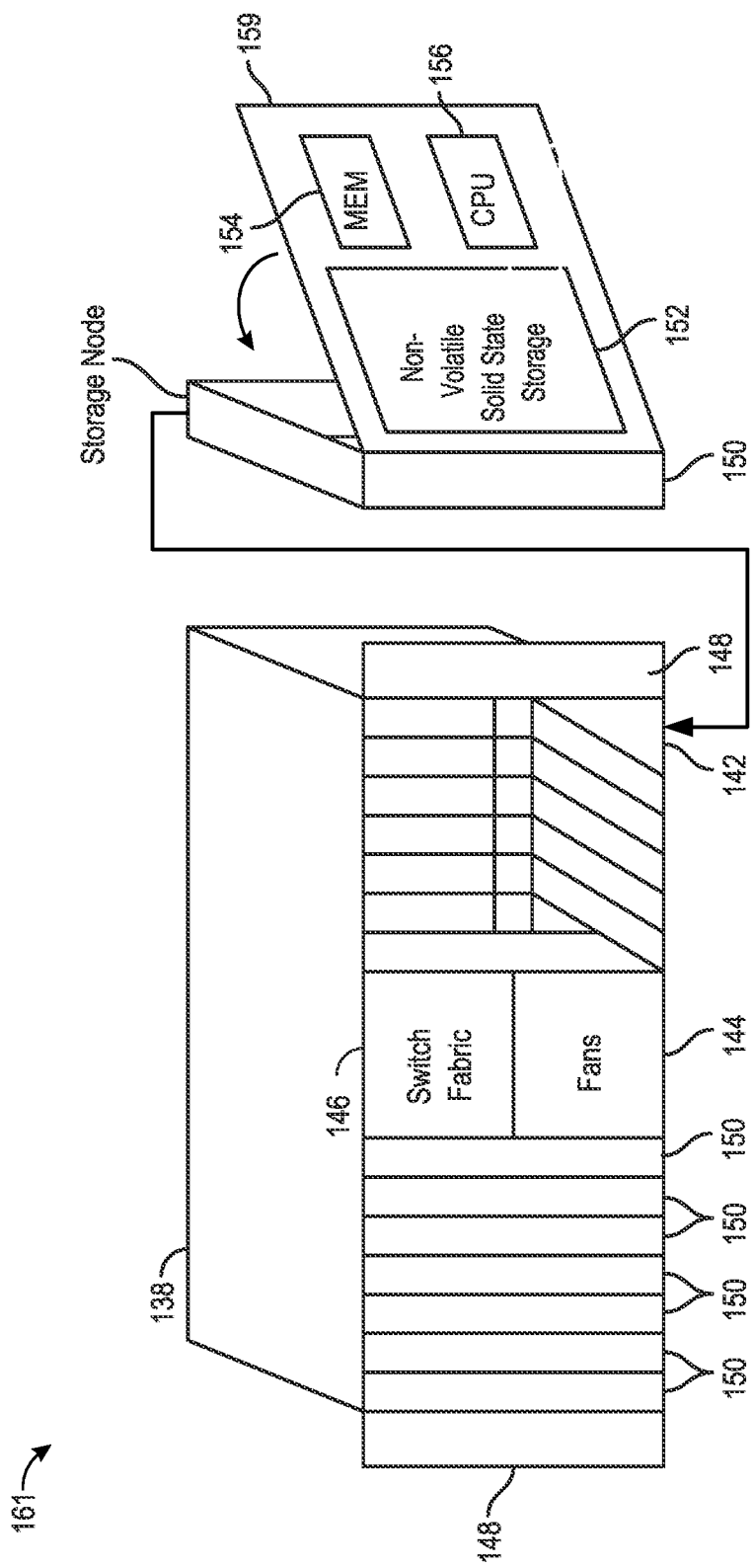
FIG. 2A is a perspective view of a storage cluster with multiple storage nodes and internal storage coupled to each storage node to provide network attached storage, in accordance with some embodiments.

FIG. 2A is a perspective view of a storage cluster 161, with multiple storage nodes 150 and internal solid-state memory coupled to each storage node to provide network attached storage or storage area network, in accordance with some embodiments. A network attached storage, storage area network, or a storage cluster, or other storage memory, could include one or more storage clusters 161, each having one or more storage nodes 150, in a flexible and reconfigurable arrangement of both the physical components and the amount of storage memory provided thereby. The storage cluster 161 is designed to fit in a rack, and one or more racks can be set up and populated as desired for the storage memory. The storage cluster 161 has a chassis 138 having multiple slots 142. It should be appreciated that chassis 138 may be referred to as a housing, enclosure, or rack unit. In one embodiment, the chassis 138 has fourteen slots 142, although other numbers of slots are readily devised. For example, some embodiments have four slots, eight slots, sixteen slots, thirty-two slots, or other suitable number of slots. Each slot 142 can accommodate one storage node 150 in some embodiments. Chassis 138 includes flaps 148 that can be utilized to mount the chassis 138 on a rack. Fans 144 provide air circulation for cooling of the storage nodes 150 and components thereof, although other cooling components could be used, or an embodiment could be devised without cooling components. A switch fabric 146 couples storage nodes 150 within chassis 138 together and to a network for communication to the memory. In an embodiment depicted in herein, the slots 142 to the left of the switch fabric 146 and fans 144 are shown occupied by storage nodes 150, while the slots 142 to the right of the switch fabric 146 and fans 144 are empty and available for insertion of storage node 150 for illustrative purposes. This configuration is one example, and one or more storage nodes 150 could occupy the slots 142 in various further arrangements. The storage node arrangements need not be sequential or adjacent in some embodiments. Storage nodes 150 are hot pluggable, meaning that a storage node 150 can be inserted into a slot 142 in the chassis 138, or removed from a slot 142, without stopping or powering down the system. Upon insertion or removal of storage node 150 from slot 142, the system automatically reconfigures in order to recognize and adapt to the change. Reconfiguration, in some embodiments, includes restoring redundancy and/or rebalancing data or load.

Each storage node 150 can have multiple components. In the embodiment shown here, the storage node 150 includes a printed circuit board 159 populated by a CPU 156, i.e., processor, a memory 154 coupled to the CPU 156, and a non-volatile solid state storage 152 coupled to the CPU 156, although other mountings and/or components could be used in further embodiments. The memory 154 has instructions which are executed by the CPU 156 and/or data operated on by the CPU 156. As further explained below, the non-volatile solid state storage 152 includes flash or, in further embodiments, other types of solid-state memory.

Referring to FIG. 2A, storage cluster 161 is scalable, meaning that storage capacity with non-uniform storage sizes is readily added, as described above. One or more storage nodes 150 can be plugged into or removed from each chassis and the storage cluster self-configures in some embodiments. Plug-in storage nodes 150, whether installed in a chassis as delivered or later added, can have different sizes. For example, in one embodiment a storage node 150 can have any multiple of 4 TB, e.g., 8 TB, 12 TB, 16 TB, 32 TB, etc. In further embodiments, a storage node 150 could have any multiple of other storage amounts or capacities. Storage capacity of each storage node 150 is broadcast, and influences decisions of how to stripe the data. For maximum storage efficiency, an embodiment can self-configure as wide as possible in the stripe, subject to a predetermined requirement of continued operation with loss of up to one, or up to two, non-volatile solid state storage 152 units or storage nodes 150 within the chassis.

Figure 2B:
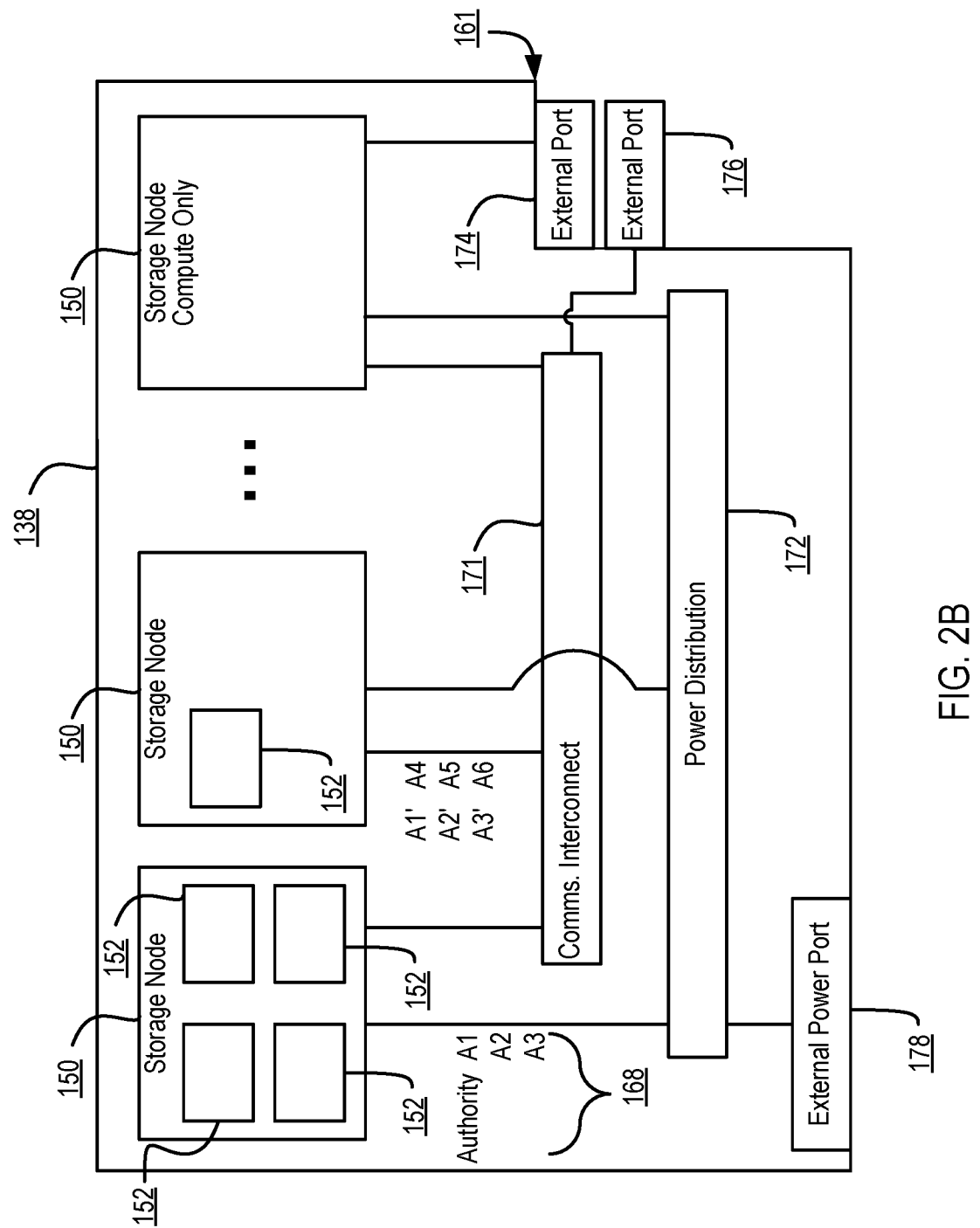
FIG. 2B is a block diagram showing an interconnect switch coupling multiple storage nodes in accordance with some embodiments.

FIG. 2B is a block diagram showing a communications interconnect 173 and power distribution bus 172 coupling multiple storage nodes 150. Referring back to FIG. 2A, the communications interconnect 173 can be included in or implemented with the switch fabric 146 in some embodiments. Where multiple storage clusters 161 occupy a rack, the communications interconnect 173 can be included in or implemented with a top of rack switch, in some embodiments. As illustrated in FIG. 2B, storage cluster 161 is enclosed within a single chassis 138. External port 176 is coupled to storage nodes 150 through communications interconnect 173, while external port 174 is coupled directly to a storage node. External power port 178 is coupled to power distribution bus 172. Storage nodes 150 may include varying amounts and differing capacities of non-volatile solid state storage 152 as described with reference to FIG. 2A. In addition, one or more storage nodes 150 may be a compute only storage node as illustrated in FIG. 2B. Authorities 168 are implemented on the non-volatile solid state storage 152, for example as lists or other data structures stored in memory. In some embodiments the authorities are stored within the non-volatile solid state storage 152 and supported by software executing on a controller or other processor of the non-volatile solid state storage 152. In a further embodiment, authorities 168 are implemented on the storage nodes 150, for example as lists or other data structures stored in the memory 154 and supported by software executing on the CPU 156 of the storage node 150. Authorities 168 control how and where data is stored in the non-volatile solid state storage 152 in some embodiments. This control assists in determining which type of erasure coding scheme is applied to the data, and which storage nodes 150 have which portions of the data. Each authority 168 may be assigned to a non-volatile solid state storage 152. Each authority may control a range of inode numbers, segment numbers, or other data identifiers which are assigned to data by a file system, by the storage nodes 150, or by the non-volatile solid state storage 152, in various embodiments.

Every piece of data, and every piece of metadata, has redundancy in the system in some embodiments. In addition, every piece of data and every piece of metadata has an owner, which may be referred to as an authority. If that authority is unreachable, for example through failure of a storage node, there is a plan of succession for how to find that data or that metadata. In various embodiments, there are redundant copies of authorities 168. Authorities 168 have a relationship to storage nodes 150 and non-volatile solid state storage 152 in some embodiments. Each authority 168, covering a range of data segment numbers or other identifiers of the data, may be assigned to a specific non-volatile solid state storage 152. In some embodiments the authorities 168 for all of such ranges are distributed over the non-volatile solid state storage 152 of a storage cluster. Each storage node 150 has a network port that provides access to the non-volatile solid state storage(s) 152 of that storage node 150. Data can be stored in a segment, which is associated with a segment number and that segment number is an indirection for a configuration of a RAID (redundant array of independent disks) stripe in some embodiments. The assignment and use of the authorities 168 thus establishes an indirection to data. Indirection may be referred to as the ability to reference data indirectly, in this case via an authority 168, in accordance with some embodiments. A segment identifies a set of non-volatile solid state storage 152 and a local identifier into the set of non-volatile solid state storage 152 that may contain data. In some embodiments, the local identifier is an offset into the device and may be reused sequentially by multiple segments. In other embodiments the local identifier is unique for a specific segment and never reused. The offsets in the non-volatile solid state storage 152 are applied to locating data for writing to or reading from the non-volatile solid state storage 152 (in the form of a RAID stripe). Data is striped across multiple units of non-volatile solid state storage 152, which may include or be different from the non-volatile solid state storage 152 having the authority 168 for a particular data segment.

If there is a change in where a particular segment of data is located, e.g., during a data move or a data reconstruction, the authority 168 for that data segment should be consulted, at that non-volatile solid state storage 152 or storage node 150 having that authority 168. In order to locate a particular piece of data, embodiments calculate a hash value for a data segment or apply an inode number or a data segment number. The output of this operation points to a non-volatile solid state storage 152 having the authority 168 for that particular piece of data. In some embodiments there are two stages to this operation. The first stage maps an entity identifier (ID), e.g., a segment number, inode number, or directory number to an authority identifier. This mapping may include a calculation such as a hash or a bit mask. The second stage is mapping the authority identifier to a particular non-volatile solid state storage 152, which may be done through an explicit mapping. The operation is repeatable, so that when the calculation is performed, the result of the calculation repeatably and reliably points to a particular non-volatile solid state storage 152 having that authority 168. The operation may include the set of reachable storage nodes as input. If the set of reachable non-volatile solid state storage units changes the optimal set changes. In some embodiments, the persisted value is the current assignment (which is always true) and the calculated value is the target assignment the cluster will attempt to reconfigure towards. This calculation may be used to determine the optimal non-volatile solid state storage 152 for an authority in the presence of a set of non-volatile solid state storage 152 that are reachable and constitute the same cluster. The calculation also determines an ordered set of peer non-volatile solid state storage 152 that will also record the authority to non-volatile solid state storage mapping so that the authority may be determined even if the assigned non-volatile solid state storage is unreachable. A duplicate or substitute authority 168 may be consulted if a specific authority 168 is unavailable in some embodiments.

With reference to FIGS. 2A and 2B, two of the many tasks of the CPU 156 on a storage node 150 are to break up write data, and reassemble read data. When the system has determined that data is to be written, the authority 168 for that data is located as above. When the segment ID for data is already determined the request to write is forwarded to the non-volatile solid state storage 152 currently determined to be the host of the authority 168 determined from the segment. The host CPU 156 of the storage node 150, on which the non-volatile solid state storage 152 and corresponding authority 168 reside, then breaks up or shards the data and transmits the data out to various non-volatile solid state storage 152. The transmitted data is written as a data stripe in accordance with an erasure coding scheme. In some embodiments, data is requested to be pulled, and in other embodiments, data is pushed. In reverse, when data is read, the authority 168 for the segment ID containing the data is located as described above. The host CPU 156 of the storage node 150 on which the non-volatile solid state storage 152 and corresponding authority 168 reside requests the data from the non-volatile solid state storage and corresponding storage nodes pointed to by the authority. In some embodiments the data is read from flash storage as a data stripe. The host CPU 156 of storage node 150 then reassembles the read data, correcting any errors (if present) according to the appropriate erasure coding scheme, and forwards the reassembled data to the network. In further embodiments, some or all of these tasks can be handled in the non-volatile solid state storage 152. In some embodiments, the segment host requests the data be sent to storage node 150 by requesting pages from storage and then sending the data to the storage node making the original request.

In embodiments, authorities 168 operate to determine how operations will proceed against particular logical elements. Each of the logical elements may be operated on through a particular authority across a plurality of storage controllers of a storage system. The authorities 168 may communicate with the plurality of storage controllers so that the plurality of storage controllers collectively perform operations against those particular logical elements.

In embodiments, logical elements could be, for example, files, directories, object buckets, individual objects, delineated parts of files or objects, other forms of key-value pair databases, or tables. In embodiments, performing an operation can involve, for example, ensuring consistency, structural integrity, and/or recoverability with other operations against the same logical element, reading metadata and data associated with that logical element, determining what data should be written durably into the storage system to persist any changes for the operation, or where metadata and data can be determined to be stored across modular storage devices attached to a plurality of the storage controllers in the storage system.

In some embodiments the operations are token based transactions to efficiently communicate within a distributed system. Each transaction may be accompanied by or associated with a token, which gives permission to execute the transaction. The authorities 168 are able to maintain a pre-transaction state of the system until completion of the operation in some embodiments. The token based communication may be accomplished without a global lock across the system, and also enables restart of an operation in case of a disruption or other failure.

In some systems, for example in UNIX-style file systems, data is handled with an index node or inode, which specifies a data structure that represents an object in a file system. The object could be a file or a directory, for example. Metadata may accompany the object, as attributes such as permission data and a creation timestamp, among other attributes. A segment number could be assigned to all or a portion of such an object in a file system. In other systems, data segments are handled with a segment number assigned elsewhere. For purposes of discussion, the unit of distribution is an entity, and an entity can be a file, a directory or a segment. That is, entities are units of data or metadata stored by a storage system. Entities are grouped into sets called authorities. Each authority has an authority owner, which is a storage node that has the exclusive right to update the entities in the authority. In other words, a storage node contains the authority, and that the authority, in turn, contains entities.

A segment is a logical container of data in accordance with some embodiments. A segment is an address space between medium address space and physical flash locations, i.e., the data segment number, are in this address space. Segments may also contain meta-data, which enable data redundancy to be restored (rewritten to different flash locations or devices) without the involvement of higher level software. In one embodiment, an internal format of a segment contains client data and medium mappings to determine the position of that data. Each data segment is protected, e.g., from memory and other failures, by breaking the segment into a number of data and parity shards, where applicable. The data and parity shards are distributed, i.e., striped, across non-volatile solid state storage 152 coupled to the host CPUs 156 (See FIGS. 2E and 2G) in accordance with an erasure coding scheme. Usage of the term segments refers to the container and its place in the address space of segments in some embodiments. Usage of the term stripe refers to the same set of shards as a segment and includes how the shards are distributed along with redundancy or parity information in accordance with some embodiments.

A series of address-space transformations takes place across an entire storage system. At the top are the directory entries (file names) which link to an inode. Inodes point into medium address space, where data is logically stored. Medium addresses may be mapped through a series of indirect mediums to spread the load of large files, or implement data services like deduplication or snapshots. Medium addresses may be mapped through a series of indirect mediums to spread the load of large files, or implement data services like deduplication or snapshots. Segment addresses are then translated into physical flash locations. Physical flash locations have an address range bounded by the amount of flash in the system in accordance with some embodiments. Medium addresses and segment addresses are logical containers, and in some embodiments use a 128 bit or larger identifier so as to be practically infinite, with a likelihood of reuse calculated as longer than the expected life of the system. Addresses from logical containers are allocated in a hierarchical fashion in some embodiments. Initially, each non-volatile solid state storage 152 unit may be assigned a range of address space. Within this assigned range, the non-volatile solid state storage 152 is able to allocate addresses without synchronization with other non-volatile solid state storage 152.

Data and metadata is stored by a set of underlying storage layouts that are optimized for varying workload patterns and storage devices. These layouts incorporate multiple redundancy schemes, compression formats and index algorithms. Some of these layouts store information about authorities and authority masters, while others store file metadata and file data. The redundancy schemes include error correction codes that tolerate corrupted bits within a single storage device (such as a NAND flash chip), erasure codes that tolerate the failure of multiple storage nodes, and replication schemes that tolerate data center or regional failures. In some embodiments, low density parity check ('LDPC') code is used within a single storage unit. Reed-Solomon encoding is used within a storage cluster, and mirroring is used within a storage grid in some embodiments. Metadata may be stored using an ordered log structured index (such as a Log Structured Merge Tree), and large data may not be stored in a log structured layout.

In order to maintain consistency across multiple copies of an entity, the storage nodes agree implicitly on two things through calculations: (1) the authority that contains the entity, and (2) the storage node that contains the authority. The assignment of entities to authorities can be done by pseudo randomly assigning entities to authorities, by splitting entities into ranges based upon an externally produced key, or by placing a single entity into each authority. Examples of pseudorandom schemes are linear hashing and the Replication Under Scalable Hashing ('RUSH') family of hashes, including Controlled Replication Under Scalable Hashing ('CRUSH'). In some embodiments, pseudo-random assignment is utilized only for assigning authorities to nodes because the set of nodes can change. The set of authorities cannot change so any subjective function may be applied in these embodiments. Some placement schemes automatically place authorities on storage nodes, while other placement schemes rely on an explicit mapping of authorities to storage nodes. In some embodiments, a pseudorandom scheme is utilized to map from each authority to a set of candidate authority owners. A pseudorandom data distribution function related to CRUSH may assign authorities to storage nodes and create a list of where the authorities are assigned. Each storage node has a copy of the pseudorandom data distribution function, and can arrive at the same calculation for distributing, and later finding or locating an authority. Each of the pseudorandom schemes requires the reachable set of storage nodes as input in some embodiments in order to conclude the same target nodes. Once an entity has been placed in an authority, the entity may be stored on physical devices so that no expected failure will lead to unexpected data loss. In some embodiments, rebalancing algorithms attempt to store the copies of all entities within an authority in the same layout and on the same set of machines.

Examples of expected failures include device failures, stolen machines, datacenter fires, and regional disasters, such as nuclear or geological events. Different failures lead to different levels of acceptable data loss. In some embodiments, a stolen storage node impacts neither the security nor the reliability of the system, while depending on system configuration, a regional event could lead to no loss of data, a few seconds or minutes of lost updates, or even complete data loss.

In the embodiments, the placement of data for storage redundancy is independent of the placement of authorities for data consistency. In some embodiments, storage nodes that contain authorities do not contain any persistent storage. Instead, the storage nodes are connected to non-volatile solid state storage units that do not contain authorities. The communications interconnect between storage nodes and non-volatile solid state storage units consists of multiple communication technologies and has non-uniform performance and fault tolerance characteristics. In some embodiments, as mentioned above, non-volatile solid state storage units are connected to storage nodes via PCI express, storage nodes are connected together within a single chassis using Ethernet backplane, and chassis are connected together to form a storage cluster. Storage clusters are connected to clients using Ethernet or fiber channel in some embodiments. If multiple storage clusters are configured into a storage grid, the multiple storage clusters are connected using the Internet or other long-distance networking links, such as a "metro scale" link or private link that does not traverse the internet.

Authority owners have the exclusive right to modify entities, to migrate entities from one non-volatile solid state storage unit to another non-volatile solid state storage unit, and to add and remove copies of entities. This allows for maintaining the redundancy of the underlying data. When an authority owner fails, is going to be decommissioned, or is overloaded, the authority is transferred to a new storage node. Transient failures make it non-trivial to ensure that all non-faulty machines agree upon the new authority location. The ambiguity that arises due to transient failures can be achieved automatically by a consensus protocol such as Paxos, hot-warm failover schemes, via manual intervention by a remote system administrator, or by a local hardware administrator (such as by physically removing the failed machine from the cluster, or pressing a button on the failed machine). In some embodiments, a consensus protocol is used, and failover is automatic. If too many failures or replication events occur in too short a time period, the system goes into a self-preservation mode and halts replication and data movement activities until an administrator intervenes in accordance with some embodiments.

As authorities are transferred between storage nodes and authority owners update entities in their authorities, the system transfers messages between the storage nodes and non-volatile solid state storage units. With regard to persistent messages, messages that have different purposes are of different types. Depending on the type of the message, the system maintains different ordering and durability guarantees. As the persistent messages are being processed, the messages are temporarily stored in multiple durable and non-durable storage hardware technologies. In some embodiments, messages are stored in RAM, NVRAM and on NAND flash devices, and a variety of protocols are used in order to make efficient use of each storage medium. Latency-sensitive client requests may be persisted in replicated NVRAM, and then later NAND, while background rebalancing operations are persisted directly to NAND.

Persistent messages are persistently stored prior to being transmitted. This allows the system to continue to serve client requests despite failures and component replacement. Although many hardware components contain unique identifiers that are visible to system administrators, manufacturer, hardware supply chain and ongoing monitoring quality control infrastructure, applications running on top of the infrastructure address virtualize addresses. These virtualized addresses do not change over the lifetime of the storage system, regardless of component failures and replacements. This allows each component of the storage system to be replaced over time without reconfiguration or disruptions of client request processing, i.e., the system supports non-disruptive upgrades.

In some embodiments, the virtualized addresses are stored with sufficient redundancy. A continuous monitoring system correlates hardware and software status and the hardware identifiers. This allows detection and prediction of failures due to faulty components and manufacturing details. The monitoring system also enables the proactive transfer of authorities and entities away from impacted devices before failure occurs by removing the component from the critical path in some embodiments.

Figure 2C:
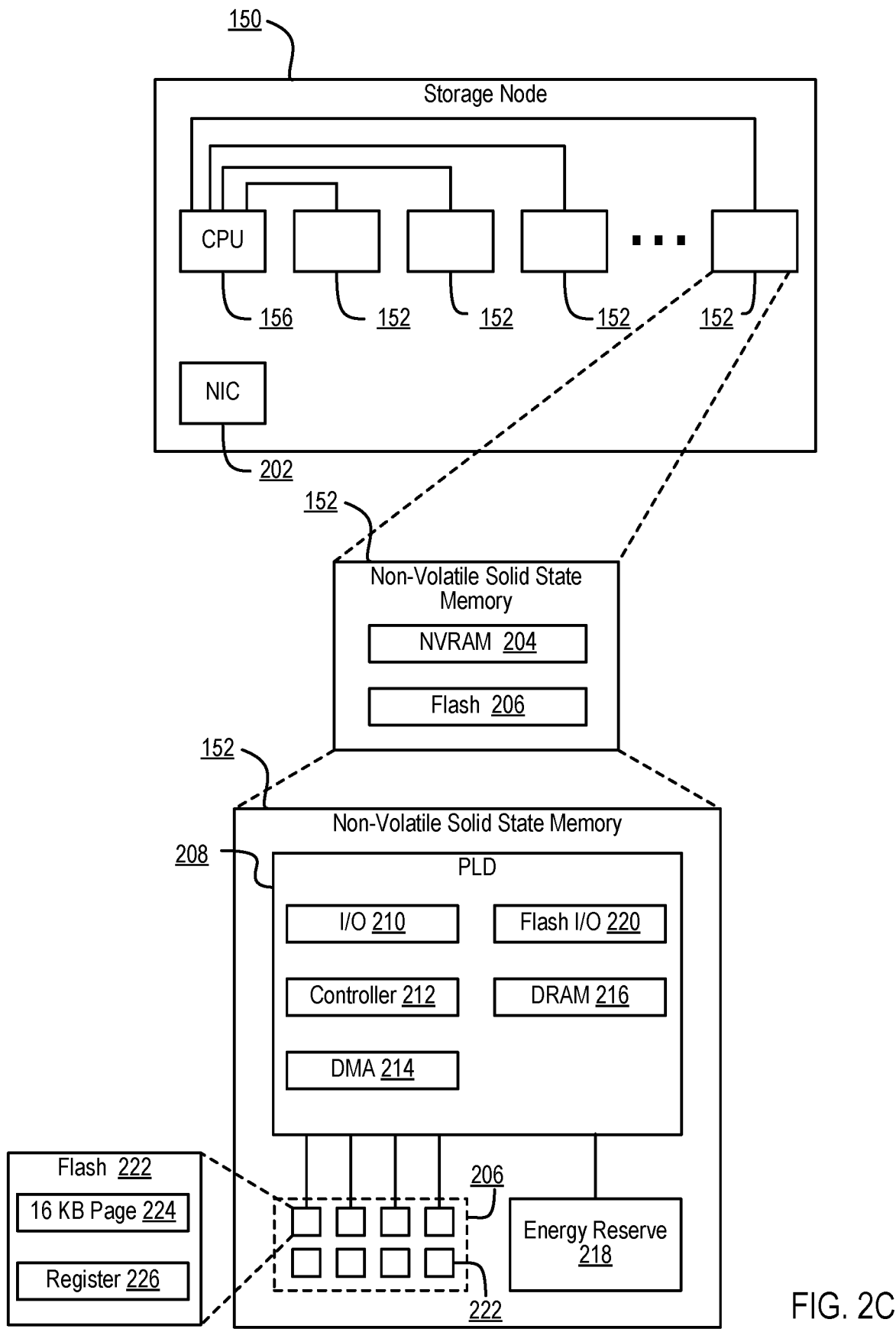
FIG. 2C is a multiple level block diagram, showing contents of a storage node and contents of one of the non-volatile solid state storage units in accordance with some embodiments.

FIG. 2C is a multiple level block diagram, showing contents of a storage node 150 and contents of a non-volatile solid state storage 152 of the storage node 150. Data is communicated to and from the storage node 150 by a network interface controller ('NIC') 202 in some embodiments. Each storage node 150 has a CPU 156, and one or more non-volatile solid state storage 152, as discussed above. Moving down one level in FIG. 2C, each non-volatile solid state storage 152 has a relatively fast non-volatile solid state memory, such as nonvolatile random access memory ('NVRAM') 204, and flash memory 206. In some embodiments, NVRAM 204 may be a component that does not require program/erase cycles (DRAM, MRAM, PCM), and can be a memory that can support being written vastly more often than the memory is read from. Moving down another level in FIG. 2C, the NVRAM 204 is implemented in one embodiment as high speed volatile memory, such as dynamic random access memory (DRAM) 216, backed up by energy reserve 218. Energy reserve 218 provides sufficient electrical power to keep the DRAM 216 powered long enough for contents to be transferred to the flash memory 206 in the event of power failure. In some embodiments, energy reserve 218 is a capacitor, super-capacitor, battery, or other device, that supplies a suitable supply of energy sufficient to enable the transfer of the contents of DRAM 216 to a stable storage medium in the case of power loss. The flash memory 206 is implemented as multiple flash dies 222, which may be referred to as packages of flash dies 222 or an array of flash dies 222. It should be appreciated that the flash dies 222 could be packaged in any number of ways, with a single die per package, multiple dies per package (i.e., multichip packages), in hybrid packages, as bare dies on a printed circuit board or other substrate, as encapsulated dies, etc. In the embodiment shown, the non-volatile solid state storage 152 has a controller 212 or other processor, and an input output (I/O) port 210 coupled to the controller 212. I/O port 210 is coupled to the CPU 156 and/or the network interface controller 202 of the flash storage node 150. Flash input output (I/O) port 220 is coupled to the flash dies 222, and a direct memory access unit (DMA) 214 is coupled to the controller 212, the DRAM 216 and the flash dies 222. In the embodiment shown, the I/O port 210, controller 212, DMA unit 214 and flash I/O port 220 are implemented on a programmable logic device ('PLD') 208, e.g., an FPGA. In this embodiment, each flash die 222 has pages, organized as sixteen kB (kilobyte) pages 224, and a register 226 through which data can be written to or read from the flash die 222. In further embodiments, other types of solid-state memory are used in place of, or in addition to flash memory illustrated within flash die 222.

Storage clusters 161, in various embodiments as disclosed herein, can be contrasted with storage arrays in general. The storage nodes 150 are part of a collection that creates the storage cluster 161. Each storage node 150 owns a slice of data and computing required to provide the data. Multiple storage nodes 150 cooperate to store and retrieve the data. Storage memory or storage devices, as used in storage arrays in general, are less involved with processing and manipulating the data. Storage memory or storage devices in a storage array receive commands to read, write, or erase data. The storage memory or storage devices in a storage array are not aware of a larger system in which they are embedded, or what the data means. Storage memory or storage devices in storage arrays can include various types of storage memory, such as RAM, solid state drives, hard disk drives, etc. The non-volatile solid state storage 152 units described herein have multiple interfaces active simultaneously and serving multiple purposes. In some embodiments, some of the functionality of a storage node 150 is shifted into a storage unit 152, transforming the storage unit 152 into a combination of storage unit 152 and storage node 150. Placing computing (relative to storage data) into the storage unit 152 places this computing closer to the data itself. The various system embodiments have a hierarchy of storage node layers with different capabilities. By contrast, in a storage array, a controller owns and knows everything about all of the data that the controller manages in a shelf or storage devices. In a storage cluster 161, as described herein, multiple controllers in multiple non-volatile sold state storage 152 units and/or storage nodes 150 cooperate in various ways (e.g., for erasure coding, data sharding, metadata communication and redundancy, storage capacity expansion or contraction, data recovery, and so on).

Figure 2D:
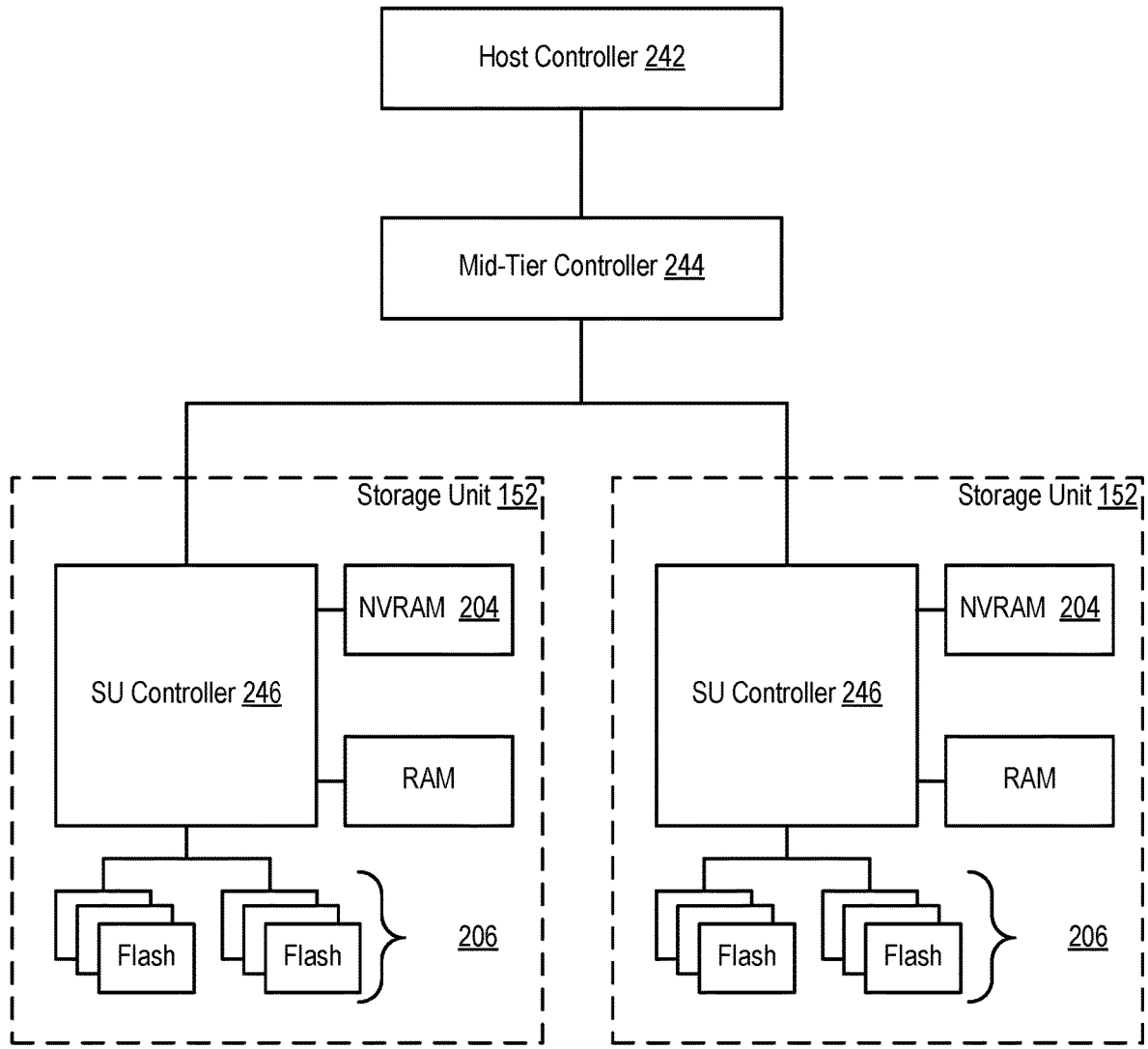
FIG. 2D shows a storage server environment, which uses embodiments of the storage nodes and storage units of some previous figures in accordance with some embodiments.

FIG. 2D shows a storage server environment, which uses embodiments of the storage nodes 150 and storage 152 units of FIGS. 2A-C. In this version, each non-volatile solid state storage 152 unit has a processor such as controller 212 (see FIG. 2C), an FPGA, flash memory 206, and NVRAM 204 (which is super-capacitor backed DRAM 216, see FIGS. 2B and 2C) on a PCIe (peripheral component interconnect express) board in a chassis 138 (see FIG. 2A). The non-volatile solid state storage 152 unit may be implemented as a single board containing storage, and may be the largest tolerable failure domain inside the chassis. In some embodiments, up to two non-volatile solid state storage 152 units may fail and the device will continue with no data loss.

The physical storage is divided into named regions based on application usage in some embodiments. The NVRAM 204 is a contiguous block of reserved memory in the non-volatile solid state storage 152 DRAM 216, and is backed by NAND flash. NVRAM 204 is logically divided into multiple memory regions written for two as spool (e.g., spool_region). Space within the NVRAM 204 spools is managed by each authority 168 independently. Each device provides an amount of storage space to each authority 168. That authority 168 further manages lifetimes and allocations within that space. Examples of a spool include distributed transactions or notions. When the primary power to a non-volatile solid state storage 152 unit fails, onboard super-capacitors provide a short duration of power hold up. During this holdup interval, the contents of the NVRAM 204 are flushed to flash memory 206. On the next power-on, the contents of the NVRAM 204 are recovered from the flash memory 206.

As for the storage unit controller, the responsibility of the logical "controller" is distributed across each of the blades containing authorities 168. This distribution of logical control is shown in FIG. 2D as a host controller 242, mid-tier controller 244 and storage unit controller(s) 246. Management of the control plane and the storage plane are treated independently, although parts may be physically co-located on the same blade. Each authority 168 effectively serves as an independent controller. Each authority 168 provides its own data and metadata structures, its own background workers, and maintains its own lifecycle.

FIG. 2E is a blade 252 hardware block diagram, showing a control plane 254, compute and storage planes 256, 258, and authorities 168 interacting with underlying physical resources, using embodiments of the storage nodes 150 and storage units 152 of FIGS. 2A-C in the storage server environment of FIG. 2D. The control plane 254 is partitioned into a number of authorities 168 which can use the compute resources in the compute plane 256 to run on any of the blades 252. The storage plane 258 is partitioned into a set of devices, each of which provides access to flash 206 and NVRAM 204 resources. In one embodiment, the compute plane 256 may perform the operations of a storage array controller, as described herein, on one or more devices of the storage plane 258 (e.g., a storage array).

In the compute and storage planes 256, 258 of FIG. 2E, the authorities 168 interact with the underlying physical resources (i.e., devices). From the point of view of an authority 168, its resources are striped over all of the physical devices. From the point of view of a device, it provides resources to all authorities 168, irrespective of where the authorities happen to run. Each authority 168 has allocated or has been allocated one or more partitions 260 of storage memory in the storage units 152, e.g., partitions 260 in flash memory 206 and NVRAM 204. Each authority 168 uses those allocated partitions 260 that belong to it, for writing or reading user data. Authorities can be associated with differing amounts of physical storage of the system. For example, one authority 168 could have a larger number of partitions 260 or larger sized partitions 260 in one or more storage units 152 than one or more other authorities 168.

Figure 2F:
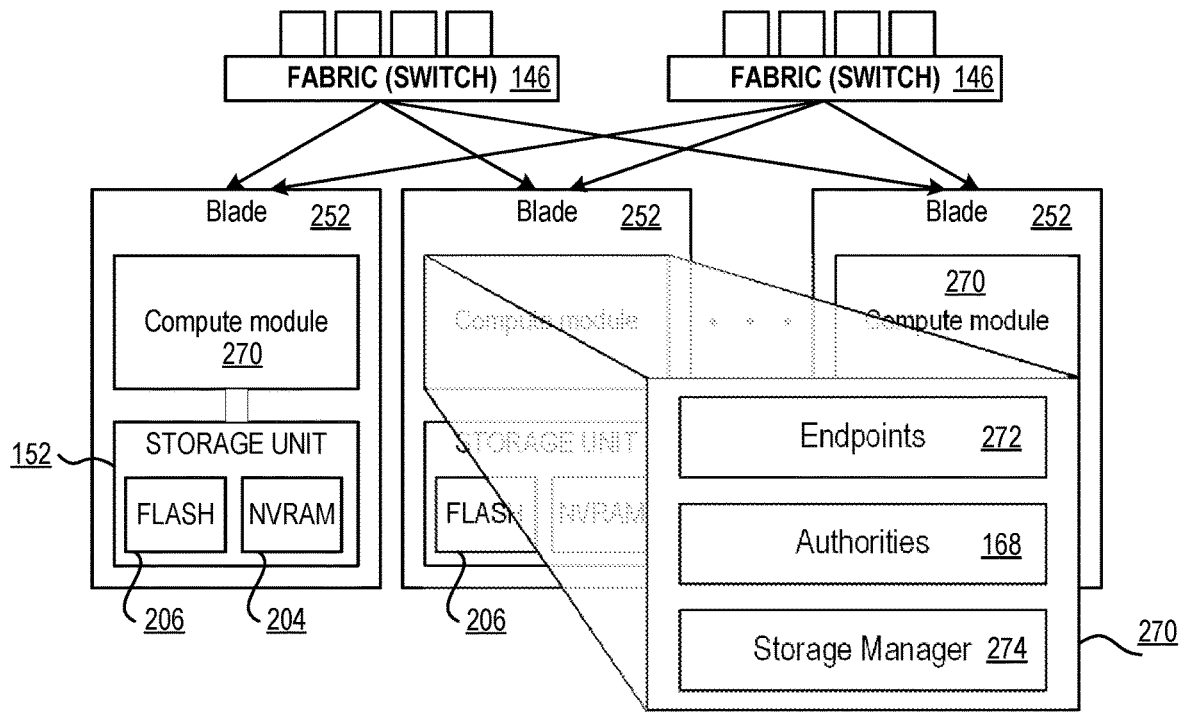
FIG. 2F depicts elasticity software layers in blades of a storage cluster, in accordance with some embodiments.

FIG. 2F depicts elasticity software layers in blades 252 of a storage cluster, in accordance with some embodiments. In the elasticity structure, elasticity software is symmetric, i.e., each blade's compute module 270 runs the three identical layers of processes depicted in FIG. 2F. Storage managers 274 execute read and write requests from other blades 252 for data and metadata stored in local storage unit 152 NVRAM 204 and flash 206. Authorities 168 fulfill client requests by issuing the necessary reads and writes to the blades 252 on whose storage units 152 the corresponding data or metadata resides. Endpoints 272 parse client connection requests received from switch fabric 146 supervisory software, relay the client connection requests to the authorities 168 responsible for fulfillment, and relay the authorities' 168 responses to clients. The symmetric three-layer structure enables the storage system's high degree of concurrency. Elasticity scales out efficiently and reliably in these embodiments. In addition, elasticity implements a unique scale-out technique that balances work evenly across all resources regardless of client access pattern, and maximizes concurrency by eliminating much of the need for inter-blade coordination that typically occurs with conventional distributed locking.

Still referring to FIG. 2F, authorities 168 running in the compute modules 270 of a blade 252 perform the internal operations required to fulfill client requests. One feature of elasticity is that authorities 168 are stateless, i.e., they cache active data and metadata in their own blades' 252 DRAMs for fast access, but the authorities store every update in their NVRAM 204 partitions on three separate blades 252 until the update has been written to flash 206. All the storage system writes to NVRAM 204 are in triplicate to partitions on three separate blades 252 in some embodiments. With triple-mirrored NVRAM 204 and persistent storage protected by parity and Reed-Solomon RAID checksums, the storage system can survive concurrent failure of two blades 252 with no loss of data, metadata, or access to either.

Because authorities 168 are stateless, they can migrate between blades 252. Each authority 168 has a unique identifier. NVRAM 204 and flash 206 partitions are associated with authorities' 168 identifiers, not with the blades 252 on which they are running in some. Thus, when an authority

168 migrates, the authority 168 continues to manage the same storage partitions from its new location. When a new blade 252 is installed in an embodiment of the storage cluster, the system automatically rebalances load by: partitioning the new blade's 252 storage for use by the system's authorities 168, migrating selected authorities 168 to the new blade 252, starting endpoints 272 on the new blade 252 and including them in the switch fabric's 146 client connection distribution algorithm.

From their new locations, migrated authorities 168 persist the contents of their NVRAM 204 partitions on flash 206, process read and write requests from other authorities 168, and fulfill the client requests that endpoints 272 direct to them. Similarly, if a blade 252 fails or is removed, the system redistributes its authorities 168 among the system's remaining blades 252. The redistributed authorities 168 continue to perform their original functions from their new locations.

Figure 2G:
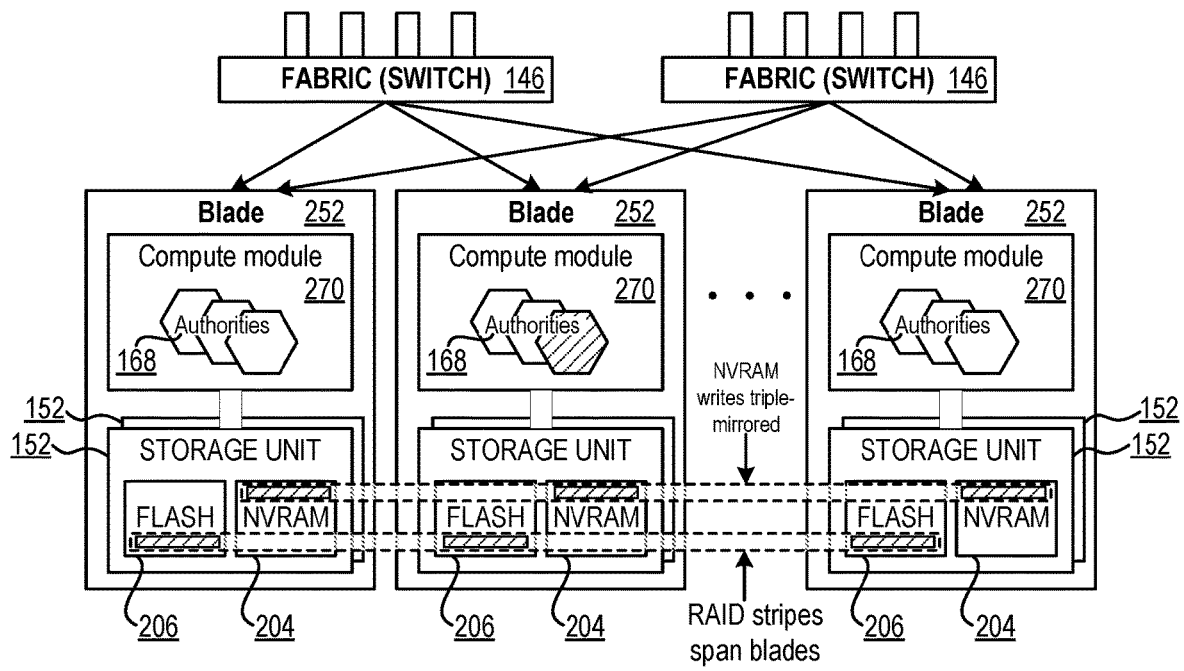
FIG. 2G depicts authorities and storage resources in blades of a storage cluster, in accordance with some embodiments.

FIG. 2G depicts authorities 168 and storage resources in blades 252 of a storage cluster, in accordance with some embodiments. Each authority 168 is exclusively responsible for a partition of the flash 206 and NVRAM 204 on each blade 252. The authority 168 manages the content and integrity of its partitions independently of other authorities 168. Authorities 168 compress incoming data and preserve it temporarily in their NVRAM 204 partitions, and then consolidate, RAID-protect, and persist the data in segments of the storage in their flash 206 partitions. As the authorities 168 write data to flash 206, storage managers 274 perform the necessary flash translation to optimize write performance and maximize media longevity. In the background, authorities 168 "garbage collect," or reclaim space occupied by data that clients have made obsolete by overwriting the data. It should be appreciated that since authorities' 168 partitions are disjoint, there is no need for distributed locking to execute client and writes or to perform background functions.

The embodiments described herein may utilize various software, communication and/or networking protocols. In addition, the configuration of the hardware and/or software may be adjusted to accommodate various protocols. For example, the embodiments may utilize Active Directory, which is a database based system that provides authentication, directory, policy, and other services in a WINDOWS™ environment. In these embodiments, LDAP (Lightweight Directory Access Protocol) is one example application protocol for querying and modifying items in directory service providers such as Active Directory. In some embodiments, a network lock manager ('NLM') is utilized as a facility that works in cooperation with the Network File System ('NFS') to provide a System V style of advisory file and record locking over a network. The Server Message Block ('SMB') protocol, one version of which is also known as Common Internet File System ('CIFS'), may be integrated with the storage systems discussed herein. SMP operates as an application-layer network protocol typically used for providing shared access to files, printers, and serial ports and miscellaneous communications between nodes on a network. SMB also provides an authenticated inter-process communication mechanism. AMAZON™ S3 (Simple Storage Service) is a web service offered by Amazon Web Services, and the systems described herein may interface with Amazon S3 through web services interfaces (REST (representational state transfer), SOAP (simple object access protocol), and BitTorrent). A RESTful API (application programming interface) breaks down a transaction to create a series of small modules. Each module addresses a particular underlying part of the transaction. The control or permissions provided with these embodiments, especially for object data, may include utilization of an access control list ('ACL'). The ACL is a list of permissions attached to an object and the ACL specifies which users or system processes are granted access to objects, as well as what operations are allowed on given objects. The systems may utilize Internet Protocol version 6 ('IPv6'), as well as IPv4, for the communications protocol that provides an identification and location system for computers on networks and routes traffic across the Internet. The routing of packets between networked systems may include Equal-cost multi-path routing ('ECMP'), which is a routing strategy where next-hop packet forwarding to a single destination can occur over multiple "best paths" which tie for top place in routing metric calculations. Multi-path routing can be used in conjunction with most routing protocols, because it is a per-hop decision limited to a single router. The software may support Multi-tenancy, which is an architecture in which a single instance of a software application serves multiple customers. Each customer may be referred to as a tenant. Tenants may be given the ability to customize some parts of the application, but may not customize the application's code, in some embodiments. The embodiments may maintain audit logs. An audit log is a document that records an event in a computing system. In addition to documenting what resources were accessed, audit log entries typically include destination and source addresses, a timestamp, and user login information for compliance with various regulations. The embodiments may support various key management policies, such as encryption key rotation. In addition, the system may support dynamic root passwords or some variation dynamically changing passwords.

Figure 3A:
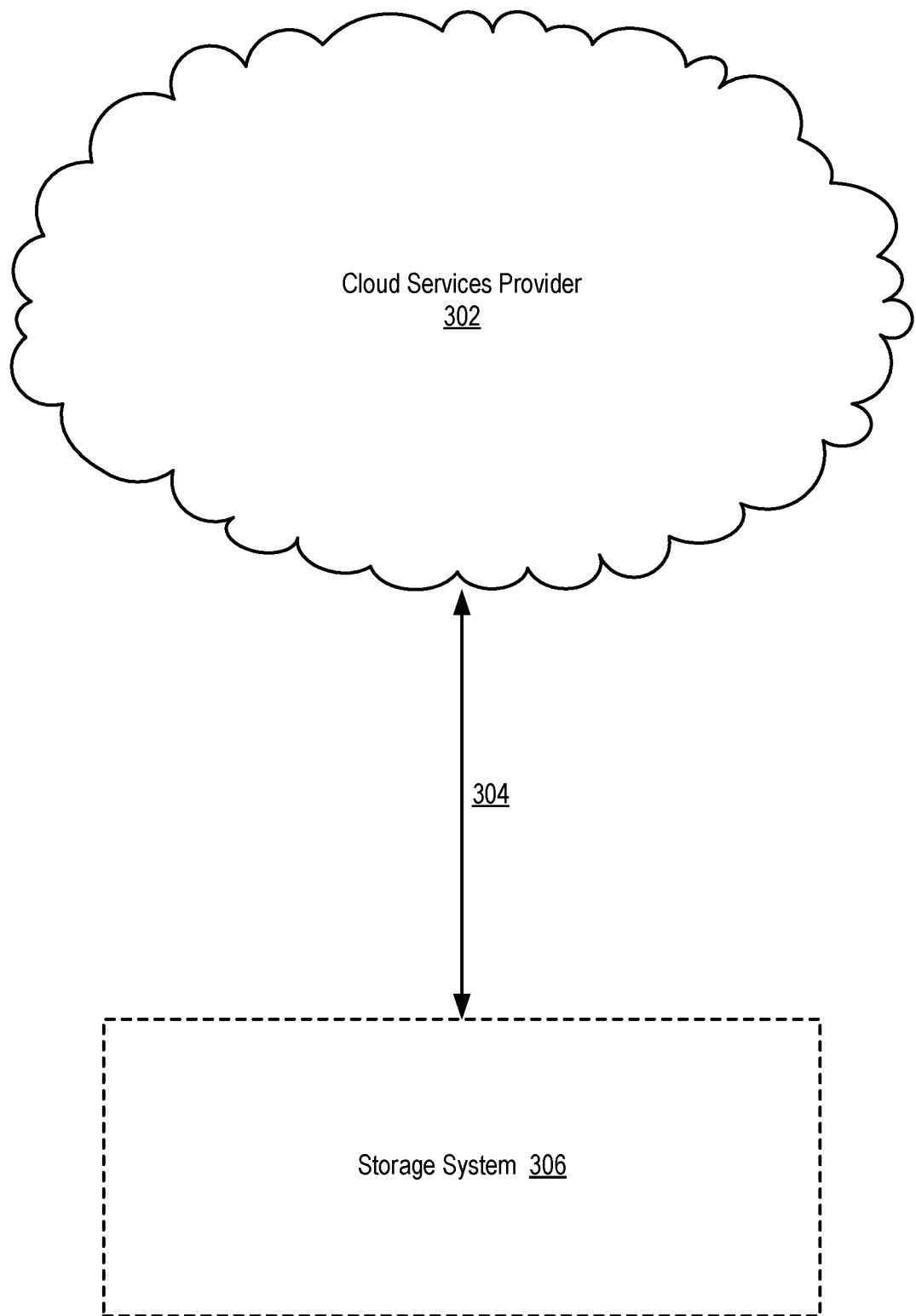
FIG. 3A sets forth a diagram of a storage system that is coupled for data communications with a cloud services provider in accordance with some embodiments of the present disclosure.

FIG. 3A sets forth a diagram of a storage system 306 that is coupled for data communications with a cloud services provider 302 in accordance with some embodiments of the present disclosure. Although depicted in less detail, the storage system 306 depicted in FIG. 3A may be similar to the storage systems described above with reference to FIGS. 1A-1D and FIGS. 2A-2G. In some embodiments, the storage system 306 depicted in FIG. 3A may be embodied as a storage system that includes imbalanced active/active controllers, as a storage system that includes balanced active/active controllers, as a storage system that includes active/active controllers where less than all of each controller's resources are utilized such that each controller has reserve resources that may be used to support failover, as a storage system that includes fully active/active controllers, as a storage system that includes dataset-segregated controllers, as a storage system that includes dual-layer architectures with front-end controllers and back-end integrated storage controllers, as a storage system that includes scale-out clusters of dual-controller arrays, as well as combinations of such embodiments.

In the example depicted in FIG. 3A, the storage system 306 is coupled to the cloud services provider 302 via a data communications link 304. The data communications link 304 may be embodied as a dedicated data communications link, as a data communications pathway that is provided through the use of one or data communications networks such as a wide area network ('WAN') or LAN, or as some other mechanism capable of transporting digital information between the storage system 306 and the cloud services provider 302. Such a data communications link 304 may be fully wired, fully wireless, or some aggregation of wired and wireless data communications pathways. In such an example, digital information may be exchanged between the storage system 306 and the cloud services provider 302 via the data communications link 304 using one or more data communications protocols. For example, digital information may be exchanged between the storage system 306 and the cloud services provider 302 via the data communications link 304 using the handheld device transfer protocol ('HDTP'), hypertext transfer protocol ('HTTP'), internet protocol ('IP'), real-time transfer protocol ('RTP'), transmission control protocol ('TCP'), user datagram protocol ('UDP'), wireless application protocol ('WAP'), or other protocol.

The cloud services provider 302 depicted in FIG. 3A may be embodied, for example, as a system and computing environment that provides a vast array of services to users of the cloud services provider 302 through the sharing of computing resources via the data communications link 304. The cloud services provider 302 may provide on-demand access to a shared pool of configurable computing resources such as computer networks, servers, storage, applications and services, and so on. The shared pool of configurable resources may be rapidly provisioned and released to a user of the cloud services provider 302 with minimal management effort. Generally, the user of the cloud services provider 302 is unaware of the exact computing resources utilized by the cloud services provider 302 to provide the services. Although in many cases such a cloud services provider 302 may be accessible via the Internet, readers of skill in the art will recognize that any system that abstracts the use of shared resources to provide services to a user through any data communications link may be considered a cloud services provider 302.

In the example depicted in FIG. 3A, the cloud services provider 302 may be configured to provide a variety of services to the storage system 306 and users of the storage system 306 through the implementation of various service models. For example, the cloud services provider 302 may be configured to provide services through the implementation of an infrastructure as a service ('IaaS') service model, through the implementation of a platform as a service ('PaaS') service model, through the implementation of a software as a service ('SaaS') service model, through the implementation of an authentication as a service ('AaaS') service model, through the implementation of a storage as a service model where the cloud services provider 302 offers access to its storage infrastructure for use by the storage system 306 and users of the storage system 306, and so on. Readers will appreciate that the cloud services provider 302 may be configured to provide additional services to the storage system 306 and users of the storage system 306 through the implementation of additional service models, as the service models described above are included only for explanatory purposes and in no way represent a limitation of the services that may be offered by the cloud services provider 302 or a limitation as to the service models that may be implemented by the cloud services provider 302.

In the example depicted in FIG. 3A, the cloud services provider 302 may be embodied, for example, as a private cloud, as a public cloud, or as a combination of a private cloud and public cloud. In an embodiment in which the cloud services provider 302 is embodied as a private cloud, the cloud services provider 302 may be dedicated to providing services to a single organization rather than providing services to multiple organizations. In an embodiment where the cloud services provider 302 is embodied as a public cloud, the cloud services provider 302 may provide services to multiple organizations. In still alternative embodiments, the cloud services provider 302 may be embodied as a mix of a private and public cloud services with a hybrid cloud deployment.

Although not explicitly depicted in FIG. 3A, readers will appreciate that a vast amount of additional hardware components and additional software components may be necessary to facilitate the delivery of cloud services to the storage system 306 and users of the storage system 306. For example, the storage system 306 may be coupled to (or even include) a cloud storage gateway. Such a cloud storage gateway may be embodied, for example, as hardware-based or software-based appliance that is located on premise with the storage system 306. Such a cloud storage gateway may operate as a bridge between local applications that are executing on the storage system 306 and remote, cloud-based storage that is utilized by the storage system 306. Through the use of a cloud storage gateway, organizations may move primary iSCSI or NAS to the cloud services provider 302, thereby enabling the organization to save space on their on-premises storage systems. Such a cloud storage gateway may be configured to emulate a disk array, a block-based device, a file server, or other storage system that can translate the SCSI commands, file server commands, or other appropriate command into REST-space protocols that facilitate communications with the cloud services provider 302.

In order to enable the storage system 306 and users of the storage system 306 to make use of the services provided by the cloud services provider 302, a cloud migration process may take place during which data, applications, or other elements from an organization's local systems (or even from another cloud environment) are moved to the cloud services provider 302. In order to successfully migrate data, applications, or other elements to the cloud services provider's 302 environment, middleware such as a cloud migration tool may be utilized to bridge gaps between the cloud services provider's 302 environment and an organization's environment. Such cloud migration tools may also be configured to address potentially high network costs and long transfer times associated with migrating large volumes of data to the cloud services provider 302, as well as addressing security concerns associated with sensitive data to the cloud services provider 302 over data communications networks. In order to further enable the storage system 306 and users of the storage system 306 to make use of the services provided by the cloud services provider 302, a cloud orchestrator may also be used to arrange and coordinate automated tasks in pursuit of creating a consolidated process or workflow. Such a cloud orchestrator may perform tasks such as configuring various components, whether those components are cloud components or on-premises components, as well as managing the interconnections between such components. The cloud orchestrator can simplify the inter-component communication and connections to ensure that links are correctly configured and maintained.

In the example depicted in FIG. 3A, and as described briefly above, the cloud services provider 302 may be configured to provide services to the storage system 306 and users of the storage system 306 through the usage of a SaaS service model, eliminating the need to install and run the application on local computers, which may simplify maintenance and support of the application. Such applications may take many forms in accordance with various embodiments of the present disclosure. For example, the cloud services provider 302 may be configured to provide access to data analytics applications to the storage system 306 and users of the storage system 306. Such data analytics applications may be configured, for example, to receive vast amounts of telemetry data phoned home by the storage system 306. Such telemetry data may describe various operating characteristics of the storage system 306 and may be analyzed for a vast array of purposes including, for example, to determine the health of the storage system 306, to identify workloads that are executing on the storage system 306, to predict when the storage system 306 will run out of various resources, to recommend configuration changes, hardware or software upgrades, workflow migrations, or other actions that may improve the operation of the storage system 306.

The cloud services provider 302 may also be configured to provide access to virtualized computing environments to the storage system 306 and users of the storage system 306. Such virtualized computing environments may be embodied, for example, as a virtual machine or other virtualized computer hardware platforms, virtual storage devices, virtualized computer network resources, and so on. Examples of such virtualized environments can include virtual machines that are created to emulate an actual computer, virtualized desktop environments that separate a logical desktop from a physical machine, virtualized file systems that allow uniform access to different types of concrete file systems, and many others.

Although the example depicted in FIG. 3A illustrates the storage system 306 being coupled for data communications with the cloud services provider 302, in other embodiments the storage system 306 may be part of a hybrid cloud deployment in which private cloud elements (e.g., private cloud services, on-premises infrastructure, and so on) and public cloud elements (e.g., public cloud services, infrastructure, and so on that may be provided by one or more cloud services providers) are combined to form a single solution, with orchestration among the various platforms. Such a hybrid cloud deployment may leverage hybrid cloud management software such as, for example, Azure™ Arc from Microsoft™, that centralize the management of the hybrid cloud deployment to any infrastructure and enable the deployment of services anywhere. In such an example, the hybrid cloud management software may be configured to create, update, and delete resources (both physical and virtual) that form the hybrid cloud deployment, to allocate compute and storage to specific workloads, to monitor workloads and resources for performance, policy compliance, updates and patches, security status, or to perform a variety of other tasks.

Readers will appreciate that by pairing the storage systems described herein with one or more cloud services providers, various offerings may be enabled. For example, disaster recovery as a service ('DRaaS') may be provided where cloud resources are utilized to protect applications and data from disruption caused by disaster, including in embodiments where the storage systems may serve as the primary data store. In such embodiments, a total system backup may be taken that allows for business continuity in the event of system failure. In such embodiments, cloud data backup techniques (by themselves or as part of a larger DRaaS solution) may also be integrated into an overall solution that includes the storage systems and cloud services providers described herein.

The storage systems described herein, as well as the cloud services providers, may be utilized to provide a wide array of security features. For example, the storage systems may encrypt data at rest (and data may be sent to and from the storage systems encrypted) and may make use of Key Management-as-a-Service ('KMaaS') to manage encryption keys, keys for locking and unlocking storage devices, and so on. Likewise, cloud data security gateways or similar mechanisms may be utilized to ensure that data stored within the storage systems does not improperly end up being stored in the cloud as part of a cloud data backup operation. Furthermore, microsegmentation or identity-based-segmentation may be utilized in a data center that includes the storage systems or within the cloud services provider, to create secure zones in data centers and cloud deployments that enables the isolation of workloads from one another.

Figure 3B:
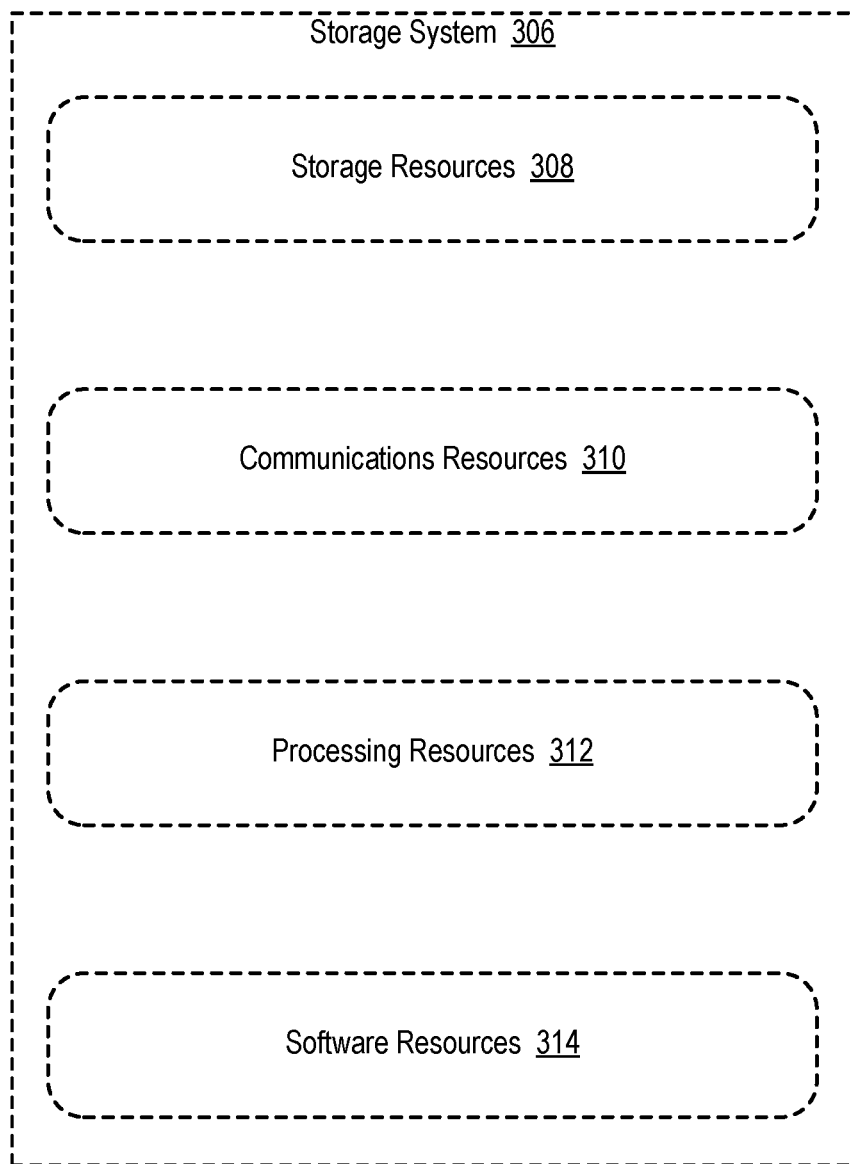
FIG. 3B sets forth a diagram of a storage system in accordance with some embodiments of the present disclosure.

For further explanation, FIG. 3B sets forth a diagram of a storage system 306 in accordance with some embodiments of the present disclosure. Although depicted in less detail, the storage system 306 depicted in FIG. 3B may be similar to the storage systems described above with reference to FIGS. 1A-1D and FIGS. 2A-2G as the storage system may include many of the components described above.

The storage system 306 depicted in FIG. 3B may include a vast amount of storage resources 308, which may be embodied in many forms. For example, the storage resources 308 can include nano-RAM or another form of nonvolatile random access memory that utilizes carbon nanotubes deposited on a substrate, 3D crosspoint non-volatile memory, flash memory including single-level cell ('SLC') NAND flash, multi-level cell ('MLC') NAND flash, triple-level cell ('TLC') NAND flash, quad-level cell ('QLC') NAND flash, or others. Likewise, the storage resources 308 may include non-volatile magnetoresistive random-access memory ('MRAM'), including spin transfer torque (STY) MRAM. The example storage resources 308 may alternatively include non-volatile phase-change memory ('PCM'), quantum memory that allows for the storage and retrieval of photonic quantum information, resistive random-access memory ('ReRAM'), storage class memory ('SCM'), or other form of storage resources, including any combination of resources described herein. Readers will appreciate that other forms of computer memories and storage devices may be utilized by the storage systems described above, including DRAM, SRAM, EEPROM, universal memory, and many others. The storage resources 308 depicted in FIG. 3A may be embodied in a variety of form factors, including but not limited to, dual in-line memory modules ('DIMMs'), non-volatile dual in-line memory modules ('NVDIMMs'), M.2, U.2, and others.

The storage resources 308 depicted in FIG. 3B may include various forms of SCM. SCM may effectively treat fast, non-volatile memory (e.g., NAND flash) as an extension of DRAM such that an entire dataset may be treated as an in-memory dataset that resides entirely in DRAM. SCM may include non-volatile media such as, for example, NAND flash. Such NAND flash may be accessed utilizing NVMe that can use the PCIe bus as its transport, providing for relatively low access latencies compared to older protocols. In fact, the network protocols used for SSDs in all-flash arrays can include NVMe using Ethernet (ROCE, NVME TCP), Fibre Channel (NVMe FC), InfiniBand (iWARP), and others that make it possible to treat fast, non-volatile memory as an extension of DRAM. In view of the fact that DRAM is often byte-addressable and fast, non-volatile memory such as NAND flash is block-addressable, a controller software/hardware stack may be needed to convert the block data to the bytes that are stored in the media. Examples of media and software that may be used as SCM can include, for example, 3D XPoint, Intel Memory Drive Technology, Samsung's Z-SSD, and others.

The storage resources 308 depicted in FIG. 3B may also include racetrack memory (also referred to as domain-wall memory). Such racetrack memory may be embodied as a form of non-volatile, solid-state memory that relies on the intrinsic strength and orientation of the magnetic field created by an electron as it spins in addition to its electronic charge, in solid-state devices. Through the use of spin-coherent electric current to move magnetic domains along a nanoscopic permalloy wire, the domains may pass by magnetic read/write heads positioned near the wire as current is passed through the wire, which alter the domains to record patterns of bits. In order to create a racetrack memory device, many such wires and read/write elements may be packaged together.

The example storage system 306 depicted in FIG. 3B may implement a variety of storage architectures. For example, storage systems in accordance with some embodiments of the present disclosure may utilize block storage where data is stored in blocks, and each block essentially acts as an individual hard drive. Storage systems in accordance with some embodiments of the present disclosure may utilize object storage, where data is managed as objects. Each object may include the data itself, a variable amount of metadata, and a globally unique identifier, where object storage can be implemented at multiple levels (e.g., device level, system level, interface level). Storage systems in accordance with some embodiments of the present disclosure utilize file storage in which data is stored in a hierarchical structure. Such data may be saved in files and folders, and presented to both the system storing it and the system retrieving it in the same format.

The example storage system 306 depicted in FIG. 3B may be embodied as a storage system in which additional storage resources can be added through the use of a scale-up model, additional storage resources can be added through the use of a scale-out model, or through some combination thereof. In a scale-up model, additional storage may be added by adding additional storage devices. In a scale-out model, however, additional storage nodes may be added to a cluster of storage nodes, where such storage nodes can include additional processing resources, additional networking resources, and so on.

The example storage system 306 depicted in FIG. 3B may leverage the storage resources described above in a variety of different ways. For example, some portion of the storage resources may be utilized to serve as a write cache, storage resources within the storage system may be utilized as a read cache, or tiering may be achieved within the storage systems by placing data within the storage system in accordance with one or more tiering policies.

The storage system 306 depicted in FIG. 3B also includes communications resources 310 that may be useful in facilitating data communications between components within the storage system 306, as well as data communications between the storage system 306 and computing devices that are outside of the storage system 306, including embodiments where those resources are separated by a relatively vast expanse. The communications resources 310 may be configured to utilize a variety of different protocols and data communication fabrics to facilitate data communications between components within the storage systems as well as computing devices that are outside of the storage system. For example, the communications resources 310 can include fibre channel ('FC') technologies such as FC fabrics and FC protocols that can transport SCSI commands over FC network, FC over ethernet ('FCoE') technologies through which FC frames are encapsulated and transmitted over Ethernet networks, InfiniBand ('IB') technologies in which a switched fabric topology is utilized to facilitate transmissions between channel adapters, NVM Express ('NVMe') technologies and NVMe over fabrics ('NVMeoF') technologies through which non-volatile storage media attached via a PCI express ('PCIe') bus may be accessed, and others. In fact, the storage systems described above may, directly or indirectly, make use of neutrino communication technologies and devices through which information (including binary information) is transmitted using a beam of neutrinos.

The communications resources 310 can also include mechanisms for accessing storage resources 308 within the storage system 306 utilizing serial attached SCSI ('SAS'), serial ATA ('SATA') bus interfaces for connecting storage resources 308 within the storage system 306 to host bus adapters within the storage system 306, internet small computer systems interface ('iSCSI') technologies to provide block-level access to storage resources 308 within the storage system 306, and other communications resources that that may be useful in facilitating data communications between components within the storage system 306, as well as data communications between the storage system 306 and computing devices that are outside of the storage system 306.

The storage system 306 depicted in FIG. 3B also includes processing resources 312 that may be useful in useful in executing computer program instructions and performing other computational tasks within the storage system 306. The processing resources 312 may include one or more ASICs that are customized for some particular purpose as well as one or more CPUs. The processing resources 312 may also include one or more DSPs, one or more FPGAs, one or more systems on a chip ('SoCs'), or other form of processing resources 312. The storage system 306 may utilize the storage resources 312 to perform a variety of tasks including, but not limited to, supporting the execution of software resources 314 that will be described in greater detail below.

The storage system 306 depicted in FIG. 3B also includes software resources 314 that, when executed by processing resources 312 within the storage system 306, may perform a vast array of tasks. The software resources 314 may include, for example, one or more modules of computer program instructions that when executed by processing resources 312 within the storage system 306 are useful in carrying out various data protection techniques. Such data protection techniques may be carried out, for example, by system software executing on computer hardware within the storage system, by a cloud services provider, or in other ways. Such data protection techniques can include data archiving, data backup, data replication, data snapshotting, data and database cloning, and other data protection techniques.

The software resources 314 may also include software that is useful in implementing software-defined storage ('SDS'). In such an example, the software resources 314 may include one or more modules of computer program instructions that, when executed, are useful in policy-based provisioning and management of data storage that is independent of the underlying hardware. Such software resources 314 may be useful in implementing storage virtualization to separate the storage hardware from the software that manages the storage hardware.

The software resources 314 may also include software that is useful in facilitating and optimizing I/O operations that are directed to the storage system 306. For example, the software resources 314 may include software modules that perform various data reduction techniques such as, for example, data compression, data deduplication, and others.

The software resources 314 may include software modules that intelligently group together I/O operations to facilitate better usage of the underlying storage resource 308, software modules that perform data migration operations to migrate from within a storage system, as well as software modules that perform other functions. Such software resources 314 may be embodied as one or more software containers or in many other ways.

Figure 3C:
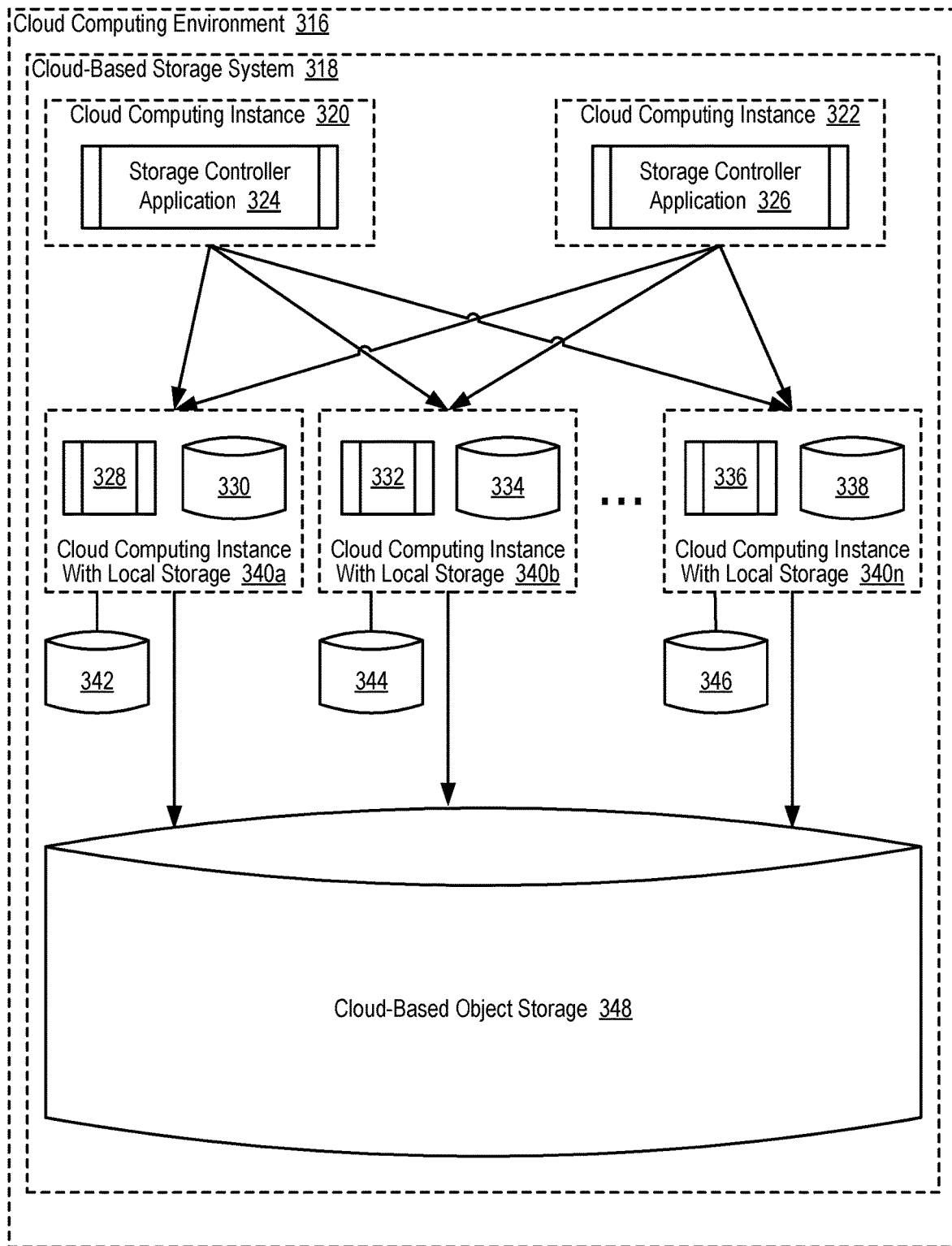
FIG. 3C sets forth an example of a cloud-based storage system in accordance with some embodiments of the present disclosure.

For further explanation, FIG. 3C sets forth an example of a cloud-based storage system 318 in accordance with some embodiments of the present disclosure. In the example depicted in FIG. 3C, the cloud-based storage system 318 is created entirely in a cloud computing environment 316 such as, for example, Amazon Web Services ('AWS')™, Microsoft Azure™, Google Cloud Platform™, IBM Cloud™, Oracle Cloud™, and others. The cloud-based storage system 318 may be used to provide services similar to the services that may be provided by the storage systems described above.

The cloud-based storage system 318 depicted in FIG. 3C includes two cloud computing instances 320, 322 that each are used to support the execution of a storage controller application 324, 326. The cloud computing instances 320, 322 may be embodied, for example, as instances of cloud computing resources (e.g., virtual machines) that may be provided by the cloud computing environment 316 to support the execution of software applications such as the storage controller application 324, 326. For example, each of the cloud computing instances 320, 322 may execute on an Azure VM, where each Azure VM may include high speed temporary storage that may be leveraged as a cache (e.g., as a read cache). In one embodiment, the cloud computing instances 320, 322 may be embodied as Amazon Elastic Compute Cloud ('EC2') instances. In such an example, an Amazon Machine Image ('AMI') that includes the storage controller application 324, 326 may be booted to create and configure a virtual machine that may execute the storage controller application 324, 326.

In the example method depicted in FIG. 3C, the storage controller application 324, 326 may be embodied as a module of computer program instructions that, when executed, carries out various storage tasks. For example, the storage controller application 324, 326 may be embodied as a module of computer program instructions that, when executed, carries out the same tasks as the controllers 110A, 110B in FIG. 1A described above such as writing data to the cloud-based storage system 318, erasing data from the cloud-based storage system 318, retrieving data from the cloud-based storage system 318, monitoring and reporting of disk utilization and performance, performing redundancy operations, such as RAID or RAID-like data redundancy operations, compressing data, encrypting data, deduplicating data, and so forth. Readers will appreciate that because there are two cloud computing instances 320, 322 that each include the storage controller application 324, 326, in some embodiments one cloud computing instance 320 may operate as the primary controller as described above while the other cloud computing instance 322 may operate as the secondary controller as described above. Readers will appreciate that the storage controller application 324, 326 depicted in FIG. 3C may include identical source code that is executed within different cloud computing instances 320, 322 such as distinct EC2 instances.

Readers will appreciate that other embodiments that do not include a primary and secondary controller are within the scope of the present disclosure. For example, each cloud computing instance 320, 322 may operate as a primary controller for some portion of the address space supported by the cloud-based storage system 318, each cloud computing instance 320, 322 may operate as a primary controller where the servicing of I/O operations directed to the cloud-based storage system 318 are divided in some other way, and so on. In fact, in other embodiments where costs savings may be prioritized over performance demands, only a single cloud computing instance may exist that contains the storage controller application.

The cloud-based storage system 318 depicted in FIG. 3C includes cloud computing instances 340a, 340b, 340n with local storage 330, 334, 338. The cloud computing instances 340a, 340b, 340n may be embodied, for example, as instances of cloud computing resources that may be provided by the cloud computing environment 316 to support the execution of software applications. The cloud computing instances 340a, 340b, 340n of FIG. 3C may differ from the cloud computing instances 320, 322 described above as the cloud computing instances 340a, 340b, 340n of FIG. 3C have local storage 330, 334, 338 resources whereas the cloud computing instances 320, 322 that support the execution of the storage controller application 324, 326 need not have local storage resources. The cloud computing instances 340a, 340b, 340n with local storage 330, 334, 338 may be embodied, for example, as EC2 M5 instances that include one or more SSDs, as EC2 R5 instances that include one or more SSDs, as EC2 I3 instances that include one or more SSDs, and so on. In some embodiments, the local storage 330, 334, 338 must be embodied as solid-state storage (e.g., SSDs) rather than storage that makes use of hard disk drives.

In the example depicted in FIG. 3C, each of the cloud computing instances 340a, 340b, 340n with local storage 330, 334, 338 can include a software daemon 328, 332, 336 that, when executed by a cloud computing instance 340a, 340b, 340n can present itself to the storage controller applications 324, 326 as if the cloud computing instance 340a, 340b, 340n were a physical storage device (e.g., one or more SSDs). In such an example, the software daemon 328, 332, 336 may include computer program instructions similar to those that would normally be contained on a storage device such that the storage controller applications 324, 326 can send and receive the same commands that a storage controller would send to storage devices. In such a way, the storage controller applications 324, 326 may include code that is identical to (or substantially identical to) the code that would be executed by the controllers in the storage systems described above. In these and similar embodiments, communications between the storage controller applications 324, 326 and the cloud computing instances 340a, 340b, 340n with local storage 330, 334, 338 may utilize iSCSI, NVMe over TCP, messaging, a custom protocol, or in some other mechanism.

In the example depicted in FIG. 3C, each of the cloud computing instances 340a, 340b, 340n with local storage 330, 334, 338 may also be coupled to block storage 342, 344, 346 that is offered by the cloud computing environment 316 such as, for example, as Amazon Elastic Block Store ('EBS') volumes. In such an example, the block storage 342, 344, 346 that is offered by the cloud computing environment 316 may be utilized in a manner that is similar to how the NVRAM devices described above are utilized, as the software daemon 328, 332, 336 (or some other module) that is executing within a particular cloud comping instance 340a, 340b, 340n may, upon receiving a request to write data, initiate a write of the data to its attached EBS volume as well as a write of the data to its local storage 330, 334, 338 resources. In some alternative embodiments, data may only be written to the local storage 330, 334, 338 resources within a particular cloud comping instance 340a, 340b, 340n. In an alternative embodiment, rather than using the block storage 342, 344, 346 that is offered by the cloud computing environment 316 as NVRAM, actual RAM on each of the cloud computing instances 340a, 340b, 340n with local storage 330, 334, 338 may be used as NVRAM, thereby decreasing network utilization costs that would be associated with using an EBS volume as the NVRAM. In yet another embodiment, high performance block storage resources such as one or more Azure Ultra Disks may be utilized as the NVRAM.

The storage controller applications 324, 326 may be used to perform various tasks such as deduplicating the data contained in the request, compressing the data contained in the request, determining where to the write the data contained in the request, and so on, before ultimately sending a request to write a deduplicated, encrypted, or otherwise possibly updated version of the data to one or more of the cloud computing instances 340a, 340b, 340n with local storage 330, 334, 338. Either cloud computing instance 320, 322, in some embodiments, may receive a request to read data from the cloud-based storage system 318 and may ultimately send a request to read data to one or more of the cloud computing instances 340a, 340b, 340n with local storage 330, 334, 338.

When a request to write data is received by a particular cloud computing instance 340a, 340b, 340n with local storage 330, 334, 338, the software daemon 328, 332, 336 may be configured to not only write the data to its own local storage 330, 334, 338 resources and any appropriate block storage 342, 344, 346 resources, but the software daemon 328, 332, 336 may also be configured to write the data to cloud-based object storage 348 that is attached to the particular cloud computing instance 340a, 340b, 340n. The cloud-based object storage 348 that is attached to the particular cloud computing instance 340a, 340b, 340n may be embodied, for example, as Amazon Simple Storage Service ('S3'). In other embodiments, the cloud computing instances 320, 322 that each include the storage controller application 324, 326 may initiate the storage of the data in the local storage 330, 334, 338 of the cloud computing instances 340a, 340b, 340n and the cloud-based object storage 348. In other embodiments, rather than using both the cloud computing instances 340a, 340b, 340n with local storage 330, 334, 338 (also referred to herein as 'virtual drives') and the cloud-based object storage 348 to store data, a persistent storage layer may be implemented in other ways. For example, one or more Azure Ultra disks may be used to persistently store data (e.g., after the data has been written to the NVRAM layer).

While the local storage 330, 334, 338 resources and the block storage 342, 344, 346 resources that are utilized by the cloud computing instances 340a, 340b, 340n may support block-level access, the cloud-based object storage 348 that is attached to the particular cloud computing instance 340a, 340b, 340n supports only object-based access. The software daemon 328, 332, 336 may therefore be configured to take blocks of data, package those blocks into objects, and write the objects to the cloud-based object storage 348 that is attached to the particular cloud computing instance 340a, 340b, 340n.

In some embodiments, all data that is stored by the cloud-based storage system 318 may be stored in both: 1) the cloud-based object storage 348, and 2) at least one of the local storage 330, 334, 338 resources or block storage 342, 344, 346 resources that are utilized by the cloud computing instances 340a, 340b, 340n. In such embodiments, the local storage 330, 334, 338 resources and block storage 342, 344, 346 resources that are utilized by the cloud computing instances 340a, 340b, 340n may effectively operate as cache that generally includes all data that is also stored in S3, such that all reads of data may be serviced by the cloud computing instances 340a, 340b, 340n without requiring the cloud computing instances 340a, 340b, 340n to access the cloud-based object storage 348. Readers will appreciate that in other embodiments, however, all data that is stored by the cloud-based storage system 318 may be stored in the cloud-based object storage 348, but less than all data that is stored by the cloud-based storage system 318 may be stored in at least one of the local storage 330, 334, 338 resources or block storage 342, 344, 346 resources that are utilized by the cloud computing instances 340a, 340b, 340n. In such an example, various policies may be utilized to determine which subset of the data that is stored by the cloud-based storage system 318 should reside in both: 1) the cloud-based object storage 348, and 2) at least one of the local storage 330, 334, 338 resources or block storage 342, 344, 346 resources that are utilized by the cloud computing instances 340a, 340b, 340n.

One or more modules of computer program instructions that are executing within the cloud-based storage system 318 (e.g., a monitoring module that is executing on its own EC2 instance) may be designed to handle the failure of one or more of the cloud computing instances 340a, 340b, 340n with local storage 330, 334, 338. In such an example, the monitoring module may handle the failure of one or more of the cloud computing instances 340a, 340b, 340n with local storage 330, 334, 338 by creating one or more new cloud computing instances with local storage, retrieving data that was stored on the failed cloud computing instances 340a, 340b, 340n from the cloud-based object storage 348, and storing the data retrieved from the cloud-based object storage 348 in local storage on the newly created cloud computing instances. Readers will appreciate that many variants of this process may be implemented.

Readers will appreciate that various performance aspects of the cloud-based storage system 318 may be monitored (e.g., by a monitoring module that is executing in an EC2 instance) such that the cloud-based storage system 318 can be scaled-up or scaled-out as needed. For example, if the cloud computing instances 320, 322 that are used to support the execution of a storage controller application 324, 326 are undersized and not sufficiently servicing the I/O requests that are issued by users of the cloud-based storage system 318, a monitoring module may create a new, more powerful cloud computing instance (e.g., a cloud computing instance of a type that includes more processing power, more memory, etc. . . . ) that includes the storage controller application such that the new, more powerful cloud computing instance can begin operating as the primary controller. Likewise, if the monitoring module determines that the cloud computing instances 320, 322 that are used to support the execution of a storage controller application 324, 326 are oversized and that cost savings could be gained by switching to a smaller, less powerful cloud computing instance, the monitoring module may create a new, less powerful (and less expensive) cloud computing instance that includes the storage controller application such that the new, less powerful cloud computing instance can begin operating as the primary controller.

The storage systems described above may carry out intelligent data backup techniques through which data stored in the storage system may be copied and stored in a distinct location to avoid data loss in the event of equipment failure or some other form of catastrophe. For example, the storage systems described above may be configured to examine each backup to avoid restoring the storage system to an undesirable state.

Readers will further appreciate that the backups (often in the form of one or more snapshots) may also be utilized to perform rapid recovery of the storage system. Consider an example in which the storage system is infected with ransomware that locks users out of the storage system. In such an example, software resources 314 within the storage system may be configured to detect the presence of ransomware and may be further configured to restore the storage system to a point-in-time, using the retained backups, prior to the point-in-time at which the ransomware infected the storage system. In such an example, the presence of ransomware may be explicitly detected through the use of software tools utilized by the system, through the use of a key (e.g., a USB drive) that is inserted into the storage system, or in a similar way. Likewise, the presence of ransomware may be inferred in response to system activity meeting a predetermined fingerprint such as, for example, no reads or writes coming into the system for a predetermined period of time.

Readers will appreciate that the various components described above may be grouped into one or more optimized computing packages as converged infrastructures. Such converged infrastructures may include pools of computers, storage and networking resources that can be shared by multiple applications and managed in a collective manner using policy-driven processes. Such converged infrastructures may be implemented with a converged infrastructure reference architecture, with standalone appliances, with a software driven hyper-converged approach (e.g., hyper-converged infrastructures), or in other ways.

Readers will appreciate that the storage systems described in this disclosure may be useful for supporting various types of software applications. In fact, the storage systems may be 'application aware' in the sense that the storage systems may obtain, maintain, or otherwise have access to information describing connected applications (e.g., applications that utilize the storage systems) to optimize the operation of the storage system based on intelligence about the applications and their utilization patterns. For example, the storage system may optimize data layouts, optimize caching behaviors, optimize 'QoS' levels, or perform some other optimization that is designed to improve the storage performance that is experienced by the application.

As an example of one type of application that may be supported by the storage systems describe herein, the storage system 306 may be useful in supporting artificial intelligence ('AI') applications, database applications, XOps projects (e.g., DevOps projects, DataOps projects, MLOps projects, ModelOps projects, PlatformOps projects), electronic design automation tools, event-driven software applications, high performance computing applications, simulation applications, high-speed data capture and analysis applications, machine learning applications, media production applications, media serving applications, picture archiving and communication systems ('PACS') applications, software development applications, virtual reality applications, augmented reality applications, and many other types of applications by providing storage resources to such applications.

In view of the fact that the storage systems include compute resources, storage resources, and a wide variety of other resources, the storage systems may be well suited to support applications that are resource intensive such as, for example, AI applications. AI applications may be deployed in a variety of fields, including: predictive maintenance in manufacturing and related fields, healthcare applications such as patient data & risk analytics, retail and marketing deployments (e.g., search advertising, social media advertising), supply chains solutions, fintech solutions such as business analytics & reporting tools, operational deployments such as real-time analytics tools, application performance management tools, IT infrastructure management tools, and many others.

The storage systems described above may also be well suited to support other types of applications that are resource intensive such as, for example, machine learning applications. Machine learning applications may perform various types of data analysis to automate analytical model building. Using algorithms that iteratively learn from data, machine learning applications can enable computers to learn without being explicitly programmed. One particular area of machine learning is referred to as reinforcement learning, which involves taking suitable actions to maximize reward in a particular situation.

In addition to the resources already described, the storage systems described above may also include graphics processing units ('GPUs'), occasionally referred to as visual processing unit ('VPUs'). Such GPUs may be embodied as specialized electronic circuits that rapidly manipulate and alter memory to accelerate the creation of images in a frame buffer intended for output to a display device. Such GPUs may be included within any of the computing devices that are part of the storage systems described above, including as one of many individually scalable components of a storage system, where other examples of individually scalable components of such storage system can include storage components, memory components, compute components (e.g., CPUs, FPGAs, ASICs), networking components, software components, and others. In addition to GPUs, the storage systems described above may also include neural network processors ('NNPs') for use in various aspects of neural network processing. Such NNPs may be used in place of (or in addition to) GPUs and may also be independently scalable.

As described above, the storage systems described herein may be configured to support artificial intelligence applications, machine learning applications, big data analytics applications, and many other types of applications. The rapid growth in these sort of applications is being driven by three technologies: deep learning (DL), GPU processors, and Big Data. Deep learning is a computing model that makes use of massively parallel neural networks inspired by the human brain. Instead of experts handcrafting software, a deep learning model writes its own software by learning from lots of examples. Such GPUs may include thousands of cores that are well-suited to run algorithms that loosely represent the parallel nature of the human brain.

Advances in deep neural networks, including the development of multi-layer neural networks, have ignited a new wave of algorithms and tools for data scientists to tap into their data with artificial intelligence (AI). With improved algorithms, larger data sets, and various frameworks (including open-source software libraries for machine learning across a range of tasks), data scientists are tackling new use cases like autonomous driving vehicles, natural language processing and understanding, computer vision, machine reasoning, strong AI, and many others. Applications of such techniques may include: machine and vehicular object detection, identification and avoidance; visual recognition, classification and tagging; algorithmic financial trading strategy performance management; simultaneous localization and mapping; predictive maintenance of high-value machinery; prevention against cyber security threats, expertise automation; image recognition and classification; question answering; robotics; text analytics (extraction, classification) and text generation and translation; and many others. Applications of AI techniques has materialized in a wide array of products include, for example, Amazon Echo's speech recognition technology that allows users to talk to their machines, Google Translate™ which allows for machine-based language translation, Spotify's Discover Weekly that provides recommendations on new songs and artists that a user may like based on the user's usage and traffic analysis, Quill's text generation offering that takes structured data and turns it into narrative stories, Chatbots that provide real-time, contextually specific answers to questions in a dialog format, and many others.

Data is the heart of modern AI and deep learning algorithms. Before training can begin, one problem that must be addressed revolves around collecting the labeled data that is crucial for training an accurate AI model. A full scale AI deployment may be required to continuously collect, clean, transform, label, and store large amounts of data. Adding additional high quality data points directly translates to more accurate models and better insights. Data samples may undergo a series of processing steps including, but not limited to: 1) ingesting the data from an external source into the training system and storing the data in raw form, 2) cleaning and transforming the data in a format convenient for training, including linking data samples to the appropriate label, 3) exploring parameters and models, quickly testing with a smaller dataset, and iterating to converge on the most promising models to push into the production cluster, 4) executing training phases to select random batches of input data, including both new and older samples, and feeding those into production GPU servers for computation to update model parameters, and 5) evaluating including using a holdback portion of the data not used in training in order to evaluate model accuracy on the holdout data. This lifecycle may apply for any type of parallelized machine learning, not just neural networks or deep learning. For example, standard machine learning frameworks may rely on CPUs instead of GPUs but the data ingest and training workflows may be the same. Readers will appreciate that a single shared storage data hub creates a coordination point throughout the lifecycle without the need for extra data copies among the ingest, preprocessing, and training stages. Rarely is the ingested data used for only one purpose, and shared storage gives the flexibility to train multiple different models or apply traditional analytics to the data.

Readers will appreciate that each stage in the AI data pipeline may have varying requirements from the data hub (e.g., the storage system or collection of storage systems). Scale-out storage systems must deliver uncompromising performance for all manner of access types and patterns—from small, metadata-heavy to large files, from random to sequential access patterns, and from low to high concurrency. The storage systems described above may serve as an ideal AI data hub as the systems may service unstructured workloads. In the first stage, data is ideally ingested and stored on to the same data hub that following stages will use, in order to avoid excess data copying. The next two steps can be done on a standard compute server that optionally includes a GPU, and then in the fourth and last stage, full training production jobs are run on powerful GPU-accelerated servers. Often, there is a production pipeline alongside an experimental pipeline operating on the same dataset. Further, the GPU-accelerated servers can be used independently for different models or joined together to train on one larger model, even spanning multiple systems for distributed training. If the shared storage tier is slow, then data must be copied to local storage for each phase, resulting in wasted time staging data onto different servers. The ideal data hub for the AI training pipeline delivers performance similar to data stored locally on the server node while also having the simplicity and performance to enable all pipeline stages to operate concurrently.

In order for the storage systems described above to serve as a data hub or as part of an AI deployment, in some embodiments the storage systems may be configured to provide DMA between storage devices that are included in the storage systems and one or more GPUs that are used in an AI or big data analytics pipeline. The one or more GPUs may be coupled to the storage system, for example, via NVMe-over-Fabrics ('NVMe-oF') such that bottlenecks such as the host CPU can be bypassed and the storage system (or one of the components contained therein) can directly access GPU memory. In such an example, the storage systems may leverage API hooks to the GPUs to transfer data directly to the GPUs. For example, the GPUs may be embodied as Nvidia GPUs and the storage systems may support GPUDirect Storage ('GDS') software, or have similar proprietary software, that enables the storage system to transfer data to the GPUs via RDMA or similar mechanism.

Although the preceding paragraphs discuss deep learning applications, readers will appreciate that the storage systems described herein may also be part of a distributed deep learning ('DDL') platform to support the execution of DDL algorithms. The storage systems described above may also be paired with other technologies such as TensorFlow, an open-source software library for dataflow programming across a range of tasks that may be used for machine learning applications such as neural networks, to facilitate the development of such machine learning models, applications, and so on.

Readers will further appreciate that the storage systems described above may also be deployed as an edge solution. Such an edge solution may be in place to optimize cloud computing systems by performing data processing at the edge of the network, near the source of the data. Edge computing can push applications, data and computing power (i.e., services) away from centralized points to the logical extremes of a network. Through the use of edge solutions such as the storage systems described above, computational tasks may be performed using the compute resources provided by such storage systems, data may be storage using the storage resources of the storage system, and cloud-based services may be accessed through the use of various resources of the storage system (including networking resources). By performing computational tasks on the edge solution, storing data on the edge solution, and generally making use of the edge solution, the consumption of expensive cloud-based resources may be avoided and, in fact, performance improvements may be experienced relative to a heavier reliance on cloud-based resources.

The storage systems described above may alone, or in combination with other computing resources, serves as a network edge platform that combines compute resources, storage resources, networking resources, cloud technologies and network virtualization technologies, and so on. As part of the network, the edge may take on characteristics similar to other network facilities, from the customer premise and backhaul aggregation facilities to Points of Presence (PoPs) and regional data centers. Readers will appreciate that network workloads, such as Virtual Network Functions (VNFs) and others, will reside on the network edge platform. Enabled by a combination of containers and virtual machines, the network edge platform may rely on controllers and schedulers that are no longer geographically co-located with the data processing resources. The functions, as microservices, may split into control planes, user and data planes, or even state machines, allowing for independent optimization and scaling techniques to be applied. Such user and data planes may be enabled through increased accelerators, both those residing in server platforms, such as FPGAs and Smart NICs, and through SDN-enabled merchant silicon and programmable ASICs.

The storage systems described above may also be optimized for use in big data analytics, including being leveraged as part of a composable data analytics pipeline where containerized analytics architectures, for example, make analytics capabilities more composable. Big data analytics may be generally described as the process of examining large and varied data sets to uncover hidden patterns, unknown correlations, market trends, customer preferences and other useful information that can help organizations make more-informed business decisions. As part of that process, semi-structured and unstructured data such as, for example, internet clickstream data, web server logs, social media content, text from customer emails and survey responses, mobile-phone call-detail records, IoT sensor data, and other data may be converted to a structured form.

The storage systems described above may also implement AI platforms for delivering on the vision of self-driving storage. Such AI platforms may be configured to deliver global predictive intelligence by collecting and analyzing large amounts of storage system telemetry data points to enable effortless management, analytics and support. In fact, such storage systems may be capable of predicting both capacity and performance, as well as generating intelligent advice on workload deployment, interaction and optimization. Such AI platforms may be configured to scan all incoming storage system telemetry data against a library of issue fingerprints to predict and resolve incidents in real-time, before they impact customer environments, and captures hundreds of variables related to performance that are used to forecast performance load.

The storage systems described above may also be part of a multi-cloud environment in which multiple cloud computing and storage services are deployed in a single heterogeneous architecture. In order to facilitate the operation of such a multi-cloud environment, DevOps tools may be deployed to enable orchestration across clouds. Likewise, continuous development and continuous integration tools may be deployed to standardize processes around continuous integration and delivery, new feature rollout and provisioning cloud workloads. By standardizing these processes, a multi-cloud strategy may be implemented that enables the utilization of the best provider for each workload.

The storage systems described above may also be paired with FPGA-accelerated servers as part of a larger AI or ML infrastructure. Such FPGA-accelerated servers may reside near (e.g., in the same data center) the storage systems described above or even incorporated into an appliance that includes one or more storage systems, one or more FPGA-accelerated servers, networking infrastructure that supports communications between the one or more storage systems and the one or more FPGA-accelerated servers, as well as other hardware and software components. Alternatively, FPGA-accelerated servers may reside within a cloud computing environment that may be used to perform compute-related tasks for AI and ML jobs. Any of the embodiments described above may be used to collectively serve as a FPGA-based AI or ML platform. Readers will appreciate that, in some embodiments of the FPGA-based AI or ML platform, the FPGAs that are contained within the FPGA-accelerated servers may be reconfigured for different types of ML models (e.g., LSTMs, CNNs, GRUs). The ability to reconfigure the FPGAs that are contained within the FPGA-accelerated servers may enable the acceleration of a ML or AI application based on the most optimal numerical precision and memory model being used. Readers will appreciate that by treating the collection of FPGA-accelerated servers as a pool of FPGAs, any CPU in the data center may utilize the pool of FPGAs as a shared hardware microservice, rather than limiting a server to dedicated accelerators plugged into it.

The FPGA-accelerated servers and the GPU-accelerated servers described above may implement a model of computing where, rather than keeping a small amount of data in a CPU and running a long stream of instructions over it as occurred in more traditional computing models, the machine learning model and parameters are pinned into the high-bandwidth on-chip memory with lots of data streaming though the high-bandwidth on-chip memory. FPGAs may even be more efficient than GPUs for this computing model, as the FPGAs can be programmed with only the instructions needed to run this kind of computing model.

The storage systems described above may be configured to provide parallel storage, for example, through the use of a parallel file system such as BeeGFS. Such parallel files systems may include a distributed metadata architecture. For example, the parallel file system may include a plurality of metadata servers across which metadata is distributed, as well as components that include services for clients and storage servers.

The storage systems described above may also be configured to implement NVMe Zoned Namespaces. Through the use of NVMe Zoned Namespaces, the logical address space of a namespace is divided into zones. Each zone provides a logical block address range that must be written sequentially and explicitly reset before rewriting, thereby enabling the creation of namespaces that expose the natural boundaries of the device and offload management of internal mapping tables to the host. In order to implement NVMe Zoned Name Spaces ('ZNS'), ZNS SSDs or some other form of zoned block devices may be utilized that expose a namespace logical address space using zones. With the zones aligned to the internal physical properties of the device, several inefficiencies in the placement of data can be eliminated. In such embodiments, each zone may be mapped, for example, to a separate application such that functions like wear levelling and garbage collection could be performed on a per-zone or per-application basis rather than across the entire device. In order to support ZNS, the storage controllers described herein may be configured with to interact with zoned block devices through the usage of, for example, the Linux™ kernel zoned block device interface or other tools.

The storage systems described above may also be configured to implement zoned storage in other ways such as, for example, through the usage of shingled magnetic recording (SMR) storage devices. In examples where zoned storage is used, device-managed embodiments may be deployed where the storage devices hide this complexity by managing it in the firmware, presenting an interface like any other storage device. Alternatively, zoned storage may be implemented via a host-managed embodiment that depends on the operating system to know how to handle the drive, and only write sequentially to certain regions of the drive. Zoned storage may similarly be implemented using a host-aware embodiment in which a combination of a drive managed and host managed implementation is deployed.

The storage systems described herein may also be configured implement a recovery point objective ('RPO'), which may be establish by a user, established by an administrator, established as a system default, established as part of a storage class or service that the storage system is participating in the delivery of, or in some other way. A "recovery point objective" is a goal for the maximum time difference between the last update to a source dataset and the last recoverable replicated dataset update that would be correctly recoverable, given a reason to do so, from a continuously or frequently updated copy of the source dataset. An update is correctly recoverable if it properly takes into account all updates that were processed on the source dataset prior to the last recoverable replicated dataset update.

In synchronous replication, the RPO would be zero, meaning that under normal operation, all completed updates on the source dataset should be present and correctly recoverable on the copy dataset. In best effort nearly synchronous replication, the RPO can be as low as a few seconds. In snapshot-based replication, the RPO can be roughly calculated as the interval between snapshots plus the time to transfer the modifications between a previous already transferred snapshot and the most recent to-be-replicated snapshot.

If updates accumulate faster than they are replicated, then an RPO can be missed. If more data to be replicated accumulates between two snapshots, for snapshot-based replication, than can be replicated between taking the snapshot and replicating that snapshot's cumulative updates to the copy, then the RPO can be missed. If, again in snapshot-based replication, data to be replicated accumulates at a faster rate than could be transferred in the time between subsequent snapshots, then replication can start to fall further behind which can extend the miss between the expected recovery point objective and the actual recovery point that is represented by the last correctly replicated update.

In some embodiments, mirror-copy-based shared storage clusters may store multiple copies of all the cluster's stored data, with each subset of data replicated to a particular set of nodes, and different subsets of data replicated to different sets of nodes. In some variations, embodiments may store all of the cluster's stored data in all nodes, whereas in other variations nodes may be divided up such that a first set of nodes will all store the same set of data and a second, different set of nodes will all store a different set of data.

Figure 4:
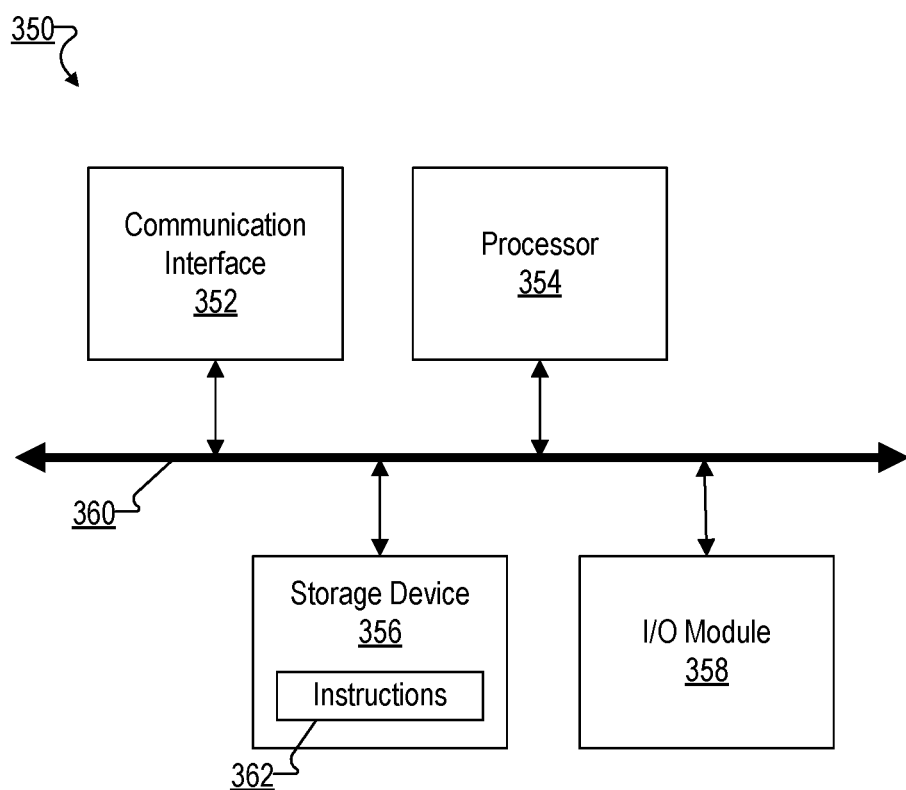
FIG. 4 illustrates an exemplary computing device that may be specifically configured to perform one or more of the processes described herein.

For further explanation, FIG. 4 illustrates an exemplary computing device 350 that may be specifically configured to perform one or more of the processes described herein. As shown in FIG. 4, computing device 350 may include a communication interface 352, a processor 354, a storage device 356, and an input/output ("I/O") module 358 communicatively connected one to another via a communication infrastructure 360. While an exemplary computing device 350 is shown in FIG. 4, the components illustrated in FIG. 4 are not intended to be limiting. Additional or alternative components may be used in other embodiments. Components of computing device 350 shown in FIG. 4 will now be described in additional detail.

Communication interface 352 may be configured to communicate with one or more computing devices. Examples of communication interface 352 include, without limitation, a wired network interface (such as a network interface card), a wireless network interface (such as a wireless network interface card), a modem, an audio/video connection, and any other suitable interface.

Processor 354 generally represents any type or form of processing unit capable of processing data and/or interpreting, executing, and/or directing execution of one or more of the instructions, processes, and/or operations described herein. Processor 354 may perform operations by executing computer-executable instructions 362 (e.g., an application, software, code, and/or other executable data instance) stored in storage device 356.

Storage device 356 may include one or more data storage media, devices, or configurations and may employ any type, form, and combination of data storage media and/or device. For example, storage device 356 may include, but is not limited to, any combination of the non-volatile media and/or volatile media described herein. Electronic data, including data described herein, may be temporarily and/or permanently stored in storage device 356. For example, data representative of computer-executable instructions 362 configured to direct processor 354 to perform any of the operations described herein may be stored within storage device 356. In some examples, data may be arranged in one or more databases residing within storage device 356.

I/O module 358 may include one or more I/O modules configured to receive user input and provide user output. I/O module 358 may include any hardware, firmware, software, or combination thereof supportive of input and output capabilities. For example, I/O module 358 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 358 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 358 is configured to provide graphical data to a display for presentation to a user. The graphical data may be representative of one or more graphical user interfaces and/or any other graphical content as may serve a particular implementation. In some examples, any of the systems, computing devices, and/or other components described herein may be implemented by computing device 350.

Figure 5:
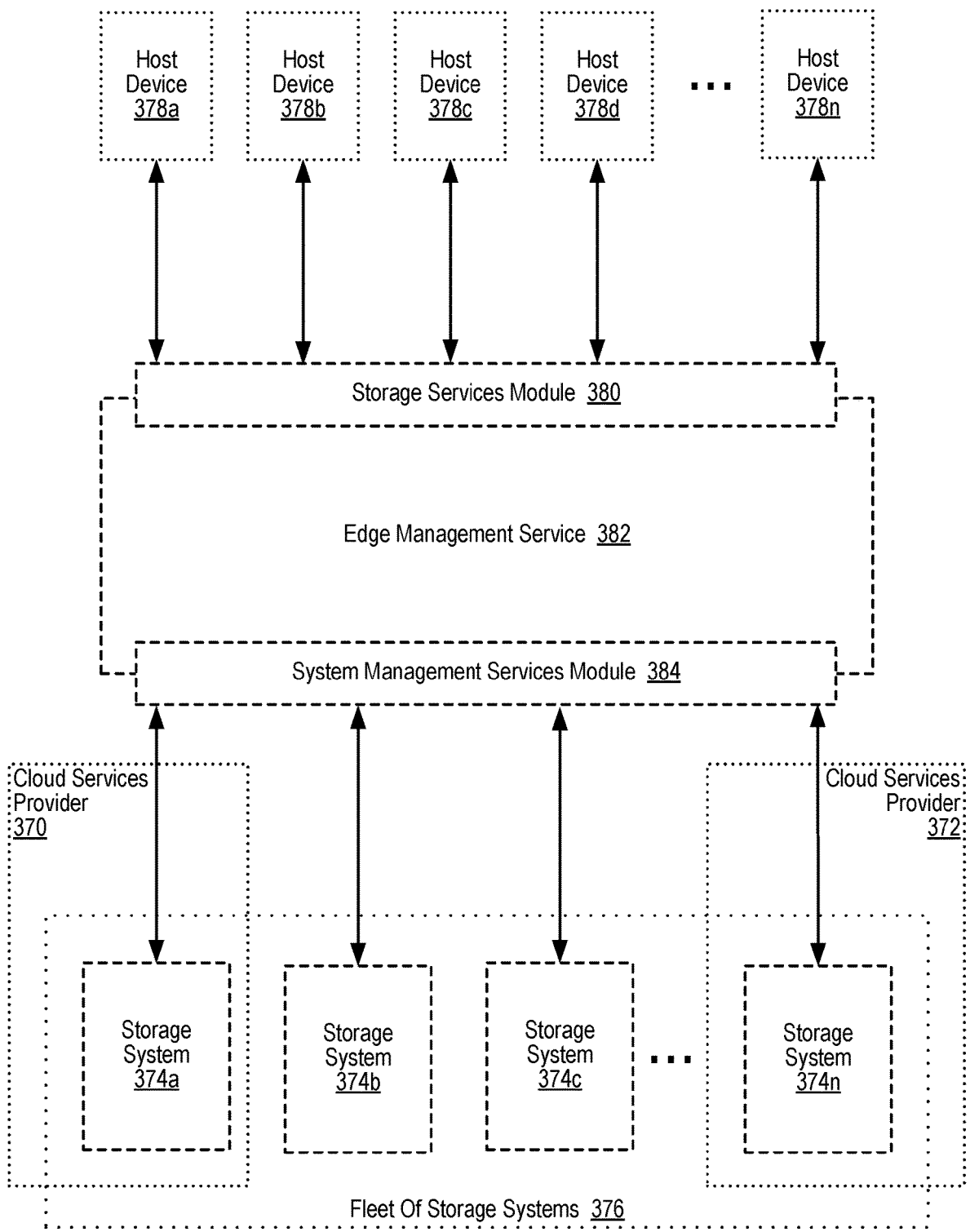
FIG. 5 illustrates an example of a fleet of storage systems for providing storage services (also referred to herein as 'data services').

For further explanation, FIG. 5 illustrates an example of a fleet of storage systems 376 for providing storage services (also referred to herein as 'data services'). The fleet of storage systems 376 depicted in FIG. 3 includes a plurality of storage systems 374a, 374b, 374c, 374d, 374n that may each be similar to the storage systems described herein. The storage systems 374a, 374b, 374c, 374d, 374n in the fleet of storage systems 376 may be embodied as identical storage systems or as different types of storage systems. For example, two of the storage systems 374a, 374n depicted in FIG. 5 are depicted as being cloud-based storage systems, as the resources that collectively form each of the storage systems 374a, 374n are provided by distinct cloud services providers 370, 372. For example, the first cloud services provider 370 may be Amazon AWS™ whereas the second cloud services provider 372 is Microsoft Azure™, although in other embodiments one or more public clouds, private clouds, or combinations thereof may be used to provide the underlying resources that are used to form a particular storage system in the fleet of storage systems 376.

The example depicted in FIG. 5 includes an edge management service 382 for delivering storage services in accordance with some embodiments of the present disclosure. The storage services (also referred to herein as 'data services') that are delivered may include, for example, services to provide a certain amount of storage to a consumer, services to provide storage to a consumer in accordance with a predetermined service level agreement, services to provide storage to a consumer in accordance with predetermined regulatory requirements, and many others.

The edge management service 382 depicted in FIG. 5 may be embodied, for example, as one or more modules of computer program instructions executing on computer hardware such as one or more computer processors. Alternatively, the edge management service 382 may be embodied as one or more modules of computer program instructions executing on a virtualized execution environment such as one or more virtual machines, in one or more containers, or in some other way. In other embodiments, the edge management service 382 may be embodied as a combination of the embodiments described above, including embodiments where the one or more modules of computer program instructions that are included in the edge management service 382 are distributed across multiple physical or virtual execution environments.

The edge management service 382 may operate as a gateway for providing storage services to storage consumers, where the storage services leverage storage offered by one or more storage systems 374a, 374b, 374c, 374d, 374n. For example, the edge management service 382 may be configured to provide storage services to host devices 378a, 378b, 378c, 378d, 378n that are executing one or more applications that consume the storage services. In such an example, the edge management service 382 may operate as a gateway between the host devices 378a, 378b, 378c, 378d, 378n and the storage systems 374a, 374b, 374c, 374d, 374n, rather than requiring that the host devices 378a, 378b, 378c, 378d, 378n directly access the storage systems 374a, 374b, 374c, 374d, 374n.

The edge management service 382 of FIG. 5 exposes a storage services module 380 to the host devices 378a, 378b, 378c, 378d, 378n of FIG. 5, although in other embodiments the edge management service 382 may expose the storage services module 380 to other consumers of the various storage services. The various storage services may be presented to consumers via one or more user interfaces, via one or more APIs, or through some other mechanism provided by the storage services module 380. As such, the storage services module 380 depicted in FIG. 5 may be embodied as one or more modules of computer program instructions executing on physical hardware, on a virtualized execution environment, or combinations thereof, where executing such modules causes enables a consumer of storage services to be offered, select, and access the various storage services.

The edge management service 382 of FIG. 5 also includes a system management services module 384. The system management services module 384 of FIG. 5 includes one or more modules of computer program instructions that, when executed, perform various operations in coordination with the storage systems 374a, 374b, 374c, 374d, 374n to provide storage services to the host devices 378a, 378b, 378c, 378d, 378n. The system management services module 384 may be configured, for example, to perform tasks such as provisioning storage resources from the storage systems 374a, 374b, 374c, 374d, 374n via one or more APIs exposed by the storage systems 374a, 374b, 374c, 374d, 374n, migrating datasets or workloads amongst the storage systems 374a, 374b, 374c, 374d, 374n via one or more APIs exposed by the storage systems 374a, 374b, 374c, 374d, 374n, setting one or more tunable parameters (i.e., one or more configurable settings) on the storage systems 374a, 374b, 374c, 374d, 374n via one or more APIs exposed by the storage systems 374a, 374b, 374c, 374d, 374n, and so on. For example, many of the services described below relate to embodiments where the storage systems 374a, 374b, 374c, 374d, 374n are configured to operate in some way. In such examples, the system management services module 384 may be responsible for using APIs (or some other mechanism) provided by the storage systems 374a, 374b, 374c, 374d, 374n to configure the storage systems 374a, 374b, 374c, 374d, 374n to operate in the ways described below.

In addition to configuring the storage systems 374a, 374b, 374c, 374d, 374n, the edge management service 382 itself may be configured to perform various tasks required to provide the various storage services. Consider an example in which the storage service includes a service that, when selected and applied, causes personally identifiable information (PIP) contained in a dataset to be obfuscated when the dataset is accessed. In such an example, the storage systems 374a, 374b, 374c, 374d, 374n may be configured to obfuscate PII when servicing read requests directed to the dataset. Alternatively, the storage systems 374a, 374b, 374c, 374d, 374n may service reads by returning data that includes the PII, but the edge management service 382 itself may obfuscate the PII as the data is passed through the edge management service 382 on its way from the storage systems 374a, 374b, 374c, 374d, 374n to the host devices 378a, 378b, 378c, 378d, 378n.

The storage systems 374a, 374b, 374c, 374d, 374n depicted in FIG. 5 may be embodied as one or more of the storage systems described above with reference to FIGS. 1A-4, including variations thereof. In fact, the storage systems 374a, 374b, 374c, 374d, 374n may serve as a pool of storage resources where the individual components in that pool have different performance characteristics, different storage characteristics, and so on. For example, one of the storage systems 374a may be a cloud-based storage system, another storage system 374b may be a storage system that provides block storage, another storage system 374c may be a storage system that provides file storage, another storage system 374d may be a relatively high-performance storage system while another storage system 374n may be a relatively low-performance storage system, and so on. In alternative embodiments, only a single storage system may be present.

The storage systems 374a, 374b, 374c, 374d, 374n depicted in FIG. 5 may also be organized into different failure domains so that the failure of one storage system 374a should be totally unrelated to the failure of another storage system 374b. For example, each of the storage systems may receive power from independent power systems, each of the storage systems may be coupled for data communications over independent data communications networks, and so on. Furthermore, the storage systems in a first failure domain may be accessed via a first gateway whereas storage systems in a second failure domain may be accessed via a second gateway. For example, the first gateway may be a first instance of the edge management service 382 and the second gateway may be a second instance of the edge management service 382, including embodiments where each instance is distinct, or each instance is part of a distributed edge management service 382.

As an illustrative example of available storage services, storage services may be presented to a user that are associated with different levels of data protection. For example, storage services may be presented to the user that, when selected and enforced, guarantee the user that data associated with that user will be protected such that various recovery point objectives ('RPO') can be guaranteed. A first available storage service may ensure, for example, that some dataset associated with the user will be protected such that any data that is more than 5 seconds old can be recovered in the event of a failure of the primary data store whereas a second available storage service may ensure that the dataset that is associated with the user will be protected such that any data that is more than 5 minutes old can be recovered in the event of a failure of the primary data store.

An additional example of storage services that may be presented to a user, selected by a user, and ultimately applied to a dataset associated with the user can include one or more data compliance services. Such data compliance services may be embodied, for example, as services that may be provided to consumers (i.e., a user) the data compliance services to ensure that the user's datasets are managed in a way to adhere to various regulatory requirements. For example, one or more data compliance services may be offered to a user to ensure that the user's datasets are managed in a way so as to adhere to the General Data Protection Regulation ('GDPR'), one or data compliance services may be offered to a user to ensure that the user's datasets are managed in a way so as to adhere to the Sarbanes-Oxley Act of 2002 ('SOX'), or one or more data compliance services may be offered to a user to ensure that the user's datasets are managed in a way so as to adhere to some other regulatory act. In addition, the one or more data compliance services may be offered to a user to ensure that the user's datasets are managed in a way so as to adhere to some non-governmental guidance (e.g., to adhere to best practices for auditing purposes), the one or more data compliance services may be offered to a user to ensure that the user's datasets are managed in a way so as to adhere to a particular clients or organizations requirements, and so on.

Consider an example in which a particular data compliance service is designed to ensure that a user's datasets are managed in a way so as to adhere to the requirements set forth in the GDPR. While a listing of all requirements of the GDPR can be found in the regulation itself, for the purposes of illustration, an example requirement set forth in the GDPR requires that pseudonymization processes must be applied to stored data in order to transform personal data in such a way that the resulting data cannot be attributed to a specific data subject without the use of additional information. For example, data encryption techniques can be applied to render the original data unintelligible, and such data encryption techniques cannot be reversed without access to the correct decryption key. As such, the GDPR may require that the decryption key be kept separately from the pseudonymised data. One particular data compliance service may be offered to ensure adherence to the requirements set forth in this paragraph.

In order to provide this particular data compliance service, the data compliance service may be presented to a user (e.g., via a GUI) and selected by the user. In response to receiving the selection of the particular data compliance service, one or more storage services policies may be applied to a dataset associated with the user to carry out the particular data compliance service. For example, a storage services policy may be applied requiring that the dataset be encrypted prior to be stored in a storage system, prior to being stored in a cloud environment, or prior to being stored elsewhere. In order to enforce this policy, a requirement may be enforced not only requiring that the dataset be encrypted when stored, but a requirement may be put in place requiring that the dataset be encrypted prior to transmitting the dataset (e.g., sending the dataset to another party). In such an example, a storage services policy may also be put in place requiring that any encryption keys used to encrypt the dataset are not stored on the same system that stores the dataset itself. Readers will appreciate that many other forms of data compliance services may be offered and implemented in accordance with embodiments of the present disclosure.

The storage systems 374*a*, 374*b*, 374*c*, 374*d*, 374*n* in the fleet of storage systems 376 may be managed collectively, for example, by one or more fleet management modules. The fleet management modules may be part of or separate from the system management services module 384 depicted in FIG. 5. The fleet management modules may perform tasks such as monitoring the health of each storage system in the fleet, initiating updates or upgrades on one or more storage systems in the fleet, migrating workloads for loading balancing or other performance purposes, and many other tasks. As such, and for many other reasons, the storage systems 374*a*, 374*b*, 374*c*, 374*d*, 374*n* may be coupled to each other via one or more data communications links in order to exchange data between the storage systems 374*a*, 374*b*, 374*c*, 374*d*, 374*n*.

The storage systems described herein may support various forms of data replication. For example, two or more of the storage systems may synchronously replicate a dataset between each other. In synchronous replication, distinct copies of a particular dataset may be maintained by multiple storage systems, but all accesses (e.g., a read) of the dataset should yield consistent results regardless of which storage system the access was directed to. For example, a read directed to any of the storage systems that are synchronously replicating the dataset should return identical results. As such, while updates to the version of the dataset need not occur at exactly the same time, precautions must be taken to ensure consistent accesses to the dataset. For example, if an update (e.g., a write) that is directed to the dataset is received by a first storage system, the update may only be acknowledged as being completed if all storage systems that are synchronously replicating the dataset have applied the update to their copies of the dataset. In such an example, synchronous replication may be carried out through the use of I/O forwarding (e.g., a write received at a first storage system is forwarded to a second storage system), communications between the storage systems (e.g., each storage system indicating that it has completed the update), or in other ways.

In other embodiments, a dataset may be replicated through the use of checkpoints. In checkpoint-based replication (also referred to as 'nearly synchronous replication'), a set of updates to a dataset (e.g., one or more write operations directed to the dataset) may occur between different checkpoints, such that a dataset has been updated to a specific checkpoint only if all updates to the dataset prior to the specific checkpoint have been completed. Consider an example in which a first storage system stores a live copy of a dataset that is being accessed by users of the dataset. In this example, assume that the dataset is being replicated from the first storage system to a second storage system using checkpoint-based replication. For example, the first storage system may send a first checkpoint (at time t=0) to the second storage system, followed by a first set of updates to the dataset, followed by a second checkpoint (at time t=1), followed by a second set of updates to the dataset, followed by a third checkpoint (at time t=2). In such an example, if the second storage system has performed all updates in the first set of updates but has not yet performed all updates in the second set of updates, the copy of the dataset that is stored on the second storage system may be up-to-date until the second checkpoint. Alternatively, if the second storage system has performed all updates in both the first set of updates and the second set of updates, the copy of the dataset that is stored on the second storage system may be up-to-date until the third checkpoint. Readers will appreciate that various types of checkpoints may be used (e.g., metadata only checkpoints), checkpoints may be spread out based on a variety of factors (e.g., time, number of operations, an RPO setting), and so on.

In other embodiments, a dataset may be replicated through snapshot-based replication (also referred to as 'asynchronous replication'). In snapshot-based replication, snapshots of a dataset may be sent from a replication source such as a first storage system to a replication target such as a second storage system. In such an embodiment, each snapshot may include the entire dataset or a subset of the dataset such as, for example, only the portions of the dataset that have changed since the last snapshot was sent from the replication source to the replication target. Readers will appreciate that snapshots may be sent on-demand, based on a policy that takes a variety of factors into consideration (e.g., time, number of operations, an RPO setting), or in some other way.

The storage systems described above may, either alone or in combination, by configured to serve as a continuous data protection store. A continuous data protection store is a feature of a storage system that records updates to a dataset in such a way that consistent images of prior contents of the dataset can be accessed with a low time granularity (often on the order of seconds, or even less), and stretching back for a reasonable period of time (often hours or days). These allow access to very recent consistent points in time for the dataset, and also allow access to access to points in time for a dataset that might have just preceded some event that, for example, caused parts of the dataset to be corrupted or otherwise lost, while retaining close to the maximum number of updates that preceded that event. Conceptually, they are like a sequence of snapshots of a dataset taken very frequently and kept for a long period of time, though continuous data protection stores are often implemented quite differently from snapshots. A storage system implementing a data continuous data protection store may further provide a means of accessing these points in time, accessing one or more of these points in time as snapshots or as cloned copies, or reverting the dataset back to one of those recorded points in time.

Over time, to reduce overhead, some points in the time held in a continuous data protection store can be merged with other nearby points in time, essentially deleting some of these points in time from the store. This can reduce the capacity needed to store updates. It may also be possible to convert a limited number of these points in time into longer duration snapshots. For example, such a store might keep a low granularity sequence of points in time stretching back a few hours from the present, with some points in time merged or deleted to reduce overhead for up to an additional day. Stretching back in the past further than that, some of these points in time could be converted to snapshots representing consistent point-in-time images from only every few hours.

Although some embodiments are described largely in the context of a storage system, readers of skill in the art will recognize that embodiments of the present disclosure may also take the form of a computer program product disposed upon computer readable storage media for use with any suitable processing system. Such computer readable storage media may be any storage medium for machine-readable information, including magnetic media, optical media, solid-state media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps described herein as embodied in a computer program product. Persons skilled in the art will recognize also that, although some of the embodiments described in this specification are oriented to software installed and executing on computer hardware, nevertheless, alternative embodiments implemented as firmware or as hardware are well within the scope of the present disclosure.

In some examples, a non-transitory computer-readable medium storing computer-readable instructions may be provided in accordance with the principles described herein. The instructions, when executed by a processor of a computing device, may direct the processor and/or computing device to perform one or more operations, including one or more of the operations described herein. Such instructions may be stored and/or transmitted using any of a variety of known computer-readable media.

A non-transitory computer-readable medium as referred to herein may include any non-transitory storage medium that participates in providing data (e.g., instructions) that may be read and/or executed by a computing device (e.g., by a processor of a computing device). For example, a non-transitory computer-readable medium may include, but is not limited to, any combination of non-volatile storage media and/or volatile storage media. Exemplary non-volatile storage media include, but are not limited to, read-only memory, flash memory, a solid-state drive, a magnetic storage device (e.g., a hard disk, a floppy disk, magnetic tape, etc.), ferroelectric random-access memory ("RAM"), and an optical disc (e.g., a compact disc, a digital video disc, a Blu-ray disc, etc.). Exemplary volatile storage media include, but are not limited to, RAM (e.g., dynamic RAM).

In some embodiments, one or more storage systems or one or more elements of storage systems (e.g., features, services, operations, components, etc. of storage systems), such as any of the illustrative storage systems or storage system elements described herein may be implemented in one or more container systems. A container system may include any system that supports execution of one or more containerized applications or services. Such a service may be software deployed as infrastructure for building applications, for operating a run-time environment, and/or as infrastructure for other services. In the discussion that follows, descriptions of containerized applications generally apply to containerized services as well.

A container may combine one or more elements of a containerized software application together with a runtime environment for operating those elements of the software application bundled into a single image. For example, each such container of a containerized application may include executable code of the software application and various dependencies, libraries, and/or other components, together with network configurations and configured access to additional resources, used by the elements of the software application within the particular container in order to enable operation of those elements. A containerized application can be represented as a collection of such containers that together represent all the elements of the application combined with the various run-time environments needed for all those elements to run. As a result, the containerized application may be abstracted away from host operating systems as a combined collection of lightweight and portable packages and configurations, where the containerized application may be uniformly deployed and consistently executed in different computing environments that use different container-compatible operating systems or different infrastructures. In some embodiments, a containerized application shares a kernel with a host computer system and executes as an isolated environment (an isolated collection of files and directories, processes, system and network resources, and configured access to additional resources and capabilities) that is isolated by an operating system of a host system in conjunction with a container management framework. When executed, a containerized application may provide one or more containerized workloads and/or services.

The container system may include and/or utilize a cluster of nodes. For example, the container system may be configured to manage deployment and execution of containerized applications on one or more nodes in a cluster. The containerized applications may utilize resources of the nodes, such as memory, processing and/or storage resources provided and/or accessed by the nodes. The storage resources may include any of the illustrative storage resources described herein and may include on-node resources such as a local tree of files and directories, off-node resources such as external networked file systems, databases or object stores, or both on-node and off-node resources. Access to additional resources and capabilities that could be configured for containers of a containerized application could include specialized computation capabilities such as GPUs and AI/ML engines, or specialized hardware such as sensors and cameras.

In some embodiments, the container system may include a container orchestration system (which may also be referred to as a container orchestrator, a container orchestration platform, etc.) designed to make it reasonably simple and for many use cases automated to deploy, scale, and manage containerized applications. In some embodiments, the container system may include a storage management system configured to provision and manage storage resources (e.g., virtual volumes) for private or shared use by cluster nodes and/or containers of containerized applications.

Figure 6:
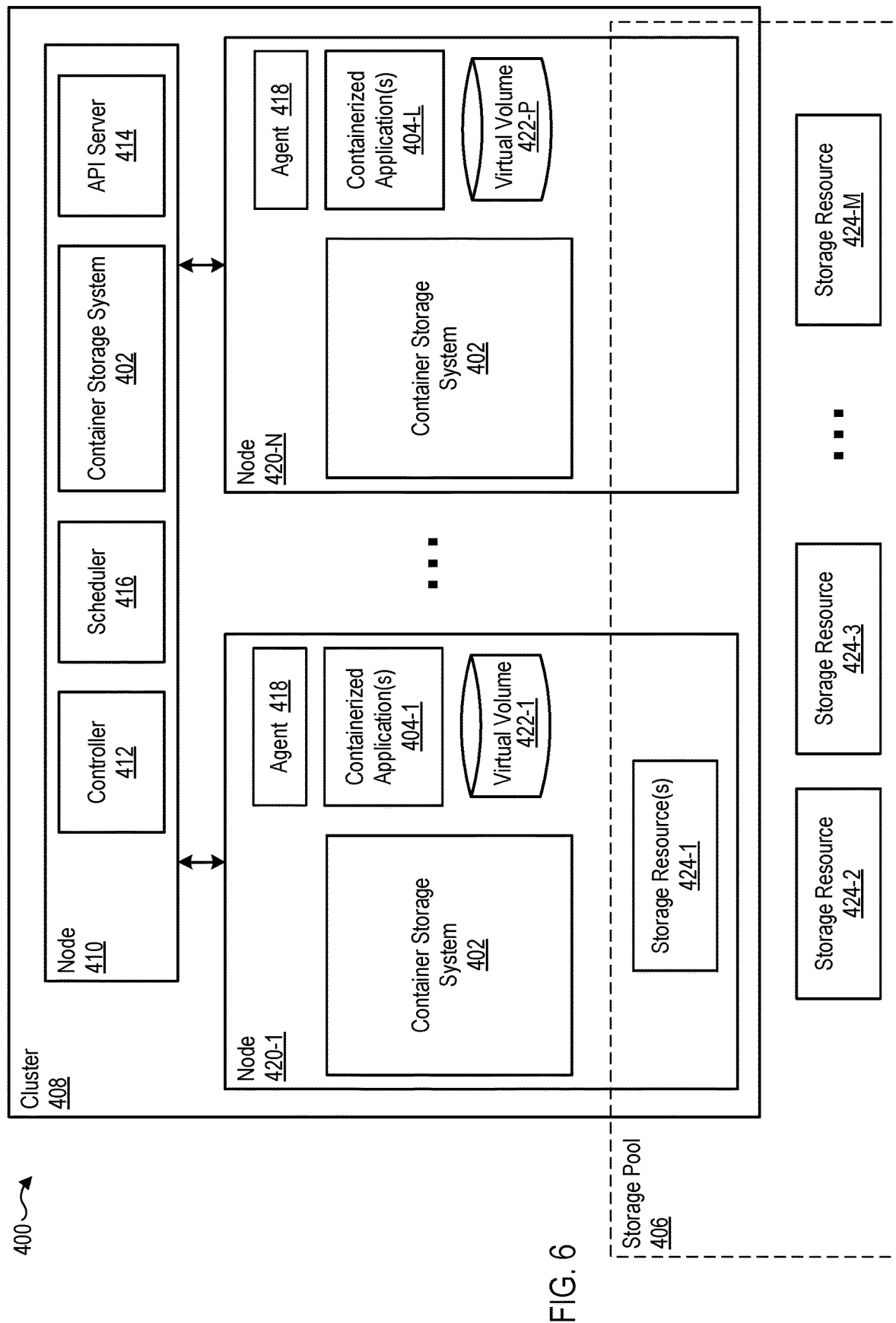
FIG. 6 sets forth an example container system in accordance with some embodiments of the present disclosure.

FIG. 6 illustrates an example container system 400. In this example, the container system 400 includes a container storage system 402 that may be configured to perform one or more storage management operations to organize, provision, and manage storage resources for use by one or more containerized applications 404-1 through 404-L of container system 400. In particular, the container storage system 402 may organize storage resources into one or more storage pools 406 of storage resources for use by containerized applications 404-1 through 404-L. The container storage system may itself be implemented as a containerized service.

The container system 400 may include or be implemented by one or more container orchestration systems, including Kubernetes™, Mesos™, Docker Swarm™, among others. The container orchestration system may manage the container system 400 running on a cluster 408 through services implemented by a control node, depicted as 410, and may further manage the container storage system or the relationship between individual containers and their storage, memory and CPU limits, networking, and their access to additional resources or services.

A control plane of the container system 400 may implement services that include: deploying applications via a controller 412, monitoring applications via the controller 412, providing an interface via an API server 414, and scheduling deployments via scheduler 416. In this example, controller 412, scheduler 416, API server 414, and container storage system 402 are implemented on a single node, node 410. In other examples, for resiliency, the control plane may be implemented by multiple, redundant nodes, where if a node that is providing management services for the container system 400 fails, then another, redundant node may provide management services for the cluster 408.

A data plane of the container system 400 may include a set of nodes that provides container runtimes for executing containerized applications. An individual node within the cluster 408 may execute a container runtime, such as Docker™, and execute a container manager, or node agent, such as a kubelet in Kubernetes (not depicted) that communicates with the control plane via a local network-connected agent (sometimes called a proxy), such as an agent 418. The agent 418 may route network traffic to and from containers using, for example, Internet Protocol (IP) port numbers. For example, a containerized application may request a storage class from the control plane, where the request is handled by the container manager, and the container manager communicates the request to the control plane using the agent 418.

Cluster 408 may include a set of nodes that run containers for managed containerized applications. A node may be a virtual or physical machine. A node may be a host system.

The container storage system 402 may orchestrate storage resources to provide storage to the container system 400. For example, the container storage system 402 may provide persistent storage to containerized applications 404-1-404-L using the storage pool 406. The container storage system 402 may itself be deployed as a containerized application by a container orchestration system.

For example, the container storage system 402 application may be deployed within cluster 408 and perform management functions for providing storage to the containerized applications 404. Management functions may include determining one or more storage pools from available storage resources, provisioning virtual volumes on one or more nodes, replicating data, responding to and recovering from host and network faults, or handling storage operations. The storage pool 406 may include storage resources from one or more local or remote sources, where the storage resources may be different types of storage, including, as examples, block storage, file storage, and object storage.

The container storage system 402 may also be deployed on a set of nodes for which persistent storage may be provided by the container orchestration system. In some examples, the container storage system 402 may be deployed on all nodes in a cluster 408 using, for example, a Kubernetes DaemonSet. In this example, nodes 420-1 through 420-N provide a container runtime where container storage system 402 executes. In other examples, some, but not all nodes in a cluster may execute the container storage system 402.

The container storage system 402 may handle storage on a node and communicate with the control plane of container system 400, to provide dynamic volumes, including persistent volumes. A persistent volume may be mounted on a node as a virtual volume, such as virtual volumes 422-1 and 422-P. After a virtual volume 422 is mounted, containerized applications may request and use, or be otherwise configured to use, storage provided by the virtual volume 422. In this example, the container storage system 402 may install a driver on a kernel of a node, where the driver handles storage operations directed to the virtual volume. In this example, the driver may receive a storage operation directed to a virtual volume, and in response, the driver may perform the storage operation on one or more storage resources within the storage pool 406, possibly under direction from or using additional logic within containers that implement the container storage system 402 as a containerized service.

The container storage system 402 may, in response to being deployed as a containerized service, determine available storage resources. For example, storage resources 424-1 through 424-M may include local storage, remote storage (storage on a separate node in a cluster), or both local and remote storage. Storage resources may also include storage from external sources such as various combinations of block storage systems, file storage systems, and object storage systems. The storage resources 424-1 through 424-M may include any type(s) and/or configuration(s) of storage resources (e.g., any of the illustrative storage resources described above), and the container storage system 402 may be configured to determine the available storage resources in any suitable way, including based on a configuration file. For example, a configuration file may specify account and authentication information for cloud-based object storage 348 or for a cloud-based storage system 318. The container storage system 402 may also determine availability of one or more storage devices 356 or one or more storage systems. An aggregate amount of storage from one or more of storage device(s) 356, storage system(s), cloud-based storage system(s) 318, edge management services 382, cloud-based object storage 348, or any other storage resources, or any combination or sub-combination of such storage resources may be used to provide the storage pool 406. The storage pool 406 is used to provision storage for the one or more virtual volumes mounted on one or more of the nodes 420 within cluster 408.

In some implementations, the container storage system 402 may create multiple storage pools. For example, the container storage system 402 may aggregate storage resources of a same type into an individual storage pool. In this example, a storage type may be one of: a storage device 356, a storage array 102, a cloud-based storage system 318, storage via an edge management service 382, or a cloud-based object storage 348. Or it could be storage configured with a certain level or type of redundancy or distribution, such as a particular combination of striping, mirroring, or erasure coding.

The container storage system 402 may execute within the cluster 408 as a containerized container storage system service, where instances of containers that implement elements of the containerized container storage system service may operate on different nodes within the cluster 408. In this example, the containerized container storage system service may operate in conjunction with the container orchestration system of the container system 400 to handle storage operations, mount virtual volumes to provide storage to a node, aggregate available storage into a storage pool 406, provision storage for a virtual volume from a storage pool 406, generate backup data, replicate data between nodes, clusters, environments, among other storage system operations. In some examples, the containerized container storage system service may provide storage services across multiple clusters operating in distinct computing environments. For example, other storage system operations may include storage system operations described above with respect to FIGS. 1-5. Persistent storage provided by the containerized container storage system service may be used to implement stateful and/or resilient containerized applications.

The container storage system 402 may be configured to perform any suitable storage operations of a storage system. For example, the container storage system 402 may be configured to perform one or more of the illustrative storage management operations described herein to manage storage resources used by the container system.

In some embodiments, one or more storage operations, including one or more of the illustrative storage management operations described herein, may be containerized. For example, one or more storage operations may be implemented as one or more containerized applications configured to be executed to perform the storage operation(s). Such containerized storage operations may be executed in any suitable runtime environment to manage any storage system(s), including any of the illustrative storage systems described herein.

Figure 7:
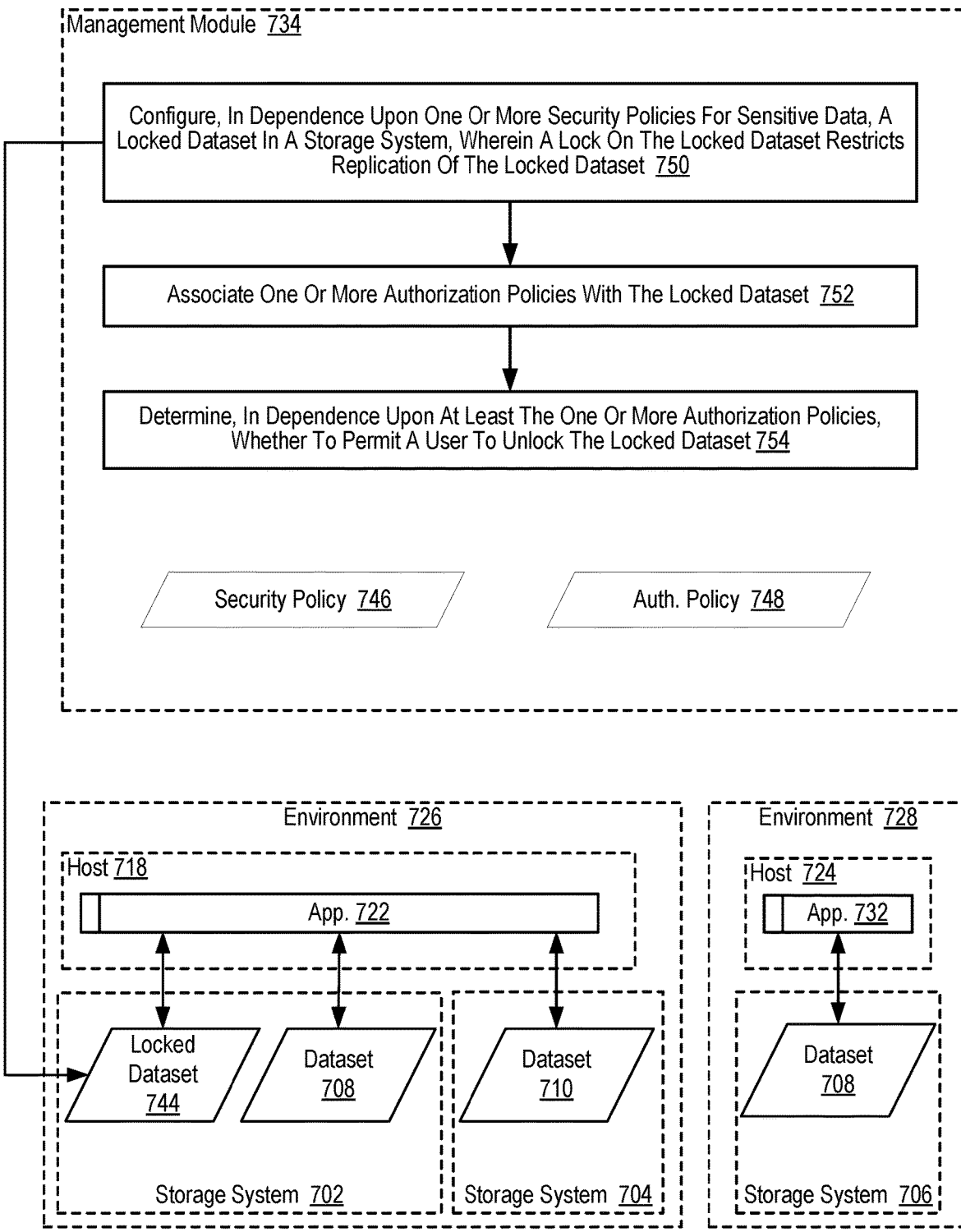
FIG. 7 sets forth a flow chart illustrating an example method of volume-level protection of sensitive data in accordance with some embodiments of the present disclosure.

For further explanation, FIG. 7 sets forth a flow chart illustrating an example method of volume-level protection of sensitive data in accordance with some embodiments of the present disclosure. The example computing environment depicted in FIG. 7 includes a plurality of storage systems (702, 704, 706) that may be similar to the storage systems described above, including as the container storage systems described above. In the example depicted in FIG. 7, each of the storage systems (702, 704, 706) supports one or more storage volumes (708, 710, 712), which may be embodied as container storage volumes (also referred to above as virtual volumes), volumes, file systems, file directory tree trees (e.g., managed directories), key-value databases, buckets or accounts in an object store, tenants, and other data constructs. For example, one or more datasets (708, 710, 712) may be a container storage volume embodied as a logical construct that may be treated as individual disks through which block storage can be consumed by one or more containers. In this example, consumers of block storage may create, attach, connect, and disconnect or move container storage volume without the loss of data. In some examples, one or more storage datasets (708, 710, 712) may be replicated among the storage systems (702, 704, 706).

The example depicted in FIG. 7 also includes a plurality of host (718, 724) computers (e.g., one or more servers) that support the execution of one or more applications (722, 732) that utilize the one or more datasets (708, 710, 712). Each of the applications (722, 732) may be embodied as one or more modules of computer program instructions that are executing on physical or virtual hardware. Each of the applications (722, 732) may be employed for different types of service. For example, one application (722) may be employed as a production application and the other application (732) may be employed as a testing and development application, as will be explained in greater detail below. Readers will appreciate that the number and arrangement of storage systems (702, 704, 706), datasets (708, 710, 712), hosts (718, 724), and applications (722, 732) are for illustration only and that such components may be added, removed, or rearranged while maintaining a suitable computing environment for volume-level protection of sensitive data In the example depicted in FIG. 7, the storage systems (702, 704, 706), datasets (708, 710, 712), hosts (718, 724), and applications (722, 732) may also be arranged into a plurality of environments (726, 728). In one example, the environments (726, 728) may be trust environments. In this example, the environments (726, 728) may differ in their security mechanisms, trust levels, access rights, and/or privileges, as well as their authorization and authentication mechanisms. In another example, the environments (726, 728) may be physical environments, such as a rack of storage systems. In yet another environment, the environments (726, 728) may be network environments, such as a particular array of storage systems or a network file system.

For purposes of illustration, in the example of FIG. 7, one environment (726) may be regarded as more trusted—that is, more secure—than another environment (728). As one example, a secure or trusted environment may be a production environment and an unsecure or untrusted environment may be a development, testing, analytics, data mining, machine learning, or electronic discovery environment; however, generally, a trusted or secure environment may be specified by one or more security policies and an untrusted or unsecure environment may also be specified by those security policies. While the example of FIG. 7 depicts one environment (726) as including a host (718) and multiple storage systems (702, 704), whereas another environment (728) is depicted as including a host (724) and a single storage system (706), readers will appreciate that the arrangement of components and number of environment is for illustration only. Readers will further appreciate that a trust environment may be limited to the storage system itself; for example, the storage system (702) itself may be a trust environment.

In example depicted in FIG. 7, a storage system (702) may store sensitive data that, in accordance with a security policy, should not be made available outside of the storage system (702) or, alternatively, outside of a trust environment (726) of which storage system (702) is a part. For example, sensitive data can include personal identifiable information, financial transaction information, health record information, medical data, and so on. Data may be determined to be sensitive or not in accordance with a security policy, where the security policy may be user-specified or determined automatically—for example, the automatic determination of the security policy may be implemented using one or more of the machine learning techniques described above. To facilitate management and protection of sensitive data, sensitive data may be isolated from non-sensitive data in the storage system. In one example, sensitive data may be stored in a particular dataset, while non-sensitive data may be stored in other datasets. For example, the dataset (708) may comprise only non-sensitive data, while the dataset (702) comprises sensitive data. In other embodiments, sensitive data may be intermingled with non-sensitive data (e.g., a particular dataset may include sensitive data and non-sensitive data).

To protect sensitive data using a volume-level security policy, storage system (702) is configured with a locked dataset (744) for containing sensitive data, as determined in accordance with one or more security policies (746), whereby the lock placed on the locked dataset (744) restricts replication of the locked dataset. Thus, the locked dataset (744) is subject to replication restrictions that prevent the locked dataset from being replicated to another computer system in violation of a security policy. The locked dataset (744) is associated with one or more authorization policies (748) describing an authorization model for determining which entities may unlock the locked dataset (744). The authorization model may specify authentication requirements—for administrators or users—that indicate which administrators, users, or roles are permitted to unlock the locked dataset and may require an audit trail describing unlocking operations. When identity information for a user satisfies the authorization policies, the user may be permitted to unlock the locked dataset (744), or some cases override the lock. In one example, an authorization policy may specify that the dataset (744) may only be unlocked subject to completing a desensitization process. For example, sensitive data in the locked dataset (744) may be desensitized by deleting the sensitive data, replacing the sensitive data with anonymized data, or obscuring the sensitive data prior to unlocking the locked dataset (744).

In some examples, the lock and the one or more security policies (746) enforced by the lock may be recorded in metadata associated with the locked dataset (744) by generating an indication, tag, or annotation in the metadata. In these examples, the one or more authorization policies associated with the locked dataset (744) may also be recorded in the metadata. In other examples, the lock and the one or more security policies (746) enforced by the lock may be recorded in a table of datasets in the storage system (702). In these examples, the one or more authorization policies associated with the locked dataset (744) may also be recorded in the table of datasets in the storage system (702).

Consider an example where (e.g., in response to a user request or replication routine) a replication operation is initiated to replicate the datasets of storage system (702) to storage system (706) for the purpose of data backup, data analytics, or for some other reason. In this example, replication of the dataset (708) from the storage system (702) to the other storage system (706) would be permitted, whereas replication of the locked dataset (744) would be prohibited. Continuing this example, there may be a need (e.g., for a data recovery operation) to unlock the locked dataset (744). Based on a role, token or credential associated with the user (e.g., an administrator owning the appropriate privilege), and in accordance with the one or more authorization policies (748) associated with the locked dataset (744), the user may be permitted to unlock the locked dataset (744) thereby removing the restrictions on replication. In some examples, based on the role, token or credential associated with the user and in accordance with the one or more authorization policies (748) associated with the locked dataset (744), the unlocking of the dataset by the user may be authorized only after the sensitive data in the locked dataset has been desensitized, as discussed above.

In these examples, the lock on the locked dataset (744) restricts replication of the locked dataset such that sensitive data contained in the locked dataset is not replicated in violation of a security policy. In one example, a locked dataset enforces a security policy that sensitive data cannot be replicated outside of the storage system in which the locked dataset is stored. In this example, the security policy might permit sensitive data to be replicated within the storage system for the purposes of redundancy (e.g., RAID striping across a plurality of storage resources or devices in the storage system), or for the purposes of versioning (e.g., dataset snapshots), but the security policy prohibits the replication of sensitive data outside of the storage system. Using the example depicted in FIG. 7, the locked dataset (744) in the storage system (702) could not be replicated to a different storage system (704, 706). Accordingly, the locked dataset cannot be replicated outside of the storage system thereby limiting the availability of data to unauthorized individuals.

In another example, a lock on a locked dataset enforces a security policy that sensitive data cannot be replicated outside of an environment of the storage system in which the locked dataset is stored. In this example, the security policy may prohibit the replication of sensitive data from a production environment to a non-production environment. For example, a production environment may be a primary environment including all datasets containing production data or databases for operation; whereas, a non-production environment may be a secondary environment such as a development, testing, analytics, data mining, machine learning, or electronic discovery environment. In some examples, the production environment maintains a higher level of trust than a non-production environment. In some examples, the non-production environment also serves as a backup of the production environment. In these examples, a locked dataset is prevented from replicating to the non-production environment, thereby limiting the availability of sensitive data in the locked dataset to a particular trusted environment.

Consider the example where environment (726) is a production environment in which the application (722) on the host (718) is a production application and the locked dataset (744) and the dataset (708) on the storage system (702) comprise production databases; whereas, in this example, another environment (728) is a non-production environment in which an application (732) on host (724) is a database testing a development application. To ensure that a dataset containing sensitive data is not replicated to the storage system (706) in the non-production environment (728), it is advantageous to lock the dataset (744) containing sensitive data such that the locked dataset (744) cannot be replicated to the storage system (706) in accordance with the security policy. In some examples, however, the security policy may permit the replication of sensitive data to other storage systems in the production environment (726). In such an example, replication of the locked dataset from storage system (702) in the production environment (726) to storage system (704) in the production environment (726) may be permitted.

In yet another example, a lock on a locked dataset enforces a security policy that sensitive data cannot be replicated from an on-premises storage system to an off-premises storage system (e.g., a cloud-based storage system). In this example, the security policy may prohibit the replication of sensitive data from a data facility operated by an entity to an off-premises storage system operated by a different entity such as that of a cloud storage provider. Accordingly, a locked dataset is prevented from replicating to a storage system maintained by an external entity, thereby limiting the availability of sensitive data in the locked dataset to a particular trusted environment.

In yet another example, a lock on a locked dataset enforces a security policy that sensitive data cannot be replicated to a storage system in a different geographic location (e.g., a country, region, or other geographic boundary). In this example, the security policy may prohibit the replication of sensitive data from a storage system located in one geographic boundary or regulatory region to a storage system located in different geographic boundary or regulatory region. For example, to comply with privacy rights and regulations such as the European Union's General Data Protection Regulation, a locked dataset is prevented from replicating to a target storage system outside of the country or regulatory region in which the source storage system resides. Based on the physical location of the target storage system, it may be determined that the target storage system is located within a geographic boundary to which replication is permitted or prohibited by the security policy enforced by the lock. For example, replication from a source storage system having a physical location in a particular country to a target storage system having a physical location within the same country may be permitted, while replication from a source storage system having a physical location in a particular country to a target storage system having a physical location outside of the country, or in a country to which replication is explicitly prohibited, will not be permitted. The location of a particular dataset or storage system may be determined based on, for example, associated geotags, IP address locations, data center locations, metadata, and other such location information, as well as combinations thereof.

In yet another example, a lock on a locked dataset enforces a security policy that sensitive data cannot be replicated to a network file system in a storage network or with a cloud-based storage system. In this example, the security policy may prohibit the replication of sensitive data from a storage system to other storage systems in a network or cloud. Accordingly, a locked dataset is prevented from replicating to a storage system in a different network partition or to a different region or zone (e.g., Amazon AWS region or availability zone) within a cloud, thereby limiting the availability of sensitive data in the locked dataset to a particular trusted environment.

In these examples, security policies associated with a locket dataset may permit replication of the dataset subject to a desensitization process being performed on the locked dataset. For example, a security policy may permit the creation of a desensitized copy of the locked dataset, in which sensitive data in the locked dataset has been identified and either removed, replaced with anonymized data, or otherwise obfuscated. In such an example, the security policy may permit export of the desensitized copy to targets that were otherwise not permitted (e.g., off-premises storage systems, network storage systems, non-production storage systems, or storage systems outside of the regulatory region) in accordance with the security policies associated with the locked dataset.

In these examples, an authorization policy (748) associated with a locked dataset specifies particular users or types of users with the privilege to unlock the locked dataset. The authorization policy may be implemented as part of an authorization model. The authorization model may utilize an access control list ('ACL') to set controls or permissions for a locked dataset. The ACL is a list of permissions attached to dataset and the ACL specifies which users or system processes are granted access to a volume (e.g., a container storage volume), as well as what operations are allowed on given datasets. For example, the authorization model may describe a set of role-based access control policies (e.g., only users with the highest level of access can remove a lock on a dataset or snapshot), or override a lock on a dataset or snapshot. In some examples, the authorization model defines a specific privilege for unlocking the locked dataset, such that removal of the lock allows the unlocked dataset to be replicated. In some examples, the authorization model defines a specific privilege for overriding the lock, or security policy associated with the lock, on the locked volume to temporarily permit replication. In some examples, the authorization model may be provided by a cloud services provider as described above.

In these examples, the locked dataset (744) may be unlocked by a user (e.g., an administrator) based on the authorization policy (748) associated with the locked dataset (744). The user's credentials (e.g., a key, or a token provided by an authorization and authentication module) may be used to ascertain the user's role with a storage management environment. In response to a request by the user to unlock a locked dataset, the authorization policy may be used to determine whether the user's role permits unlocking the locked dataset based on access privileges granted to the user. In some examples, the storage system (e.g. storage system (702)) may provide a management console for unlocking a locked dataset either directly to a host computer system, or the storage system may provide an API to a management console that executes from a remote location, such as within a cloud computing environment provided by a remote cloud services provider as described above. In this example, using the management console, a user may select a dataset or snapshot to unlock. In some examples, the user may be presented with a graphical user interface (GUI) that enables the user to select a dataset or snapshot to lock or unlock. In one example, the GUI may be provided in a storage operating environment such the Purity™ storage operating environment.

In an embodiment, a lock on a locked dataset additionally or alternatively restricts restoration of the locked dataset to a previous version. In one example, the security policy may prohibit restoration of sensitive data from a snapshot of the locked dataset. For example, the recovery of a corrupted dataset may necessitate restoration of the locked dataset to a previous version. In these examples, the restoration of the locked dataset to a previous version embodied in a snapshot requires the locked dataset to be unlocked, or an override of the security policy prohibiting restoration of the locked dataset, in accordance with the associated authorization policy. A technical advantage is that, in contrast to traditional methods, a locked dataset can only be restored, even in a trusted environment, subject to the authorization policy to prevent unauthorized manipulation of the sensitive data. Consider an example where a snapshot includes a financial transaction that could be reversed by restoring the snapshot. However, a locked dataset cannot be rolled back by an ordinary user; rather, the authorization model describes which users with the access rights and privilege users to unlock the locked dataset containing sensitive data for restoring the locked dataset to a previous version.

In an embodiment, a locked snapshot may be created, wherein a lock on the snapshot prevents replication of the locked snapshot. In one example, a lock on a locked snapshot may be configured as described above with reference to configuring a locked dataset. Also as described above, the lock on the locked snapshot may enforce any of the above described security policies (e.g., prohibiting replication to other storage systems, prohibiting replication to a non-production environment, prohibiting replication to an off-premises storage system, etc.) with respect to sensitive data contained in the locked snapshot. Also as described above, a locked snapshot may be associated with an authorization policy. A locked snapshot may be created from a locked dataset or an unlocked dataset. In some examples, the locked snapshot is configured in accordance with one or more security policies as part of creating the snapshot. In other examples, a locked snapshot may inherit the lock attributes (e.g., security policies and authorization policies) of the locked dataset. In some examples, any snapshot created from a locked dataset is created as a locked snapshot inheriting the lock attributes of the source locked dataset.

In an embodiment, a locked snapshot may be created, wherein a lock on the snapshot prevents restoration of the locked snapshot. In one example, the security policy may restrict restoration of sensitive data from a locked snapshot. The locked snapshot cannot be restored to a source dataset or used to create a new dataset without first unlocking the locked snapshot or overriding of the lock and associated security policy prohibiting restoration of the locked dataset. For example, the recovery of a corrupted dataset may necessitate restoration of the dataset to a previous version using a locked snapshot, or may require the creation of an entirely new dataset from the locked snapshot. In these examples, the restoration of the snapshot to a source dataset or the creation of a new dataset requires the locked snapshot to be unlocked, or an override of the security policy prohibiting restoration of the locked dataset, in accordance with the associated authorization policy. A technical advantage is that, in contrast to traditional methods, a locked snapshot can only be restored, even in a trusted environment, subject to the authorization policy to prevent unauthorized manipulation of the sensitive data. Consider an example where a snapshot includes a financial transaction that could be reversed by restoring the snapshot. However, a locked snapshot cannot be rolled back by an ordinary user; rather, the authorization model describes which users with the access rights and privilege users to unlock the locked snapshot containing sensitive data for restoring the locked snapshot.

In a particular example, a locked snapshot may be created for in response to discovering sensitive data in a dataset that should not include the identified sensitive data. In this example, a locked snapshot of that dataset may be created for forensic analysis while the sensitive data may be deleted from the live dataset that should not include the sensitive data. Further, any other existing snapshots of the dataset also found to include the sensitive data may also be locked. If rollback of the dataset using a locked snapshot is required to due to a corruption of the dataset or some other operational purpose, a clone of any such snapshot could be created and desensitized for the purpose of rolling back the dataset.

The example method depicted in FIG. 7 includes configuring (750), in dependence upon one or more security policies (746) for sensitive data, a locked dataset (744) in a storage system (702), wherein a lock on the locked dataset (744) restricts replication of the locked dataset (744). Configuring (750), in dependence upon one or more security policies (746) for sensitive data, a locked dataset (744) in a storage system (702), wherein a lock on the locked dataset (744) restricts replication of the locked dataset (744), may be carried out by recording the lock and the one or more security policies (746) enforced by the lock in metadata associated with the locked dataset (744), for example, by generating an indication, tag, or annotation in the metadata. Configuring (750), in dependence upon one or more security policies (746) for sensitive data, a locked dataset (744) in a storage system (702), wherein a lock on the locked dataset (744) restricts replication of the locked dataset (744), may be carried out by recording the lock and the one or more security policies (746) enforced by the lock in a table of datasets in the storage system (702). In some examples, configuring (750), in dependence upon one or more security policies (746) for sensitive data, a locked dataset (744) in a storage system (702) may be carried out as part of creating the locked dataset (744). In other examples, configuring (750), in dependence upon one or more security policies (746) for sensitive data, a locked dataset (744) in a storage system (702) may be performed on an existing volume.

In some examples, the lock may be configured to prevent replication of the locked dataset (744) from the storage system (702) to a different storage system (704, 706). In these examples, the lock may be configured to permit replication of the locked dataset or portions thereof within the storage system (702). In some examples, the lock may also be configured to restrict restoration of the locked dataset (744) to a previous version of the locked dataset in the storage system (702).

In some examples, the lock prevents replication of the locked dataset from the storage system (702) in a first environment (728) to a different storage system (706) in a second environment (726). In one example, the first environment (728) and the second environment (726) are different geographic environments. For example, storage system (702) may be located in an on-premises facility, and the storages system (706), such as a cloud storage system, may be located in an off-premises facility. In another example, the first environment (728) and the second environment (726) are different regulatory environments. For example, storage system (702) may be located in one country or regulatory region, and the storages system (706) may be located in a different country or region. In another example, the first environment (728) and the second environment (726) are different trust environments. For example, the first environment (728) may deploy security policies that are more secure that security policies deployed in the second environment (726).

In one example, storage system (702) is a production environment storage system, and the lock prevents replication of the locked dataset (744) from the production environment storage system (702) to a non-production environment storage system (706). In this example, the lock prevents replication of the locked dataset from the storage system (702) in a production environment (728) to a different storage system (706) in a non-production environment (726), as described above.

The example method depicted in FIG. 7 also includes associating (752) one or more authorization policies (748) with the locked dataset (744). One or more authorization policies (748) may specify particular users, types of users, or roles with the privilege, among others, to unlock the locked dataset. The authorization policy (748) may be implemented as part of an authorization model. For example, the authorization model may describe a set of role-based access control policies (e.g., only users with the highest level of access can remove a lock on a dataset or snapshot of a volume). Associating (752) one or more authorization policies (748) with the locked dataset (744) may be carried out directly by associating the authorization policy (748) with the locked dataset, for example, in metadata for the locked dataset (744) or in a table such as a registry of datasets in the storage system; or may be carried out indirectly by associating the authorization policy (748) with one or more security policies (746) enforced by the locked dataset (744).

The example method depicted in FIG. 7 also includes determining (754), in dependence upon at least the one or more authorization policies (748), whether to permit a user to unlock the locked dataset (744). In one example, determining (754), in dependence upon at least the one or more authorization policies (748), whether to permit a user to unlock the locked dataset (744) may be carried out by determining the role of the user and determining whether the authorization policy specifies that the role is authorized to unlock the locked dataset (744). In another example, determining (754), in dependence upon at least the one or more authorization policies (748), whether to permit a user to unlock the locked dataset (744) may be carried out by determining a set of access rights and privileges and determining, in accordance with the authorization policy (748) associated with the locked dataset (744) whether the user is permitted to unlock the locked dataset (744). In these examples, determining whether the user or role of the user is permitted to unlock the locked dataset (744) may include identifying a particular privilege associated with the user or user's role that grants the authority to unlock a locked dataset. In other words, the privilege providing the authorization to unlock a locked dataset (744) in accordance with an authorization policy (748) may be distinct from other privileges and access rights that allow the user to manage the locked dataset (744). In this way, the authorization policy (748) provides that only a user with the highest level of trust can unlock the unlocked dataset.

In some examples, permitting a user to unlock the locked dataset (744) may also include recording unlocking operation in an entry of an audit log. In one example, permitting a user to unlock the locked dataset (744) may also include taking a snapshot of the locked dataset (744) prior to unlocking the locked dataset as part of the unlocking operation, and may include associating the snapshot with the entry in the audit log. In some examples, the unlocking operation may include removing the lock from metadata or from a table entry associated with the volume.

Consider an example where an authorization model may include a user role with a set of privileges for performing I/O operations on the locked dataset (744) as well an administrator role with a set of privileges for managing (e.g., managing snapshot policies, deduplication policies, compression policies, etc.) the locked dataset (744). In this example, the authorization model may include custodian role with a privilege that, unlike the user role or administrator role, allows a user in the custodian role to unlock the locked dataset (744). In this example, the custodian role has a higher level of trust than the user role or administrator role. For example, a user assigned with a custodian role may be authorized personnel in the entity that owns the storage system, or may be authorized personnel in a cloud storage services provider.

Figure 8:
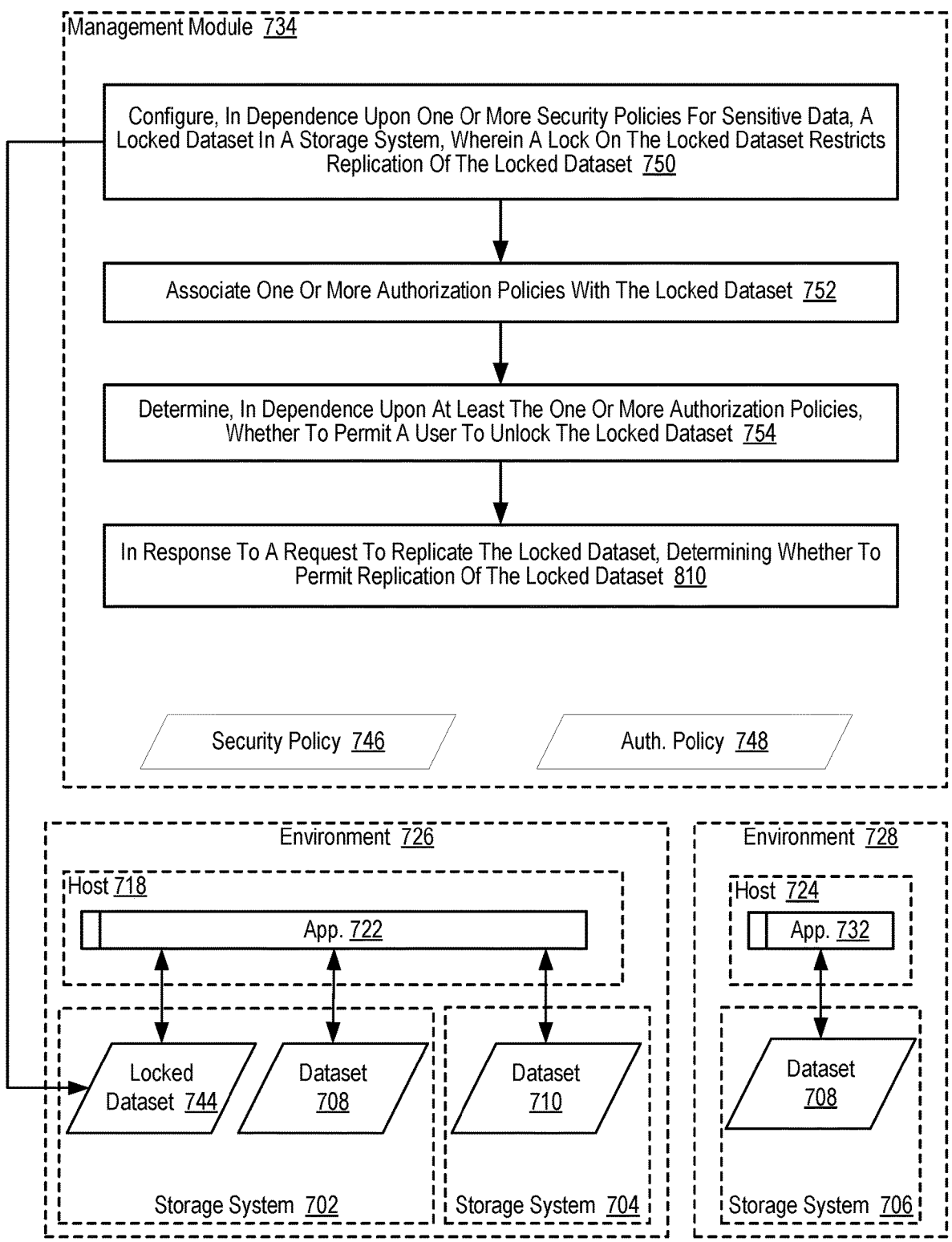
FIG. 8 sets forth a flow chart illustrating an example method of volume-level protection of sensitive data in accordance with some embodiments of the present disclosure.

For further explanation, FIG. 8 sets forth a flow chart illustrating an additional example method of volume-level protection of sensitive data in accordance with some embodiments of the present disclosure. The example method depicted in FIG. 8 is similar to the example method depicted in FIG. 7, as the example method depicted in FIG. 8 also includes configuring (750), in dependence upon one or more security policies (746) for sensitive data, a locked dataset (744) in a storage system (702), wherein a lock on the locked dataset (744) restricts replication of the locked dataset (744); associating (752) one or more authorization policies (748) with the locked dataset (744); and determining (754), in dependence upon at least the one or more authorization policies (748), whether to permit a user to unlock the locked dataset (744).

The example method depicted in FIG. 8 also includes in response to a request to replicate the locked dataset, determining (810) whether to permit replication of the locked dataset. In some examples, the security policy (746) enforced by the lock on the locked dataset (744) may permit replication of the locked dataset (744) from one storage resource in the storage system (702) to another storage resource in the storage system (702). In these examples, determining (810) whether to permit replication of the locked dataset may be carried out by determining whether the target storage resource is a component of the storage system (702). In other examples, the security policy (746) enforced by the lock on the locked dataset (744) may permit replication of the locked dataset (744) from the storage system (702) in the environment (728) to another storage system (706) in the same environment (728) (e.g., the same production environment, trust environment, or geographic environment). In some examples, permitting replication of the locked dataset (744) may also include recording allowance of the replication in an audit log. Readers will appreciate that a request to replicate the locked dataset (744) may take the form of a scheduled backup of the storage system (702), a user request to replicate the storage system (702), a user request to replicate the locked dataset (744), or any other request or instruction that attempts, directly or indirectly, to replicate the locked dataset (744), for example. If replication of the locked dataset (744) is not permitted in accordance with the one or more security policies (746), an alert may be generated to inform the user.

In some examples, determining (810) whether to permit replication of the locked dataset (744) may include determining whether to permit replication of a desensitized version of the locked dataset in accordance with the securities policies associated with the locked dataset (744). For example, the locked dataset (744) may be desensitized by removing the sensitive data, anonymizing the sensitive data, or otherwise obfuscating the sensitive data. A desensitization process may be performed to identify sensitive data in the locked dataset (744) and desensitize the identified sensitive data. The desensitization of the data may be performed on the live version of the locked dataset (744) or a copy of the locked dataset may be created in which the sensitive data has been removed, anonymized, or otherwise obfuscated. In such examples, the security policy may allow replication of the desensitized version of the locked dataset upon completion of the desensitization process in response to a request or instruction to replicate the locked dataset (744).

In some examples, determining (810) whether to permit replication of the locked dataset (744) may include determining whether a user is authorized to override the lock on the locked dataset in accordance with one or more authorization policies. For example, a user may have an associated privilege that allows the user to temporarily suspend, or override, the security policy that prevents replication of the locked dataset to a particular storage system that would otherwise be prohibited. In these examples, the lock is not removed from the locked dataset despite replication being permitted.

Figure 9:
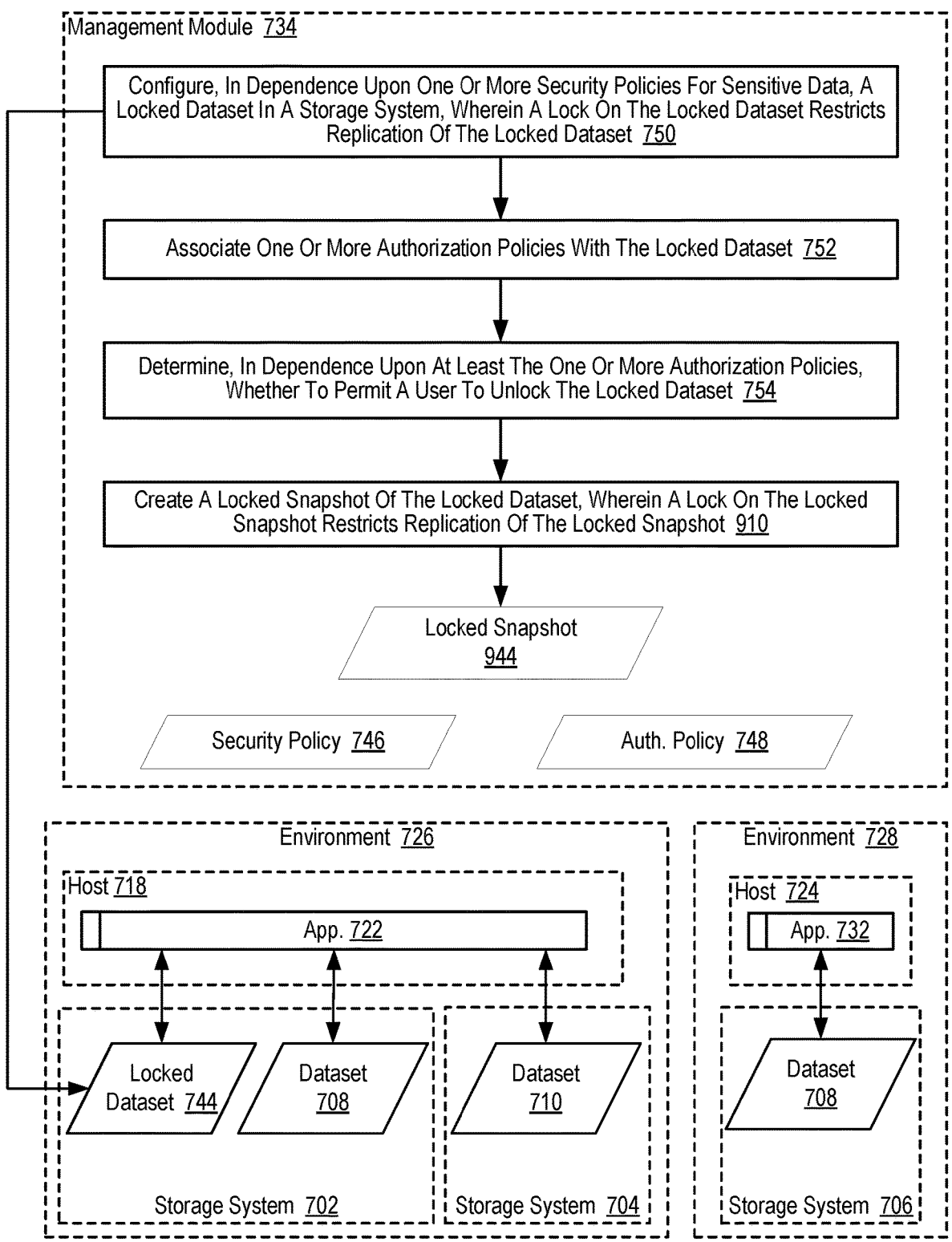
FIG. 9 sets forth a flow chart illustrating an example method of volume-level protection of sensitive data in accordance with some embodiments of the present disclosure.

For further explanation, FIG. 9 sets forth a flow chart illustrating an additional example method of volume-level protection of sensitive data in accordance with some embodiments of the present disclosure. The example method depicted in FIG. 9 is similar to the example method depicted in FIG. 7, as the example method depicted in FIG. 9 also includes configuring (750), in dependence upon one or more security policies (746) for sensitive data, a locked dataset (744) in a storage system (702), wherein a lock on the locked dataset (744) restricts replication of the locked dataset (744); associating (752) one or more authorization policies (748) with the locked dataset (744); and determining (754), in dependence upon at least the one or more authorization policies (748), whether to permit a user to unlock the locked dataset (744).

The example method depicted in FIG. 9 also includes creating (910) a locked snapshot (944) of the locked dataset (744), wherein a lock on the locked snapshot (944) restricts replication of the locked snapshot. Creating (910) a locked snapshot (944) of the locked dataset (744), wherein a lock on the locked snapshot (944) restricts replication of the locked snapshot, may be carried out by creating the snapshot and recording the lock and the one or more security policies (746) enforced by the lock in metadata associated with the locked dataset (744), for example, by generating an indication, tag, or annotation in the metadata. Creating (910) a locked snapshot (944) of the locked dataset (744), wherein a lock on the locked snapshot (944) restricts replication of the locked snapshot, may be carried out by creating the snapshot and recording the lock and the one or more security policies (746) enforced by the lock in a table of datasets in the storage system (702). In some examples, a locked snapshot (944) includes all of the properties discussed above with respect to a locked dataset (744), including an associated authorization policy (748) used to determine whether to permit a user to unlock the locked snapshot (944). The lock on the locked snapshot (944) may enforce the same security policies (746) discussed above with respect to a locked dataset (744).

In some examples, the one or more security policies (746) may restrict restoration of sensitive data from the locked snapshot (944) to the locked dataset (744) or may restrict the creation of a new dataset from the locked snapshot (944). In these examples, the locked snapshot (944) is prohibited from being restored to the source locked dataset (744) or used to create a new dataset without first unlocking the locked snapshot (944) or overriding the security policy that prevents replication or restoration of the locked snapshot (944). For example, the recovery of a corrupted dataset in the locked dataset (744) may necessitate restoration of the locked dataset (744) to a previous version using the locked snapshot (944), or may require the creation of an entirely new dataset from the locked snapshot (944). In these examples, the restoration of the locked snapshot (944) requires the locked snapshot (944) to be unlocked or the lock to be overridden in accordance with the associated authorization policy (748).

While the example of FIG. 9 creating (910) a locked snapshot (944) of the locked dataset (744), readers will appreciate that a locked snapshot (944) may also be created from a dataset that is not locked. Consider an example where sensitive data is discovered in a dataset that is not locked and that should not include sensitive data. In this example, a locked snapshot of that dataset may be created for forensic analysis while the sensitive data is deleted from the live dataset (i.e., the dataset that is not locked and that should not include the sensitive data). Further, any other existing snapshots of the dataset also found to include the sensitive data may be locked by attaching a lock to those snapshots. If a rollback of the dataset that is not locked using the locked snapshot is required (e.g., due to a corruption of the dataset or some other operational purpose), a clone of the locked snapshot could be created and desensitized for the purpose of rolling back the dataset.

Figure 10:
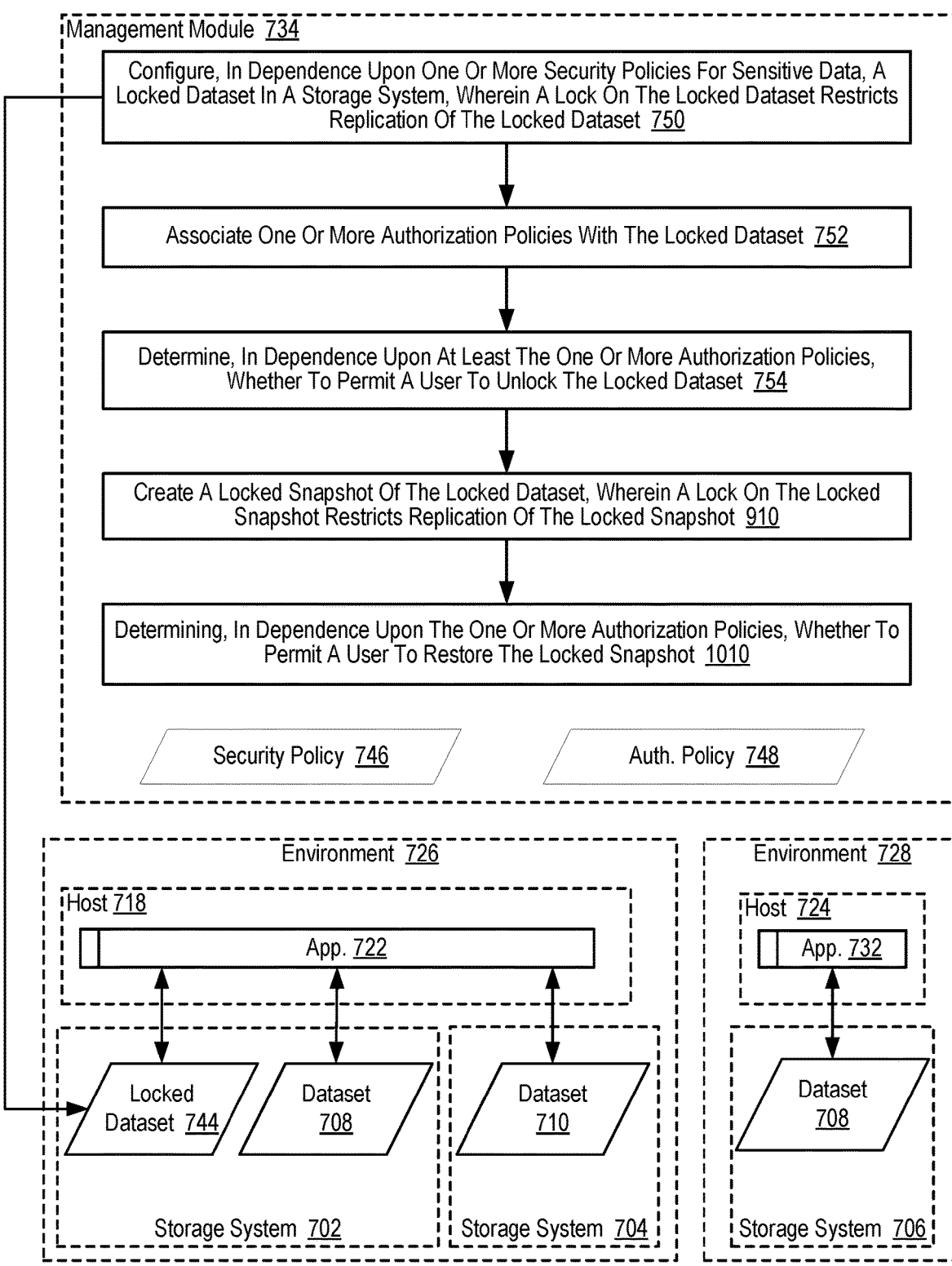
FIG. 10 sets forth a flow chart illustrating an example method of volume-level protection of sensitive data in accordance with some embodiments of the present disclosure.

For further explanation, FIG. 10 sets forth a flow chart illustrating an additional example method of volume-level protection of sensitive data in accordance with some embodiments of the present disclosure. The example method depicted in FIG. 10 is similar to the example method depicted in FIG. 7, as the example method depicted in FIG. 10 also includes configuring (750), in dependence upon one or more security policies (746) for sensitive data, a locked dataset (744) in a storage system (702), wherein a lock on the locked dataset (744) restricts replication of the locked dataset (744); associating (752) one or more authorization policies (748) with the locked dataset (744); determining (754), in dependence upon at least the one or more authorization policies (748), whether to permit a user to unlock the locked dataset (744); and creating (910) a locked snapshot (944) of the locked dataset (744), wherein a lock on the locked snapshot (944) restricts replication of the locked snapshot (944).

The example method depicted in FIG. 10 also includes, in response to a request to restore the locked snapshot, determining (1010), in dependence upon the one or more authorization policies (746), whether to permit a user to restore the locked snapshot (944). Determining (1010), in dependence upon the one or more authorization policies (746), whether to permit a user to restore the locked snapshot (944) may be carried out by determining the role of the user and determining whether the authorization policy specifies that the role is authorized to unlock the locked snapshot (944) or whether the user is authorized to override the lock on the locked snapshot (944). In another example, determining (1010), in dependence upon the one or more security policies (746), whether to permit a user to restore the locked snapshot (944) may be carried out by determining a set of access rights and privileges and determining, in accordance with the authorization policy (748) associated with the locked snapshot (944) whether the user is permitted to unlock the locked snapshot (944) or whether the user is authorized to override the lock on the locked snapshot (944). In these examples, determining whether the user or role of the user is permitted to unlock the locked snapshot (944) or whether the user is authorized to override the lock on the locked snapshot (944) may include identifying a particular privilege associated with the user or user's role that grants the authority to unlock a locked snapshot or override the lock. If the user is permitted to unlock the locked snapshot (944) or override the lock, the unlocked snapshot may be restored. Readers will appreciate that a request to restore the locked snapshot (944) may be received from a user via an API or GUI.

Figure 11:
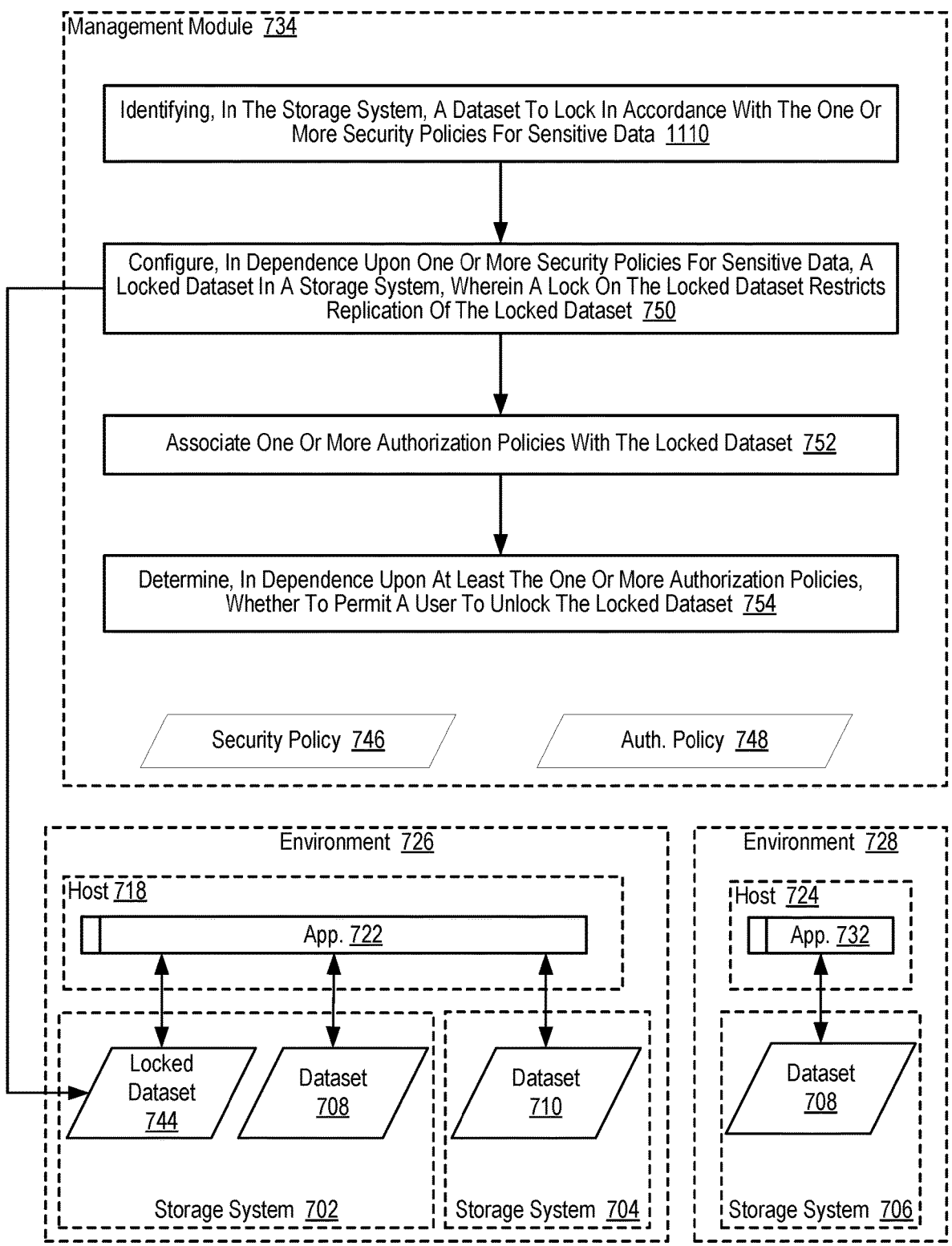
FIG. 11 sets forth a flow chart illustrating an example method of volume-level protection of sensitive data in accordance with some embodiments of the present disclosure.

For further explanation, FIG. 11 sets forth a flow chart illustrating an additional example method of volume-level protection of sensitive data in accordance with some embodiments of the present disclosure. The example method depicted in FIG. 11 is similar to the example method depicted in FIG. 7, as the example method depicted in FIG. 11 also includes configuring (750), in dependence upon one or more security policies (746) for sensitive data, a locked dataset (744) in a storage system (702), wherein a lock on the locked dataset (744) restricts replication of the locked dataset (744); associating (752) one or more authorization policies (748) with the locked dataset (744); and determining (754), in dependence upon at least the one or more authorization policies (748), whether to permit a user to unlock the locked dataset (744).

The example method depicted in FIG. 11 also includes identifying (1110), in the storage system (702), a dataset to lock in accordance with the one or more security policies (746) for sensitive data. In some examples, identifying (1110), in the storage system (702), a dataset to lock in accordance with the one or more security policies (746) for sensitive data may be carried out by receiving an indication from a user (e.g., via an API or GUI as discussed above), that a particular dataset in the storage system (702) should be locked. In this example, the user may indicate the security policy that the lock is to enforce. In other examples, identifying (1110), in the storage system (702), a dataset to lock in accordance with the one or more security policies (746) for sensitive data may be carried out by identifying a dataset that contains sensitive data. Data may be automatically determined to be sensitive or not in accordance with a security policy, where the security policy may be user-specified or determined automatically—for example, the automatic identification of sensitive data and/or automatic determination of the security policy may be implemented using one or more of the machine learning techniques described above. In one example, a new dataset may be created to segregate data determined to be sensitive from non-sensitive data. In this example, identifying (1110), in the storage system (702), a dataset to lock in accordance with the one or more security policies may include creating a locked dataset for placement of the data determined to be sensitive.

In the examples depicted in FIGS. 7-11, a management module (734) is responsible for performing many of the steps described above. Such a management module (734) may be embodied, for example, as one or more modules of computer program instructions that are executing on computer hardware such as a computer processor, as one or more modules of computer program instructions that are executing on virtualized computer hardware such as a virtual machine, as one or more modules of computer program instructions that are included in a container, or in some other way. Such a management module (734) may be embodied, for example, as one or more modules of computer program instructions that are executing on computer hardware that is part of the storage systems (702, 704, 706) themselves, as a centralized management module (734) that executes in a cloud, as a management module (734) that executes on dedicated hardware such as a top-of-the-rack server or similar device, or in some other way. In an embodiment where the management module (734) is not attached to a particular storage system (e.g., the management module (734) is part of a cloud-based service), data communications between a particular storage system (702, 704, 706) and the management module (734) may be used to exchange information about stored sensitive data, exchange information describing policies that should be attached to a particular dataset containing sensitive data, and facilitate the performance of the steps described above.

Although the embodiments described above relate to embodiments where sensitive data is protected through the use of a lock that is used to restrict replication of the locked dataset, in other embodiments, the data obfuscation techniques described above may be utilized as a precursor to unlocking a dataset. For example, a dataset may initially be locked (i.e., restrictions may be placed on the ability to replicate the dataset) due to the presence of sensitive data but the data obfuscation techniques described above may be applied to the sensitive data that is contained in the dataset (e.g., to anonymize the sensitive data), such that the restrictions may subsequently be eased or lifted altogether.

Figure 12:
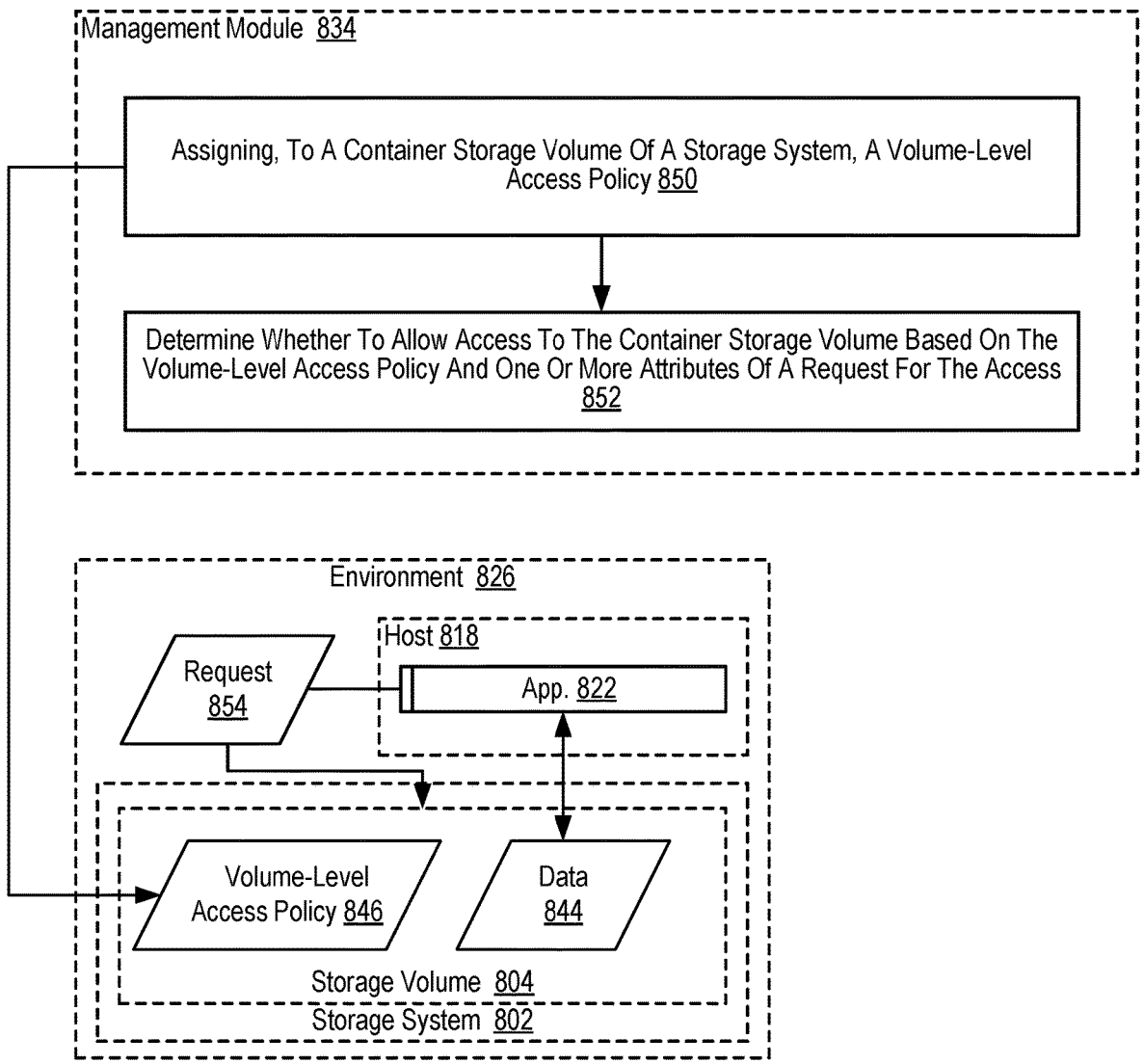
FIG. 12 sets forth a flow chart illustrating an example method of role-based data access in accordance with some embodiments of the present disclosure.

For further explanation, FIG. 12 sets forth a flow chart illustrating an example method of role-based data access in accordance with some embodiments of the present disclosure. The example computing environment depicted in FIG. 12 includes a storage system (802) that may be similar to the storage systems described above, including the container storage systems described above. In the example depicted in FIG. 12, the storage system (802) supports one or more storage volumes (804), which may be embodied as container storage volumes (also referred to above as virtual volumes), volumes, file systems, file directory tree trees (e.g., managed directories), key-value databases, buckets or accounts in an object store, tenants, and other data constructs. Such a storage system (802) is depicted as residing within an environment (826) as described above.

The example depicted in FIG. 12 also includes one or more host (818) computers (e.g., one or more servers) that support the execution of one or more applications (822) that access the storage system (802). Each application (822) may be embodied as one or more modules of computer program instructions that are executing on physical or virtual hardware. Readers will appreciate that the number and arrangement of storage systems (802), hosts (818), and applications (822) are for illustration only and that such components may be added, removed, or rearranged while maintaining a suitable computing environment for role-based data access.

The method of FIG. 12 includes assigning (850) (e.g., by a management module (834)), to a container storage volume (804) of a storage system (802), a volume-level access policy (846). A volume-level access policy (846) defines particular accessibility attributes accessing the container storage volume (804). As described herein, accessing the container storage volume (804) may include performing one or more storage operations with respect to the container storage volume (804), including reading data (844) from the container storage volume (804), writing data (844) to the container storage volume (804), initiating data replication to another container storage volume, deleting or moving data (844) in accordance with a data retention policy, or other actions as can be appreciated. In other words, the volume-level access policy (846) describes access permissions applicable to any data (844) stored in the container storage volume (804).

Assigning (850) a volume-level access policy (846) to a container storage volume (804) may include generating metadata or tags defining the parameters of the volume-level access policy (846) and associating the generated metadata or tags with the container storage volume (804). The volume-level access policy (846) may be user-generated or user-defined.

For example, the volume-level access policy (846) for a container storage volume (804) may define a sensitivity level of data (844) in the container storage volume (804) (e.g., restricted, secret, top-secret). An entity (e.g., a user) attempting to access the container storage volume (804) must have a security clearance or security level at least meeting the sensitivity level of the volume-level access policy (846). For example, for a restricted volume-level access policy (846), an entity must have a restricted, secret, or top-secret clearance. As another example, for a top-secret volume-level access policy (846), an entity must have a top-secret clearance to access the data item.

The volume-level access policy (846) may also indicate one or more geographic access permissions. For example, the volume-level access policy (846) may specify one or more countries or regions of origin of requests that are allowed or forbidden from being applied to the container storage volume (804). The volume-level access policy (846) may also indicate particular operations allowed to be performed with respect to the container storage volume (804). For example, the volume-level access policy (846) may specific that only certain actions (e.g., reads, writes, copying, data replication, etc.) may be performed on data (844) in the container storage volume (804).

As a further example, the volume-level access policy (846) may specify a particular user role for accessing the container storage volume (804). For example, the volume-level access policy (846) may enumerate one or more roles of users that are allowed to access the container storage volume (804). Where the roles are included in a hierarchical role structure, the volume-level access policy (846) may specify a minimum-level role for accessing the container storage volume (804). For example, assume a storage system (802) for a commercial operation where both users and employees have access to the storage system (802). A first container storage volume (804) may have a volume-level access policy (846) indicating that customer roles may access the first container storage volume (804). Assuming that a customer role is lower on a hierarchy than an employee role, both customers and employees can access the first container storage volume (804). A second container storage volume (804) may have a volume-level access policy (846) indicating that employee roles can access the second container storage volume (804). Here, customer roles would not be able to access the second container storage volume (804) while employee roles are able to access the second container storage volume (804).

The volume-level access policy (846) may specify combinations of access attributes for the container storage volume (804). For example, the volume-level access policy (846) may specify that only data reads may be performed from one or more enumerated regions. As another example, the volume-level access policy (846) may specify that data replication requests may be received from a particular region and that the data may only be replicated to another enumerated region. One skilled in the art would appreciate that various combinations of attributes may be specified in a volume-level access policy (846).

The method of FIG. 12 also includes determining (852) whether to allow access to the container storage volume (804) based on the volume-level access policy (846) and one or more attributes of a request (854) for the access. As described above, the one or more attributes may be associated with a source of the request (854) such as a host (818) or application (822) that generated the request (854). Such attributes may include a geographic origin of the request (854), a type of storage operation requested to be performed on the container storage volume (804), a security level or role of a user or other entity associated with the request (854), or other attributes as can be appreciated.

Where the one or more attributes meet the volume-level access policy (846), the request (854) may be allowed. Where the one or more attributes fail to meet the volume-level access policy (846), the request may be denied. For example, assume that the volume-level access policy (846) indicates a sensitivity level for data (844) stored in or to be stored in the container storage volume (804), where "restricted" is a lower sensitivity level, "secret" is a sensitivity level more restrictive than "restricted," and "top-secret" is a sensitivity level more restrictive than "secret." Further assume that the volume-level access policy (846) is set for secret-level data. In this example, as the sensitivity levels are associated with a hierarchy, entities having either a secret or top secret security level may access the container storage volume (804), while entities having a restricted or lower security level are prevented from accessing the container storage volume (804).

As another example, where the volume-level access policy (846) enumerates a list of countries or regions that may access the container storage volume (804), the request (854) will be allowed if originating from an entity in one of the enumerated countries or regions. The request (854) will be denied originating from an entity outside of the enumerated countries or regions.

In some embodiments, a request may be received to modify the volume-level access policy (846) to an updated volume-level access policy (846). In such an embodiment, the request may be allowed and the volume-level access policy (846) updated where the volume-level access policy (846) is more restrictive than the volume-level access policy (846) to be modified. Conversely, the request may be denied where the updated volume-level access policy (846) would be less restrictive than the volume-level access policy (846) to be updated. An updated volume-level access policy (846) is considered more restrictive where the set of allowable entities or actions in the updated volume-level access policy (846) is a subset of the allowable entities or actions in the volume-level access policy (846) to be modified.

For example, where the volume-level access policy (846) enumerates a list of countries or regions that may access the container storage volume (804), the volume-level access policy (846) may be updated to enumerate a subset of the countries in the volume-level access policy (846) to be modified. A volume-level access policy (846) allowing access to a container storage volume (804) from the United States, United Kingdom, and Germany may be updated to allow access to only the United States and Germany, excluding the United Kingdom. An updated volume-level access policy (846) allowing access to the United States, United Kingdom, Germany, and France would not be allowed as the updated volume-level access policy (846) allows more entities to access the container storage volume (804). As another example, an updated volume-level access policy (846) allowing access to the United States and Japan would not be allowed as this updated volume-level access policy (846) allows different entities to access the container storage volume (804) than were previously allowed. As a further example, a request to update a volume-level access policy (846) from a secret security level to a top-secret security level would be allowed, while a request to update a volume-level access policy (846) from a secret security level to a restricted security level would be denied. By denying updates to volume-level access policy (846) that are less restrictive, it ensures that data previously inaccessible to certain parties is not inadvertently exposed to unintended parties.

By enforcing the volume-level access policy (846), access to data (844) stored in the container storage volume (804) may be determined by checking the volume-level access policy (846) instead of individual access permissions for individual data objects. This provides an improvement in computational efficiency, particularly when performing actions across multiple data objects. Rather than checking the access permissions for each individual data object, the management module (834) need only check the access permissions defined by the volume-level access policy (846). Moreover, by applying the same access permissions to all data within a container storage volume (804), security is increased as data objects with lower or less restrictive access permissions are not stored in the same volume as more sensitive data.

In the examples depicted in FIG. 12, a management module (834) is responsible for performing many of the steps described above. Such a management module (834) may be embodied, for example, as one or more modules of computer program instructions that are executing on computer hardware such as a computer processor, as one or more modules of computer program instructions that are executing on virtualized computer hardware such as a virtual machine, as one or more modules of computer program instructions that are included in a container, or in some other way. Such a management module (834) may be embodied, for example, as one or more modules of computer program instructions that are executing on computer hardware that is part of the storage system (802) themselves, as a centralized management module (834) that executes in a cloud, as a management module (834) that executes on dedicated hardware such as a top-of-the-rack server or similar device, or in some other way. In an embodiment where the management module (834) is not attached to a particular storage system (e.g., the management module (834) is part of a cloud-based service), data communications between a particular storage system (802) and the management module (834) may be used to exchange information about stored sensitive data, exchange information describing policies that should be attached to a particular dataset containing sensitive data, and facilitate the performance of the steps described above.

Figure 13:
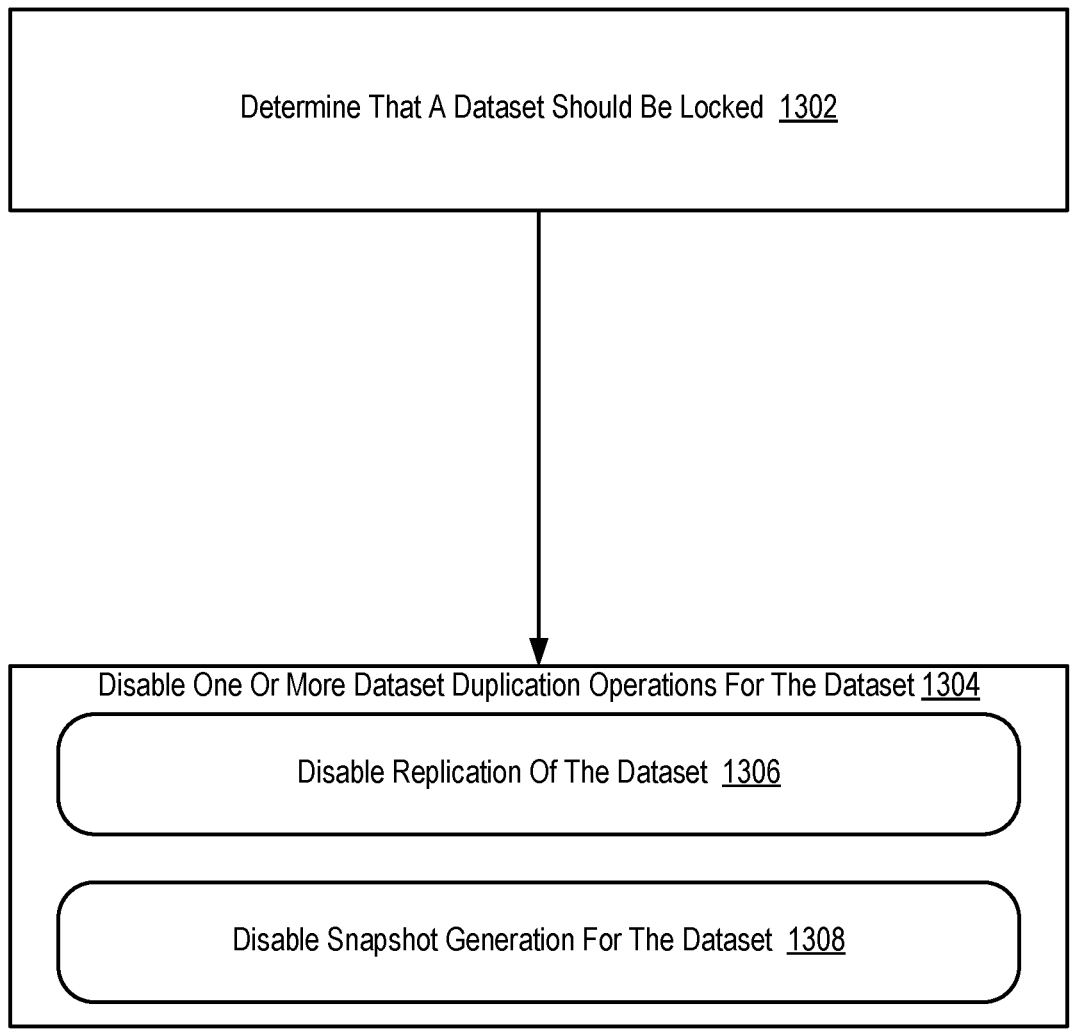
FIG. 13 sets forth a flow chart illustrating an example method of creating protected volumes in a container storage system in accordance with some embodiments of the present disclosure.

For further explanation, FIG. 13 sets forth a flow chart illustrating an example method of creating protected volumes in a container storage system in accordance with some embodiments of the present disclosure. Readers will appreciate that many governments, organizations, or other entity may have legislative data governance and handling requirements to manage the risk of access to sensitive data. For example, some entities may be subject to policies dictating that developers and testers should not be able to access PII, Human Resource (HR) data should not be able to be accessibly from outside the country of origin, and so on. To reduce the risk of data breaches, many organizations implement network security zones ensuring that non-production systems cannot access production platforms. With cloud-native applications and the use of multiple clouds, however, the challenges and complexity around data sovereignty and data governance is increased. The example method depicted in FIG. 13 can be used to create protected volumes such that the risk of data breaches can be reduced.

The example method depicted in FIG. 13 includes determining 1302 that a dataset should be locked. The dataset may be embodied, for example, as the contents of one or more volumes, as the contents of one or more files or file systems, as the contents of one or more objects, and so on. Determining 1302 that a dataset should be locked may be carried out, for example, by receiving an indication from a user (e.g., the creator of the dataset, an administrator) that the dataset should be locked. Alternatively, determining 1302 that a dataset should be locked may be carried out with user intervention. For example, applying one or more rules or heuristics may result in a determination 1302 that the dataset should be locked, applying one or more policies may result in a determination 1302 that the dataset should be locked, and so on.

The example method depicted in FIG. 13 also includes disabling 1304 one or more dataset duplication operations for the dataset. A 'dataset duplication operation' as used here may be one or more operations that result in at least some portion of the dataset being duplicated. Such a 'dataset duplication operation' may be embodied, for examples, as one or more data replication operations, as one or more operations to create a snapshot of a dataset, as one or more operations to create a clone or copy of a dataset, and so on. As such, disabling 1304 one or more dataset duplication operations for the dataset can include disabling 1306 replication of the dataset, disabling 1308 snapshot generation for the dataset, disabling copying of the dataset, and so on.

Readers will appreciate that because the dataset may be embodied as one or more volumes, determining 1302 that a dataset should be locked may result in a determination that a particular volume should be locked and disabling 1304 one or more dataset duplication operations for the dataset may result in the dataset duplication operations being disabled 1304 for the particular volume. For example, replication of the volume may be disabled, taking snapshots of the volume may be disabled, and so on. In some embodiments, unlocking a dataset and re-enabling the one or more dataset duplication operations for the dataset may be carried out only by authorized users such as, for example, the owner of the dataset.

One or more embodiments may be described herein with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

While particular combinations of various functions and features of the one or more embodiments are expressly described herein, other combinations of these features and functions are likewise possible. The present disclosure is not limited by the particular examples disclosed herein and expressly incorporates these other combinations.

Readers will appreciate that the steps described herein may be carried out in a variety ways and that no particular ordering is required. It will be further understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A method comprising:
assigning, by a computing device comprising at least one processor and memory, to a container storage volume, a volume-level access policy that indicates one or more allowable storage operations, wherein the container storage volume is presented to one or more containers by a storage management service;
receiving, by the computing device, a request to access the container storage volume;
determining, by the computing device, whether to allow access to the container storage volume based on the volume-level access policy and one or more attributes that comprise a type of storage operation of the request;
responsive to determining to allow access to the container storage volume, issuing, by the computing device, from the storage management service to a storage resource, the request;
responsive to determining not to allow access to the container storage volume, preventing, by the computing device, the request from being serviced by the storage resource;
receiving, by the computing device, a request to modify the volume-level access policy to an updated volume-level access policy; and
denying, by the computing device, the request responsive to the updated volume-level access policy being less restrictive than the volume-level access policy.

2. The method of claim 1, wherein determining whether to allow access to the container storage volume comprises allowing the access responsive to the one or more attributes meeting the volume-level access policy.

3. The method of claim 1, wherein determining whether to allow access to the container storage volume comprises denying the access responsive to the one or more attributes failing to meet the volume-level access policy.

4. The method of claim 1, wherein the volume-level access policy indicates one or more geographic access permissions and the one or more attributes comprise a source of the request.

5. The method of claim 1, wherein the volume-level access policy indicates a data sensitivity level and the one or more attributes comprise a security level.

6. The method of claim 1 further comprising locking the container storage volume.

7. The method of claim 1 further comprising receiving, by the storage management service, information describing data stored in the container storage volume.

8. The method of claim 1, further comprising:
receiving another request to modify the updated volume-level access policy to another updated volume-level access policy; and
allowing the other request responsive to the other updated volume-level access policy being more restrictive than the updated volume-level access policy.

9. An apparatus comprising a computer processor, a computer memory operatively coupled to the computer processor, the computer memory having disposed within it computer program instructions that, when executed by the computer processor, cause the apparatus to carry out the steps of:
assigning, to a container storage volume of a storage system, a volume-level access policy that indicates one or more allowable storage operations;
determining whether to allow access to the container storage volume based on the volume-level access policy and one or more attributes that comprise a type of storage operation of a request for the access;
receiving a request to modify the volume-level access policy to an updated volume-level access policy; and
denying the request responsive to the updated volume-level access policy being less restrictive than the volume-level access policy.

10. The apparatus of claim 9, wherein determining whether to allow access to the container storage volume comprises allowing the access responsive to the one or more attributes meeting the volume-level access policy.

11. The apparatus of claim 9, wherein determining whether to allow access to the container storage volume comprises denying the access responsive to the one or more attributes failing to meet the volume-level access policy.

12. The apparatus of claim 9, wherein the volume-level access policy indicates one or more geographic access permissions and the one or more attributes comprise a source of the request.

13. The apparatus of claim 9, wherein the volume-level access policy indicates a data sensitivity level and the one or more attributes comprise a security level.

14. The apparatus of claim 9, wherein the steps further comprise:
receiving another request to modify the updated volume-level access policy to another updated volume-level access policy; and allowing the other request responsive to the other updated volume-level access policy being more restrictive than the updated volume-level access policy.

15. A computer program product disposed upon a non-transitory computer readable medium, the computer program product comprising computer program instructions that, when executed, cause a computer to carry out the steps of:
   assigning, to a container storage volume of a storage system, a volume-level access policy that indicates one or more allowable storage operations;
   determining whether to allow access to the container storage volume based on the volume-level access policy and one or more attributes that comprise a type of storage operation of a request for the access;
   receiving a request to modify the volume-level access policy to an updated volume-level access policy; and
   denying the request responsive to the updated volume-level access policy being less restrictive than the volume-level access policy.

16. The computer program product of claim 15, wherein determining whether to allow access to the container storage volume comprises allowing the access responsive to the one or more attributes meeting the volume-level access policy.

17. The computer program product of claim 15, wherein determining whether to allow access to the container storage volume comprises denying the access responsive to the one or more attributes failing to meet the volume-level access policy.

18. The computer program product of claim 15, wherein the volume-level access policy indicates one or more geographic access permissions and the one or more attributes comprise a source of the request.

* * * * *